(12) United States Patent
Fakhraie et al.

(10) Patent No.: US 12,314,435 B2
(45) Date of Patent: May 27, 2025

(54) CONTROL TOWER FOR DEFINING ACCESS PERMISSIONS BASED ON DATA TYPE

(71) Applicant: Wells Fargo Bank, N.A., San Francisco, CA (US)

(72) Inventors: Lila Fakhraie, Belmont, CA (US); Brian M. Pearce, Pleasanton, CA (US); Steven Pulido, San Francisco, CA (US); Benjamin Soccorsy, Larkspur, CA (US); James Stahley, San Francisco, CA (US); Mojdeh Tomsich, Piedmont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/136,425

(22) Filed: Apr. 19, 2023

(65) Prior Publication Data

US 2023/0252187 A1    Aug. 10, 2023

Related U.S. Application Data

(63) Continuation of application No. 17/209,500, filed on Mar. 23, 2021, now Pat. No. 11,645,416, which is a
(Continued)

(51) Int. Cl.
*H04L 29/06* (2006.01)
*G06F 21/62* (2013.01)
(Continued)

(52) U.S. Cl.
CPC .......... *G06F 21/6245* (2013.01); *H04L 63/10* (2013.01); *G06F 16/215* (2019.01); *G06F 21/6263* (2013.01)

(58) Field of Classification Search
CPC . G06F 21/6245; G06F 21/6263; H04L 63/20; H04L 63/0808; H04L 63/108; H04L 63/10
(Continued)

(56) References Cited

U.S. PATENT DOCUMENTS

| 2,751,554 A | 6/1956 | Schlesinger et al. |
| 5,485,510 A | 1/1996 | Colbert |

(Continued)

FOREIGN PATENT DOCUMENTS

| AU | 2006335151 A1 | 7/2007 |
| AU | 2006227177 A1 | 10/2007 |

(Continued)

OTHER PUBLICATIONS

"Bitcoin Off-Chain Transactions: Their Invention and Use," by Michelle Mount. Geo. L. Tech. Rev. 4. 2020. pp. 685-698. (Year: 2020).
(Continued)

*Primary Examiner* — Longbit Chai
(74) *Attorney, Agent, or Firm* — Foley & Lardner LLP

(57) ABSTRACT

Systems, methods, and apparatuses for providing a central location to manage permissions provided to third-parties and devices to access and use user data and to manage accounts at multiple entities. A central portal may allow a user to manage all access to account data and personal information as well as usability and functionality of accounts. The user need not log into multiple third-party systems or customer devices to manage previously provided access to the information, provision new access to the information, and to manage financial or other accounts. A user is able to have user data and third-party accounts of the user deleted from devices, applications, and third-party systems via a central portal. The user is able to impose restrictions on how user
(Continued)

data is used by devices, applications, and third-party systems, and control such features as recurring payments and use of rewards, via a central portal.

20 Claims, 43 Drawing Sheets

Related U.S. Application Data continuation of application No. 17/005,124, filed on Aug. 27, 2020, now Pat. No. 10,963,589, which is a continuation of application No. 16/653,312, filed on Oct. 15, 2019, now Pat. No. 11,886,611, which is a continuation-in-part of application No. 16/457,257, filed on Jun. 28, 2019, now Pat. No. 12,130,937, which is a continuation-in-part of application No. 16/383,388, filed on Apr. 12, 2019, now Pat. No. 11,935,020, which is a continuation-in-part of application No. 16/215,558, filed on Dec. 10, 2018, now Pat. No. 11,409,902, which is a continuation of application No. 16/204,831, filed on Nov. 29, 2018, now Pat. No. 11,386,223, which is a continuation-in-part of application No. 15/723,078, filed on Oct. 2, 2017, now Pat. No. 10,992,679, which is a continuation-in-part of application No. 15/629,423, filed on Jun. 21, 2017, now Pat. No. 11,615,402.

(60) Provisional application No. 62/766,400, filed on Oct. 16, 2018, provisional application No. 62/403,396, filed on Oct. 3, 2016, provisional application No. 62/529,360, filed on Jul. 6, 2017, provisional application No. 62/357,737, filed on Jul. 1, 2016.

(51) Int. Cl.
    *H04L 9/40* (2022.01)
    *G06F 16/215* (2019.01)

(58) Field of Classification Search
    USPC .......................................................... 726/30
    See application file for complete search history.

(56) References Cited

U.S. PATENT DOCUMENTS

| | | | |
|---|---|---|---|
| 5,573,457 A | 11/1996 | Watts et al. |
| 5,737,423 A | 4/1998 | Manduley |
| 5,953,710 A | 9/1999 | Fleming |
| 5,999,978 A | 12/1999 | Angal et al. |
| 6,047,268 A | 4/2000 | Bartoli et al. |
| 6,105,006 A | 8/2000 | Davis et al. |
| 6,188,309 B1 | 2/2001 | Levine |
| 6,193,152 B1 | 2/2001 | Fernando et al. |
| 6,408,330 B1 | 6/2002 | Delahuerga |
| 6,422,462 B1 | 7/2002 | Cohen |
| 6,494,367 B1 | 12/2002 | Zacharias |
| 6,575,361 B1 | 6/2003 | Graves et al. |
| 6,717,592 B2 | 4/2004 | Gusler et al. |
| 6,845,906 B2 | 1/2005 | Royer et al. |
| 6,865,547 B1 | 3/2005 | Brake et al. |
| 6,879,965 B2 | 4/2005 | Fung et al. |
| 6,910,021 B2 | 6/2005 | Brown et al. |
| 6,931,382 B2 | 8/2005 | Laage et al. |
| 6,980,969 B1 | 12/2005 | Tuchler et al. |
| 7,014,107 B2 | 3/2006 | Singer et al. |
| 7,016,877 B1 | 3/2006 | Steele et al. |
| 7,107,243 B1 | 9/2006 | McDonald et al. |
| 7,155,411 B1 | 12/2006 | Blinn et al. |
| 7,219,833 B2 | 5/2007 | Cantini et al. |
| 7,225,156 B2 | 5/2007 | Fisher et al. |
| 7,249,099 B2 | 7/2007 | Ling |
| 7,264,154 B2 | 9/2007 | Harris |
| 7,319,986 B2 | 1/2008 | Praisner et al. |
| 7,331,518 B2 | 2/2008 | Rable |
| 7,347,361 B2 | 3/2008 | Lovett |
| 7,359,880 B2 | 4/2008 | Abel et al. |
| 7,383,988 B2 | 6/2008 | Slonecker, Jr. |
| 7,383,998 B2 | 6/2008 | Parker et al. |
| 7,392,224 B1 | 6/2008 | Bauer et al. |
| 7,398,248 B2 | 7/2008 | Phillips et al. |
| 7,401,731 B1 | 7/2008 | Pletz et al. |
| 7,413,113 B1 | 8/2008 | Zhu |
| 7,451,395 B2 | 11/2008 | Brants et al. |
| 7,512,563 B2 | 3/2009 | Likourezos et al. |
| 7,552,088 B2 | 6/2009 | Malcolm |
| 7,571,142 B1 | 8/2009 | Flitcroft et al. |
| 7,587,365 B2 | 9/2009 | Malik et al. |
| 7,594,258 B2 | 9/2009 | Mao et al. |
| 7,653,597 B1 | 1/2010 | Stevanovski et al. |
| 7,685,037 B2 | 3/2010 | Reiners et al. |
| 7,689,502 B2 | 3/2010 | Lilly et al. |
| 7,698,221 B2 | 4/2010 | Blinn et al. |
| 7,707,082 B1 | 4/2010 | Lapstun et al. |
| 7,712,655 B2 | 5/2010 | Wong |
| 7,740,170 B2 | 6/2010 | Singh et al. |
| 7,753,265 B2 | 7/2010 | Harris |
| 7,778,932 B2 | 8/2010 | Yan |
| 7,818,319 B2 | 10/2010 | Henkin et al. |
| 7,857,212 B1 | 12/2010 | Matthews |
| 7,873,573 B2 | 1/2011 | Realini |
| 7,930,228 B1 | 4/2011 | Hawkins et al. |
| 7,937,325 B2 | 5/2011 | Kumar et al. |
| 7,941,534 B2 | 5/2011 | De La Huerga |
| 7,949,572 B2 | 5/2011 | Perrochon et al. |
| 7,954,704 B1 | 6/2011 | Gephart et al. |
| 8,090,346 B2 | 1/2012 | Cai |
| 8,099,109 B2 | 1/2012 | Altman et al. |
| 8,127,982 B1 | 3/2012 | Casey et al. |
| 8,160,933 B2 | 4/2012 | Nguyen et al. |
| 8,175,938 B2 | 5/2012 | Olliphant et al. |
| 8,196,131 B1 | 6/2012 | Von Behren et al. |
| 8,245,909 B2 | 8/2012 | Pletz et al. |
| 8,249,983 B2 | 8/2012 | Dilip et al. |
| 8,255,323 B1 | 8/2012 | Casey et al. |
| 8,266,031 B2 | 9/2012 | Norris et al. |
| 8,266,205 B2 | 9/2012 | Hammad et al. |
| 8,280,786 B1 | 10/2012 | Weiss et al. |
| 8,280,788 B2 | 10/2012 | Perlman |
| 8,296,228 B1 | 10/2012 | Kloor |
| 8,297,502 B1 | 10/2012 | McGhie et al. |
| 8,301,566 B2 | 10/2012 | Mears |
| 8,332,294 B1 | 12/2012 | Thearling |
| 8,359,531 B2 | 1/2013 | Grandison et al. |
| 8,360,952 B2 | 1/2013 | Wissman et al. |
| 8,364,556 B2 | 1/2013 | Nguyen et al. |
| 8,396,808 B2 | 3/2013 | Greenspan |
| 8,407,136 B2 | 3/2013 | Bard et al. |
| 8,407,142 B1 | 3/2013 | Griggs |
| 8,423,349 B1 | 4/2013 | Huynh et al. |
| 8,473,394 B2 | 6/2013 | Marshall |
| 8,489,761 B2 | 7/2013 | Pope et al. |
| 8,489,894 B2 | 7/2013 | Comrie et al. |
| 8,543,506 B2 | 9/2013 | Grandcolas et al. |
| 8,589,335 B2 | 11/2013 | Smith et al. |
| 8,595,074 B2 | 11/2013 | Sharma et al. |
| 8,595,098 B2 | 11/2013 | Starai et al. |
| 8,625,838 B2 | 1/2014 | Song et al. |
| 8,630,952 B2 | 1/2014 | Menon |
| 8,635,687 B2 | 1/2014 | Binder |
| 8,639,629 B1 | 1/2014 | Hoffman |
| 8,655,310 B1 | 2/2014 | Katzer et al. |
| 8,655,719 B1 | 2/2014 | Li et al. |
| 8,660,926 B1 | 2/2014 | Wehunt et al. |
| 8,666,411 B2 | 3/2014 | Tokgoz et al. |
| 8,682,753 B2 | 3/2014 | Kulathungam |
| 8,682,802 B1 | 3/2014 | Kannanari |
| 8,700,729 B2 | 4/2014 | Dua |
| 8,706,625 B2 | 4/2014 | Vicente et al. |
| 8,712,839 B2 | 4/2014 | Steinert et al. |
| 8,725,601 B2 | 5/2014 | Ledbetter et al. |
| 8,762,211 B2 | 6/2014 | Killian et al. |

(56) References Cited

U.S. PATENT DOCUMENTS

| | | |
|---|---|---|
| 8,762,237 B2 | 6/2014 | Monasterio et al. |
| 8,768,838 B1 | 7/2014 | Hoffman |
| 8,781,882 B1 | 7/2014 | Arboletti et al. |
| 8,781,957 B2 | 7/2014 | Jackson et al. |
| 8,781,963 B1 | 7/2014 | Feng et al. |
| 8,793,190 B2 | 7/2014 | Johns et al. |
| 8,794,972 B2 | 8/2014 | Lopucki |
| 8,851,369 B2 | 10/2014 | Bishop et al. |
| 8,868,458 B1 | 10/2014 | Starbuck et al. |
| 8,868,666 B1 | 10/2014 | Hellwege et al. |
| 8,880,047 B2 | 11/2014 | Konicek et al. |
| 8,887,997 B2 | 11/2014 | Barret et al. |
| 8,910,304 B2 * | 12/2014 | Tsujimoto ......... H04N 1/00222 726/28 |
| 8,924,288 B1 | 12/2014 | Easley et al. |
| 8,925,099 B1 | 12/2014 | Saxe et al. |
| 8,954,839 B2 | 2/2015 | Sharma et al. |
| 9,043,609 B2 | 5/2015 | Calman |
| 9,076,134 B2 | 7/2015 | Grovit et al. |
| 9,105,021 B2 | 8/2015 | Tobin |
| 9,195,984 B1 | 11/2015 | Spector et al. |
| 9,256,871 B2 | 2/2016 | Anderson et al. |
| 9,256,904 B1 | 2/2016 | Haller et al. |
| 9,305,155 B1 | 4/2016 | Vo et al. |
| 9,351,193 B2 | 5/2016 | Raleigh et al. |
| 9,372,849 B2 | 6/2016 | Gluck et al. |
| 9,390,417 B2 | 7/2016 | Song et al. |
| 9,396,491 B2 | 7/2016 | Isaacson et al. |
| 9,444,824 B1 | 9/2016 | Balazs et al. |
| 9,489,694 B2 | 11/2016 | Haller et al. |
| 9,514,456 B2 | 12/2016 | England et al. |
| 9,519,934 B2 | 12/2016 | Calman et al. |
| 9,524,525 B2 | 12/2016 | Manyam et al. |
| 9,558,478 B2 | 1/2017 | Zhao |
| 9,569,473 B1 | 2/2017 | Holenstein et al. |
| 9,569,766 B2 | 2/2017 | Kneen |
| 9,576,318 B2 | 2/2017 | Caldwell |
| 9,646,300 B1 | 5/2017 | Zhou et al. |
| 9,647,855 B2 | 5/2017 | Deibert et al. |
| 9,690,621 B2 | 6/2017 | Kim et al. |
| 9,699,610 B1 | 7/2017 | Chicoine et al. |
| 9,710,566 B2 | 7/2017 | Ainslie et al. |
| 9,740,543 B1 | 8/2017 | Savage et al. |
| 9,760,871 B1 | 9/2017 | Pourfallah et al. |
| 9,775,029 B2 * | 9/2017 | Lopez ................ G06Q 20/326 |
| 9,792,636 B2 | 10/2017 | Milne |
| 9,792,648 B1 | 10/2017 | Haller et al. |
| 9,849,364 B2 | 12/2017 | Tran et al. |
| 9,852,484 B1 | 12/2017 | Fonts et al. |
| 9,853,959 B1 | 12/2017 | Kapczynski et al. |
| 9,858,405 B2 | 1/2018 | Ranadive et al. |
| 9,858,576 B2 | 1/2018 | Song et al. |
| 9,978,046 B2 | 5/2018 | Lefebvre et al. |
| 9,996,837 B2 | 6/2018 | Siddens et al. |
| 10,032,146 B2 | 7/2018 | Caldwell |
| 10,044,501 B1 | 8/2018 | Bradley et al. |
| 10,044,647 B1 | 8/2018 | Karp et al. |
| 10,050,779 B2 | 8/2018 | Alness et al. |
| 10,055,747 B1 | 8/2018 | Sherman et al. |
| 10,096,006 B2 | 10/2018 | Loevenguth et al. |
| 10,096,043 B2 | 10/2018 | Beck et al. |
| 10,097,356 B2 | 10/2018 | Zinder |
| 10,115,155 B1 | 10/2018 | Haller et al. |
| 10,152,756 B2 | 12/2018 | Isaacson et al. |
| 10,157,420 B2 | 12/2018 | Narayana et al. |
| 10,187,483 B2 | 1/2019 | Golub et al. |
| 10,204,327 B2 | 2/2019 | Katzin et al. |
| 10,216,548 B1 | 2/2019 | Zhang et al. |
| 10,250,453 B1 | 4/2019 | Singh et al. |
| 10,275,602 B2 | 4/2019 | Bjorn et al. |
| 10,282,741 B2 | 5/2019 | Yu et al. |
| 10,332,088 B2 | 6/2019 | Groarke |
| 10,359,915 B2 | 7/2019 | Asai |
| 10,373,129 B1 | 8/2019 | James et al. |
| 10,402,817 B1 | 9/2019 | Benkreira et al. |
| 10,402,818 B2 | 9/2019 | Zarakas et al. |
| 10,417,396 B2 | 9/2019 | Bawa et al. |
| 10,423,948 B1 | 9/2019 | Wilson et al. |
| 10,438,290 B1 | 10/2019 | Winklevoss et al. |
| 10,445,152 B1 | 10/2019 | Zhang et al. |
| 10,460,395 B2 | 10/2019 | Grassadonia |
| 10,521,798 B2 | 12/2019 | Song et al. |
| 10,592,882 B1 | 3/2020 | Viswanath et al. |
| 10,614,478 B1 | 4/2020 | Georgi |
| 10,650,448 B1 | 5/2020 | Haller et al. |
| 10,657,503 B1 | 5/2020 | Ebersole et al. |
| 10,673,862 B1 | 6/2020 | Threlkeld |
| 10,742,655 B2 | 8/2020 | Taylor et al. |
| 10,762,478 B1 | 9/2020 | Maeng |
| 10,867,298 B1 | 12/2020 | Duke et al. |
| 10,872,005 B1 | 12/2020 | Killis |
| 10,878,496 B1 | 12/2020 | Duong et al. |
| 10,936,711 B2 | 3/2021 | Jain et al. |
| 10,963,589 B1 | 3/2021 | Fakhraie et al. |
| 10,984,482 B1 | 4/2021 | Thangarajah et al. |
| 10,992,679 B1 | 4/2021 | Fakhraie et al. |
| 11,107,561 B2 | 8/2021 | Matthieu et al. |
| 11,144,903 B2 | 10/2021 | Ready et al. |
| 11,151,529 B1 | 10/2021 | Nolte et al. |
| 11,200,569 B1 | 12/2021 | James et al. |
| 11,386,223 B1 | 7/2022 | Fakhraie et al. |
| 11,507,935 B1 | 11/2022 | Ellis et al. |
| 2001/0001856 A1 | 5/2001 | Gould et al. |
| 2001/0032183 A1 | 10/2001 | Landry |
| 2001/0051920 A1 | 12/2001 | Joao et al. |
| 2001/0056398 A1 | 12/2001 | Scheirer |
| 2002/0016749 A1 | 2/2002 | Borecki et al. |
| 2002/0035539 A1 | 3/2002 | O'Connell |
| 2002/0038289 A1 | 3/2002 | Lawlor et al. |
| 2002/0062249 A1 | 5/2002 | Iannacci |
| 2002/0095386 A1 | 7/2002 | Maritzen et al. |
| 2002/0143655 A1 | 10/2002 | Elston et al. |
| 2002/0169720 A1 | 11/2002 | Wilson et al. |
| 2003/0046246 A1 | 3/2003 | Klumpp et al. |
| 2003/0055786 A1 | 3/2003 | Smith et al. |
| 2003/0061163 A1 | 3/2003 | Durfield |
| 2003/0097331 A1 | 5/2003 | Cohen |
| 2003/0172040 A1 | 9/2003 | Kemper et al. |
| 2003/0195847 A1 | 10/2003 | Felger |
| 2003/0200179 A1 | 10/2003 | Kwan |
| 2003/0216997 A1 | 11/2003 | Cohen |
| 2003/0217001 A1 | 11/2003 | McQuaide et al. |
| 2004/0054564 A1 | 3/2004 | Fonseca et al. |
| 2004/0054591 A1 | 3/2004 | Spaeth et al. |
| 2004/0073903 A1 | 4/2004 | Melchione et al. |
| 2004/0078325 A1 | 4/2004 | O'Connor |
| 2004/0090825 A1 | 5/2004 | Nam et al. |
| 2004/0128243 A1 | 7/2004 | Kavanagh et al. |
| 2004/0143632 A1 | 7/2004 | McCarty |
| 2004/0148259 A1 | 7/2004 | Reiners et al. |
| 2004/0178907 A1 | 9/2004 | Cordoba |
| 2004/0225606 A1 | 11/2004 | Nguyen et al. |
| 2004/0249710 A1 | 12/2004 | Smith et al. |
| 2004/0249753 A1 | 12/2004 | Blinn et al. |
| 2004/0263901 A1 | 12/2004 | Critelli et al. |
| 2005/0010483 A1 | 1/2005 | Ling |
| 2005/0014705 A1 | 1/2005 | Cheng et al. |
| 2005/0027431 A1 | 2/2005 | Todoroki et al. |
| 2005/0039041 A1 | 2/2005 | Shaw et al. |
| 2005/0060233 A1 | 3/2005 | Bonalle et al. |
| 2005/0114705 A1 | 5/2005 | Reshef et al. |
| 2005/0131815 A1 | 6/2005 | Fung et al. |
| 2005/0171898 A1 | 8/2005 | Bishop et al. |
| 2005/0199714 A1 | 9/2005 | Brandt et al. |
| 2005/0205662 A1 | 9/2005 | Nelson |
| 2005/0224587 A1 | 10/2005 | Shin et al. |
| 2005/0228750 A1 | 10/2005 | Olliphant et al. |
| 2005/0273431 A1 | 12/2005 | Abel et al. |
| 2006/0046742 A1 | 3/2006 | Zhang |
| 2006/0046745 A1 | 3/2006 | Davidson |
| 2006/0059110 A1 | 3/2006 | Madhok et al. |
| 2006/0178986 A1 | 8/2006 | Giordano et al. |
| 2006/0184456 A1 | 8/2006 | De Janasz |
| 2006/0190374 A1 | 8/2006 | Sher |

(56) References Cited

U.S. PATENT DOCUMENTS

| | | |
|---|---|---|
| 2006/0202012 A1 | 9/2006 | Grano et al. |
| 2006/0206912 A1 | 9/2006 | Klarfeld et al. |
| 2006/0211493 A1 | 9/2006 | Walker et al. |
| 2006/0235795 A1 | 10/2006 | Johnson et al. |
| 2006/0278698 A1 | 12/2006 | Lovett |
| 2007/0051797 A1 | 3/2007 | Randolph-Wall et al. |
| 2007/0083463 A1 | 4/2007 | Kraft |
| 2007/0100773 A1 | 5/2007 | Wallach |
| 2007/0112673 A1 | 5/2007 | Protti |
| 2007/0123305 A1 | 5/2007 | Chen et al. |
| 2007/0143831 A1 | 6/2007 | Pearson et al. |
| 2007/0203836 A1 | 8/2007 | Dodin |
| 2007/0214030 A1 | 9/2007 | Shear et al. |
| 2007/0226086 A1 | 9/2007 | Bauman et al. |
| 2007/0255653 A1 | 11/2007 | Tumminaro et al. |
| 2007/0266257 A1 | 11/2007 | Camaisa et al. |
| 2008/0000052 A1 | 1/2008 | Hong et al. |
| 2008/0005037 A1 | 1/2008 | Hammad et al. |
| 2008/0017702 A1 | 1/2008 | Little et al. |
| 2008/0021787 A1 | 1/2008 | Mackouse |
| 2008/0029608 A1 | 2/2008 | Kellum et al. |
| 2008/0052226 A1 | 2/2008 | Agarwal et al. |
| 2008/0066185 A1 | 3/2008 | Lester et al. |
| 2008/0086398 A1 | 4/2008 | Parlotto |
| 2008/0115104 A1 | 5/2008 | Quinn |
| 2008/0149706 A1 | 6/2008 | Brown et al. |
| 2008/0154772 A1 | 6/2008 | Carlson |
| 2008/0170156 A1 | 7/2008 | Kim |
| 2008/0191878 A1 | 8/2008 | Abraham |
| 2008/0208726 A1 | 8/2008 | Tsantes et al. |
| 2008/0226142 A1 | 9/2008 | Pennella et al. |
| 2008/0229383 A1 | 9/2008 | Buss et al. |
| 2008/0244724 A1 | 10/2008 | Choe et al. |
| 2008/0260119 A1 | 10/2008 | Marathe et al. |
| 2008/0283590 A1 | 11/2008 | Oder et al. |
| 2008/0301043 A1 | 12/2008 | Unbehagen |
| 2008/0319889 A1 | 12/2008 | Hammad et al. |
| 2009/0005269 A1 | 1/2009 | Martin et al. |
| 2009/0007231 A1 | 1/2009 | Kaiser et al. |
| 2009/0012898 A1 | 1/2009 | Sharma et al. |
| 2009/0055269 A1 | 2/2009 | Baron |
| 2009/0055642 A1 | 2/2009 | Myers et al. |
| 2009/0089113 A1 | 4/2009 | Rousso et al. |
| 2009/0112763 A1 | 4/2009 | Scipioni et al. |
| 2009/0132351 A1 | 5/2009 | Gibson |
| 2009/0164324 A1 | 6/2009 | Bishop et al. |
| 2009/0205014 A1 | 8/2009 | Doman et al. |
| 2009/0228381 A1 | 9/2009 | Mik et al. |
| 2009/0254447 A1 | 10/2009 | Blades |
| 2009/0254971 A1 | 10/2009 | Herz et al. |
| 2009/0287603 A1 | 11/2009 | Lamar et al. |
| 2009/0292599 A1 | 11/2009 | Rampell et al. |
| 2009/0319638 A1 | 12/2009 | Faith et al. |
| 2010/0036769 A1 | 2/2010 | Winters et al. |
| 2010/0036906 A1 | 2/2010 | Song et al. |
| 2010/0063906 A1 | 3/2010 | Nelsen et al. |
| 2010/0082445 A1 | 4/2010 | Hodge et al. |
| 2010/0082487 A1 | 4/2010 | Nelsen |
| 2010/0094735 A1 | 4/2010 | Reynolds et al. |
| 2010/0100470 A1 | 4/2010 | Buchanan et al. |
| 2010/0114768 A1 | 5/2010 | Duke et al. |
| 2010/0132049 A1 | 5/2010 | Vernal et al. |
| 2010/0199098 A1 | 8/2010 | King |
| 2010/0228671 A1 | 9/2010 | Patterson |
| 2010/0274691 A1 | 10/2010 | Hammad et al. |
| 2010/0276484 A1 | 11/2010 | Banerjee et al. |
| 2010/0312700 A1 | 12/2010 | Coulter et al. |
| 2010/0327056 A1 | 12/2010 | Yoshikawa et al. |
| 2011/0023129 A1 | 1/2011 | Vernal et al. |
| 2011/0035288 A1 | 2/2011 | Clyne |
| 2011/0035318 A1 | 2/2011 | Hargrove et al. |
| 2011/0035596 A1 | 2/2011 | Attia et al. |
| 2011/0078010 A1 | 3/2011 | Postrel |
| 2011/0106698 A1 | 5/2011 | Isaacson et al. |
| 2011/0162057 A1 | 6/2011 | Gottumukkala et al. |
| 2011/0172837 A1 | 7/2011 | Forbes, Jr. |
| 2011/0176010 A1 | 7/2011 | Houjou et al. |
| 2011/0178929 A1 | 7/2011 | Durkin et al. |
| 2011/0191177 A1 | 8/2011 | Blackhurst et al. |
| 2011/0191239 A1 | 8/2011 | Blackhurst et al. |
| 2011/0196791 A1 | 8/2011 | Dominguez |
| 2011/0202462 A1 | 8/2011 | Keenan |
| 2011/0218849 A1 | 9/2011 | Rutigliano et al. |
| 2011/0247055 A1 | 10/2011 | Guo et al. |
| 2011/0276479 A1 | 11/2011 | Thomas |
| 2011/0307826 A1 | 12/2011 | Rivera et al. |
| 2011/0320246 A1 | 12/2011 | Tietzen et al. |
| 2012/0024946 A1 | 2/2012 | Tullis et al. |
| 2012/0030006 A1 | 2/2012 | Yoder et al. |
| 2012/0030109 A1 | 2/2012 | Dooley Maley et al. |
| 2012/0041881 A1 | 2/2012 | Basu et al. |
| 2012/0046994 A1 | 2/2012 | Reisman |
| 2012/0047072 A1 | 2/2012 | Larkin |
| 2012/0095819 A1 | 4/2012 | Li |
| 2012/0096534 A1 | 4/2012 | Boulos et al. |
| 2012/0099780 A1 | 4/2012 | Smith et al. |
| 2012/0101938 A1 | 4/2012 | Kasower |
| 2012/0117467 A1 | 5/2012 | Maloney et al. |
| 2012/0117476 A1 | 5/2012 | Siegrist et al. |
| 2012/0123841 A1 | 5/2012 | Taveau et al. |
| 2012/0123933 A1 | 5/2012 | Abel et al. |
| 2012/0124658 A1 | 5/2012 | Brudnicki et al. |
| 2012/0158590 A1 | 6/2012 | Salonen |
| 2012/0173387 A1 | 7/2012 | Talker et al. |
| 2012/0197691 A1 | 8/2012 | Grigg et al. |
| 2012/0214577 A1 | 8/2012 | Petersen et al. |
| 2012/0227094 A1 | 9/2012 | Begen et al. |
| 2012/0233013 A1 | 9/2012 | Smith |
| 2012/0239417 A1 | 9/2012 | Pourfallah et al. |
| 2012/0239479 A1 | 9/2012 | Amaro et al. |
| 2012/0239670 A1 | 9/2012 | Horn et al. |
| 2012/0240235 A1 | 9/2012 | Moore |
| 2012/0246122 A1 | 9/2012 | Short et al. |
| 2012/0253852 A1 | 10/2012 | Pourfallah et al. |
| 2012/0254038 A1 | 10/2012 | Mullen |
| 2012/0259782 A1 | 10/2012 | Hammad |
| 2012/0265682 A1 | 10/2012 | Menon |
| 2012/0265685 A1 | 10/2012 | Brudnicki et al. |
| 2012/0270522 A1 | 10/2012 | Laudermilch et al. |
| 2012/0296725 A1 | 11/2012 | Dessert et al. |
| 2012/0296831 A1 | 11/2012 | Carrott |
| 2012/0310760 A1 | 12/2012 | Phillips et al. |
| 2012/0317036 A1 | 12/2012 | Bower et al. |
| 2013/0006847 A1 | 1/2013 | Hammad et al. |
| 2013/0031006 A1 | 1/2013 | McCullagh et al. |
| 2013/0046607 A1 | 2/2013 | Granville, III |
| 2013/0046690 A1 | 2/2013 | Calman et al. |
| 2013/0055378 A1 | 2/2013 | Chang et al. |
| 2013/0073388 A1 | 3/2013 | Heath |
| 2013/0080219 A1 | 3/2013 | Royyuru et al. |
| 2013/0090998 A1 | 4/2013 | Shimogori |
| 2013/0091452 A1 | 4/2013 | Sorden et al. |
| 2013/0103391 A1 | 4/2013 | Millmore et al. |
| 2013/0117696 A1 | 5/2013 | Robertson et al. |
| 2013/0132854 A1 | 5/2013 | Raleigh et al. |
| 2013/0151405 A1 | 6/2013 | Head et al. |
| 2013/0159178 A1 | 6/2013 | Colon et al. |
| 2013/0166332 A1 | 6/2013 | Hammad |
| 2013/0173402 A1 | 7/2013 | Young et al. |
| 2013/0174244 A1 | 7/2013 | Taveau et al. |
| 2013/0191213 A1 | 7/2013 | Beck et al. |
| 2013/0204894 A1 | 8/2013 | Faith |
| 2013/0212666 A1 | 8/2013 | Mattsson et al. |
| 2013/0218649 A1 | 8/2013 | Beal |
| 2013/0218758 A1 | 8/2013 | Koenigsbrueck et al. |
| 2013/0226813 A1 | 8/2013 | Voltz |
| 2013/0240618 A1 | 9/2013 | Hall |
| 2013/0246258 A1 | 9/2013 | Dessert |
| 2013/0246272 A1 | 9/2013 | Kirsch |
| 2013/0254079 A1 | 9/2013 | Murali |
| 2013/0254115 A1 | 9/2013 | Pasa et al. |
| 2013/0282542 A1 | 10/2013 | White |
| 2013/0297400 A1 | 11/2013 | Nagarajan et al. |
| 2013/0301392 A1 | 11/2013 | Zhao |

(56) References Cited

U.S. PATENT DOCUMENTS

| | | |
|---|---|---|
| 2013/0317893 A1 | 11/2013 | Nelson et al. |
| 2013/0332256 A1 | 12/2013 | Faith et al. |
| 2013/0339124 A1 | 12/2013 | Postrel |
| 2013/0346302 A1 | 12/2013 | Purves et al. |
| 2013/0346306 A1 | 12/2013 | Kopp |
| 2013/0346310 A1 | 12/2013 | Burger et al. |
| 2014/0006209 A1 | 1/2014 | Groarke |
| 2014/0019352 A1 | 1/2014 | Shrivastava |
| 2014/0024354 A1 | 1/2014 | Haik et al. |
| 2014/0026193 A1 | 1/2014 | Saxman et al. |
| 2014/0032410 A1 | 1/2014 | Georgiev et al. |
| 2014/0032419 A1 | 1/2014 | Anderson et al. |
| 2014/0032723 A1 | 1/2014 | Nema |
| 2014/0040134 A1 | 2/2014 | Ciurea |
| 2014/0040144 A1 | 2/2014 | Plomske et al. |
| 2014/0046827 A1 | 2/2014 | Hochstatter et al. |
| 2014/0053069 A1 | 2/2014 | Yan |
| 2014/0058912 A1 | 2/2014 | Bajaj |
| 2014/0067503 A1 | 3/2014 | Ebarle Grecsek et al. |
| 2014/0067683 A1 | 3/2014 | Varadarajan |
| 2014/0068030 A1 | 3/2014 | Chambers et al. |
| 2014/0076967 A1 | 3/2014 | Pushkin et al. |
| 2014/0081736 A1 | 3/2014 | Blackhurst et al. |
| 2014/0108140 A1 | 4/2014 | Crawford |
| 2014/0108260 A1 | 4/2014 | Poole et al. |
| 2014/0108263 A1 | 4/2014 | Ortiz et al. |
| 2014/0114780 A1 | 4/2014 | Menefee et al. |
| 2014/0114855 A1 | 4/2014 | Bajaj et al. |
| 2014/0122328 A1 | 5/2014 | Grigg |
| 2014/0123312 A1 | 5/2014 | Marcotte |
| 2014/0129357 A1 | 5/2014 | Goodwin |
| 2014/0129448 A1 | 5/2014 | Aiglstorfer |
| 2014/0136419 A1 | 5/2014 | Kiyohara |
| 2014/0143886 A1 | 5/2014 | Eversoll et al. |
| 2014/0149198 A1 | 5/2014 | Kim et al. |
| 2014/0149293 A1 | 5/2014 | Laracey |
| 2014/0149368 A1 | 5/2014 | Lee et al. |
| 2014/0162598 A1 | 6/2014 | Villa-Real |
| 2014/0164220 A1 | 6/2014 | Desai et al. |
| 2014/0172576 A1 | 6/2014 | Spears et al. |
| 2014/0172707 A1 | 6/2014 | Kuntagod et al. |
| 2014/0180826 A1 | 6/2014 | Boal |
| 2014/0180854 A1 | 6/2014 | Bryant, II |
| 2014/0198054 A1 | 7/2014 | Sharma et al. |
| 2014/0200957 A1 | 7/2014 | Biggs |
| 2014/0207672 A1 | 7/2014 | Kelley |
| 2014/0236792 A1 | 8/2014 | Pant et al. |
| 2014/0237236 A1 | 8/2014 | Kalinichenko et al. |
| 2014/0248852 A1 | 9/2014 | Raleigh et al. |
| 2014/0250002 A1 | 9/2014 | Isaacson et al. |
| 2014/0258104 A1 | 9/2014 | Harnisch |
| 2014/0258109 A1 | 9/2014 | Jiang et al. |
| 2014/0258110 A1 | 9/2014 | Davis et al. |
| 2014/0278538 A1 | 9/2014 | Smith et al. |
| 2014/0279309 A1 | 9/2014 | Cowen et al. |
| 2014/0279474 A1 | 9/2014 | Evans et al. |
| 2014/0279551 A1 | 9/2014 | Samid |
| 2014/0279559 A1 | 9/2014 | Smith et al. |
| 2014/0282852 A1 | 9/2014 | Vestevich |
| 2014/0297438 A1 | 10/2014 | Dua |
| 2014/0306833 A1 | 10/2014 | Ricci |
| 2014/0324527 A1 | 10/2014 | Kulkarni et al. |
| 2014/0337188 A1 | 11/2014 | Bennett et al. |
| 2014/0337215 A1 | 11/2014 | Howe |
| 2014/0344149 A1 | 11/2014 | Campos |
| 2014/0344153 A1 | 11/2014 | Raj et al. |
| 2014/0344877 A1 | 11/2014 | Ohmata et al. |
| 2014/0357233 A1 | 12/2014 | Maximo et al. |
| 2014/0365291 A1 | 12/2014 | Shvarts |
| 2014/0372308 A1 | 12/2014 | Sheets |
| 2014/0379575 A1 | 12/2014 | Rogan |
| 2015/0019443 A1 | 1/2015 | Sheets et al. |
| 2015/0019944 A1 | 1/2015 | Kalgi |
| 2015/0026026 A1 | 1/2015 | Calman et al. |
| 2015/0026049 A1 | 1/2015 | Theurer et al. |
| 2015/0026057 A1 | 1/2015 | Calman et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0039457 A1 | 2/2015 | Jacobs et al. |
| 2015/0039496 A1 | 2/2015 | Shuster |
| 2015/0046338 A1 | 2/2015 | Laxminarayanan et al. |
| 2015/0046339 A1 | 2/2015 | Wong et al. |
| 2015/0066768 A1 | 3/2015 | Williamson et al. |
| 2015/0070132 A1 | 3/2015 | Candelore |
| 2015/0073989 A1 | 3/2015 | Green et al. |
| 2015/0079932 A1 | 3/2015 | Zelinka et al. |
| 2015/0081349 A1 | 3/2015 | Johndrow et al. |
| 2015/0082042 A1 | 3/2015 | Hoornaert et al. |
| 2015/0088633 A1 | 3/2015 | Salmon et al. |
| 2015/0088756 A1 | 3/2015 | Makhotin et al. |
| 2015/0095238 A1 | 4/2015 | Khan et al. |
| 2015/0095999 A1 | 4/2015 | Toth |
| 2015/0096039 A1 | 4/2015 | Mattsson et al. |
| 2015/0100477 A1 | 4/2015 | Salama et al. |
| 2015/0100495 A1 | 4/2015 | Salama et al. |
| 2015/0106239 A1 | 4/2015 | Gaddam et al. |
| 2015/0112870 A1 | 4/2015 | Nagasundaram et al. |
| 2015/0121500 A1 | 4/2015 | Venkatanaranappa et al. |
| 2015/0127524 A1 | 5/2015 | Jacobs et al. |
| 2015/0127547 A1 | 5/2015 | Powell et al. |
| 2015/0128215 A1 | 5/2015 | Son et al. |
| 2015/0132984 A1 | 5/2015 | Kim et al. |
| 2015/0134700 A1 | 5/2015 | Macklem et al. |
| 2015/0142673 A1 | 5/2015 | Nelsen et al. |
| 2015/0149272 A1 | 5/2015 | Salmon et al. |
| 2015/0149357 A1 | 5/2015 | Ioannidis et al. |
| 2015/0154595 A1 | 6/2015 | Collinge et al. |
| 2015/0161643 A1 | 6/2015 | Randell et al. |
| 2015/0178724 A1 | 6/2015 | Ngo et al. |
| 2015/0180836 A1 | 6/2015 | Wong et al. |
| 2015/0186856 A1 | 7/2015 | Weiss et al. |
| 2015/0193639 A1 | 7/2015 | Esposito et al. |
| 2015/0193764 A1 | 7/2015 | Haggerty et al. |
| 2015/0193866 A1 | 7/2015 | Van Heerden et al. |
| 2015/0199679 A1 | 7/2015 | Palanisamy et al. |
| 2015/0199689 A1 | 7/2015 | Kumnick et al. |
| 2015/0200495 A1 | 7/2015 | Yu et al. |
| 2015/0213435 A1 | 7/2015 | Douglas et al. |
| 2015/0220917 A1 | 8/2015 | Aabye et al. |
| 2015/0220999 A1 | 8/2015 | Thornton et al. |
| 2015/0221149 A1 | 8/2015 | Main et al. |
| 2015/0229622 A1 | 8/2015 | Grigg et al. |
| 2015/0242853 A1 | 8/2015 | Powell |
| 2015/0248405 A1 | 9/2015 | Rudich et al. |
| 2015/0254635 A1 | 9/2015 | Bondesen et al. |
| 2015/0254638 A1 | 9/2015 | Bondesen et al. |
| 2015/0254646 A1 | 9/2015 | Harkey et al. |
| 2015/0254647 A1 | 9/2015 | Bondesen et al. |
| 2015/0254655 A1 | 9/2015 | Bondesen et al. |
| 2015/0254656 A1 | 9/2015 | Bondesen et al. |
| 2015/0262182 A1 | 9/2015 | Gervais et al. |
| 2015/0269566 A1 | 9/2015 | Gaddam et al. |
| 2015/0277712 A1 | 10/2015 | Ratcliffe et al. |
| 2015/0286834 A1 | 10/2015 | Ohtani et al. |
| 2015/0287133 A1 | 10/2015 | Marlov et al. |
| 2015/0295906 A1 | 10/2015 | Ufford et al. |
| 2015/0312038 A1 | 10/2015 | Palanisamy |
| 2015/0319158 A1 | 11/2015 | Kumnick |
| 2015/0319198 A1 | 11/2015 | Gupta et al. |
| 2015/0324592 A1 | 11/2015 | Dutta |
| 2015/0332067 A1 | 11/2015 | Gorod |
| 2015/0339663 A1 | 11/2015 | Lopreiato et al. |
| 2015/0339664 A1 | 11/2015 | Wong et al. |
| 2015/0348083 A1 | 12/2015 | Brill et al. |
| 2015/0371221 A1 | 12/2015 | Wardman |
| 2015/0372999 A1 | 12/2015 | Pi-Sunyer |
| 2015/0379508 A1 | 12/2015 | Van |
| 2016/0004741 A1 | 1/2016 | Johnson et al. |
| 2016/0026997 A1 | 1/2016 | Tsui et al. |
| 2016/0028550 A1 | 1/2016 | Gaddam et al. |
| 2016/0028735 A1 | 1/2016 | Francis et al. |
| 2016/0034906 A1 | 2/2016 | Stopic et al. |
| 2016/0036790 A1 | 2/2016 | Shastry et al. |

(56) References Cited

U.S. PATENT DOCUMENTS

| | | |
|---|---|---|
| 2016/0042381 A1 | 2/2016 | Braine et al. |
| 2016/0063497 A1 | 3/2016 | Grant, IV |
| 2016/0065370 A1 | 3/2016 | Le Saint et al. |
| 2016/0078428 A1 | 3/2016 | Moser et al. |
| 2016/0080403 A1 | 3/2016 | Cunningham et al. |
| 2016/0086222 A1 | 3/2016 | Kurapati |
| 2016/0092696 A1 | 3/2016 | Guglani et al. |
| 2016/0092870 A1 | 3/2016 | Salama et al. |
| 2016/0092872 A1 | 3/2016 | Prakash et al. |
| 2016/0092874 A1 | 3/2016 | O'Regan et al. |
| 2016/0098577 A1 | 4/2016 | Lacey et al. |
| 2016/0098692 A1 | 4/2016 | Johnson et al. |
| 2016/0109954 A1 | 4/2016 | Harris et al. |
| 2016/0119296 A1 | 4/2016 | Laxminarayanan et al. |
| 2016/0125405 A1 | 5/2016 | Alterman et al. |
| 2016/0125409 A1 | 5/2016 | Meredith et al. |
| 2016/0127892 A1 | 5/2016 | Huang et al. |
| 2016/0132918 A1 | 5/2016 | Thomas |
| 2016/0140221 A1 | 5/2016 | Park et al. |
| 2016/0140541 A1 | 5/2016 | Pearson et al. |
| 2016/0149875 A1 | 5/2016 | Li et al. |
| 2016/0155156 A1 | 6/2016 | Gopal et al. |
| 2016/0171483 A1 | 6/2016 | Luoma et al. |
| 2016/0173483 A1 | 6/2016 | Wong et al. |
| 2016/0180302 A1 | 6/2016 | Bagot, Jr. |
| 2016/0189121 A1 | 6/2016 | Best et al. |
| 2016/0217461 A1 | 7/2016 | Gaddam et al. |
| 2016/0232600 A1 | 8/2016 | Purves |
| 2016/0239437 A1 | 8/2016 | Le et al. |
| 2016/0239835 A1 | 8/2016 | Marsyla |
| 2016/0239840 A1 | 8/2016 | Preibisch |
| 2016/0260084 A1 | 9/2016 | Main et al. |
| 2016/0260176 A1 | 9/2016 | Bernard et al. |
| 2016/0267467 A1 | 9/2016 | Rutherford et al. |
| 2016/0267480 A1 | 9/2016 | Metral |
| 2016/0292673 A1 | 10/2016 | Chandrasekaran |
| 2016/0294879 A1 | 10/2016 | Kirsch |
| 2016/0307229 A1 | 10/2016 | Balasubramanian et al. |
| 2016/0314458 A1 | 10/2016 | Douglas et al. |
| 2016/0321643 A1 | 11/2016 | Beck et al. |
| 2016/0321669 A1 | 11/2016 | Beck et al. |
| 2016/0328522 A1 | 11/2016 | Howley |
| 2016/0328577 A1 | 11/2016 | Howley |
| 2016/0358163 A1 | 12/2016 | Kumar et al. |
| 2016/0371471 A1 | 12/2016 | Patton et al. |
| 2016/0373458 A1 | 12/2016 | Moreton et al. |
| 2016/0379211 A1 | 12/2016 | Hoyos et al. |
| 2017/0004506 A1 | 1/2017 | Steinman et al. |
| 2017/0004590 A1 | 1/2017 | Gluhovsky |
| 2017/0011215 A1 | 1/2017 | Poiesz et al. |
| 2017/0011389 A1 | 1/2017 | McCandless et al. |
| 2017/0011450 A1 | 1/2017 | Frager et al. |
| 2017/0018029 A1 | 1/2017 | Eiriz et al. |
| 2017/0024393 A1 | 1/2017 | Choksi et al. |
| 2017/0046679 A1 | 2/2017 | Gotlieb et al. |
| 2017/0068954 A1 | 3/2017 | Hockey et al. |
| 2017/0070484 A1 | 3/2017 | Kruse et al. |
| 2017/0078299 A1 | 3/2017 | Castinado et al. |
| 2017/0078303 A1 | 3/2017 | Wu |
| 2017/0091759 A1 | 3/2017 | Selfridge et al. |
| 2017/0103388 A1 | 4/2017 | Pillai et al. |
| 2017/0132633 A1 | 5/2017 | Whitehouse |
| 2017/0147631 A1 | 5/2017 | Nair et al. |
| 2017/0161724 A1 | 6/2017 | Lau |
| 2017/0161973 A1 | 6/2017 | Katta et al. |
| 2017/0201850 A1 | 7/2017 | Raleigh et al. |
| 2017/0237554 A1 | 8/2017 | Jacobs et al. |
| 2017/0249478 A1 | 8/2017 | Lovin |
| 2017/0344991 A1 | 11/2017 | Mark et al. |
| 2017/0352028 A1 | 12/2017 | Vridhachalam et al. |
| 2017/0364898 A1 | 12/2017 | Ach et al. |
| 2017/0366348 A1 | 12/2017 | Weimer |
| 2018/0005323 A1 | 1/2018 | Grassadonia |
| 2018/0006821 A1 | 1/2018 | Kinagi |
| 2018/0025145 A1 | 1/2018 | Morgner et al. |
| 2018/0053200 A1 | 2/2018 | Cronin et al. |
| 2018/0075440 A1 | 3/2018 | Beck et al. |
| 2018/0088909 A1 | 3/2018 | Baratta et al. |
| 2018/0096752 A1 | 4/2018 | Ovalle |
| 2018/0121913 A1 | 5/2018 | Unnerstall et al. |
| 2018/0137560 A1 | 5/2018 | Chopra et al. |
| 2018/0158137 A1 | 6/2018 | Tsantes et al. |
| 2018/0174148 A1 | 6/2018 | Selvarajan |
| 2018/0247302 A1 | 8/2018 | Armstrong et al. |
| 2018/0254898 A1 | 9/2018 | Sprague et al. |
| 2018/0268382 A1 | 9/2018 | Wasserman |
| 2018/0268408 A1 | 9/2018 | Botros et al. |
| 2018/0270363 A1 | 9/2018 | Guday et al. |
| 2018/0276628 A1 | 9/2018 | Radiotis et al. |
| 2018/0293554 A1 | 10/2018 | Johnson |
| 2018/0331835 A1 | 11/2018 | Jackson |
| 2018/0349922 A1 | 12/2018 | Carlson et al. |
| 2018/0357440 A1 | 12/2018 | Brady et al. |
| 2018/0365753 A1 | 12/2018 | Fredrich et al. |
| 2018/0373891 A1 | 12/2018 | Barday et al. |
| 2019/0007381 A1 | 1/2019 | Isaacson et al. |
| 2019/0095898 A1 | 3/2019 | Bhatia |
| 2019/0164221 A1 | 5/2019 | Hill et al. |
| 2019/0171831 A1 | 6/2019 | Xin |
| 2019/0197501 A1 | 6/2019 | Senci et al. |
| 2019/0220834 A1 | 7/2019 | Moshal et al. |
| 2019/0228173 A1 | 7/2019 | Gupta et al. |
| 2019/0228428 A1 | 7/2019 | Bruner et al. |
| 2019/0228430 A1 | 7/2019 | Givol et al. |
| 2019/0244214 A1 | 8/2019 | Flores et al. |
| 2019/0295069 A1 | 9/2019 | Pala et al. |
| 2019/0318122 A1 | 10/2019 | Hockey et al. |
| 2019/0318424 A1 | 10/2019 | McWilliams |
| 2019/0325161 A1 | 10/2019 | Zavesky et al. |
| 2019/0332802 A1 | 10/2019 | Barday et al. |
| 2019/0333061 A1 | 10/2019 | Jackson et al. |
| 2019/0347442 A1 | 11/2019 | Marlin et al. |
| 2019/0354979 A1 | 11/2019 | Crawford |
| 2019/0356641 A1 | 11/2019 | Isaacson et al. |
| 2019/0362069 A1 | 11/2019 | Park et al. |
| 2019/0369845 A1 | 12/2019 | Rucker |
| 2019/0370798 A1 | 12/2019 | Hu et al. |
| 2019/0378182 A1 | 12/2019 | Weinflash et al. |
| 2019/0392443 A1 | 12/2019 | Piparsaniya et al. |
| 2020/0005283 A1 | 1/2020 | Zimmerman et al. |
| 2020/0005347 A1 | 1/2020 | Boal |
| 2020/0074552 A1 | 3/2020 | Shier et al. |
| 2020/0076601 A1 | 3/2020 | Jafari |
| 2020/0090179 A1 | 3/2020 | Song et al. |
| 2020/0118114 A1 | 4/2020 | Benkreira et al. |
| 2020/0118132 A1 | 4/2020 | Schmidt et al. |
| 2020/0118133 A1 | 4/2020 | Schmidt et al. |
| 2020/0286057 A1* | 9/2020 | Desai .................. G06Q 20/405 |
| 2020/0286076 A1 | 9/2020 | Zhu et al. |
| 2020/0380514 A1 | 12/2020 | Crofts |
| 2021/0012326 A1 | 1/2021 | Maxwell Zelocchi |
| 2021/0027300 A1 | 1/2021 | Chetia et al. |
| 2021/0035072 A1 | 2/2021 | Awasthi |
| 2021/0124760 A1 | 4/2021 | Klein et al. |
| 2021/0217002 A1 | 7/2021 | Basu et al. |
| 2021/0233170 A1 | 7/2021 | Cadet |
| 2021/0258169 A1 | 8/2021 | Basu et al. |
| 2021/0303335 A1 | 9/2021 | Foreman et al. |
| 2021/0350343 A1 | 11/2021 | Gaur et al. |
| 2021/0350458 A1 | 11/2021 | Gaur et al. |
| 2022/0029815 A1 | 1/2022 | Basu et al. |
| 2022/0292496 A1 | 9/2022 | Yan |
| 2022/0294630 A1 | 9/2022 | Collen |
| 2023/0036439 A1 | 2/2023 | Olson et al. |
| 2023/0070625 A1 | 3/2023 | Gaur et al. |
| 2023/0206329 A1 | 6/2023 | Cella et al. |
| 2023/0214925 A1 | 7/2023 | Cella et al. |
| 2024/0265405 A1 | 8/2024 | Kramme et al. |

FOREIGN PATENT DOCUMENTS

| | | |
|---|---|---|
| AU | 2011268420 A1 | 12/2012 |
| AU | 2015255170 A1 | 11/2015 |
| AU | 2016285320 A1 | 1/2017 |

(56) References Cited

FOREIGN PATENT DOCUMENTS

| | | | |
|---|---|---|---|
| CA | 2369296 | A1 | 10/2000 |
| CA | 2600101 | A1 | 2/2008 |
| CA | 2751554 | A1 | 8/2010 |
| CA | 2736690 | A1 | 10/2011 |
| CA | 3014995 | C | 8/2017 |
| CN | 1183841 | A | 6/1998 |
| CN | 1353842 | A | 6/2002 |
| CN | 101303717 | A | 11/2008 |
| CN | 101303717 | B | 11/2008 |
| CN | 102346896 | A | 2/2012 |
| CN | 102498497 | A | 6/2012 |
| CN | 102804219 | A | 11/2012 |
| CN | 103635920 | A | 3/2014 |
| CN | 103797500 | A | 5/2014 |
| CN | 103843024 | A | 6/2014 |
| CN | 104106276 | B | 10/2014 |
| CN | 102648476 | B | 3/2016 |
| CN | 103413231 | B | 10/2017 |
| CN | 107230049 | A | 10/2017 |
| CN | 107230070 | A | 10/2017 |
| EP | 1 259 947 | A2 | 11/2002 |
| EP | 1 770 628 | A2 | 4/2007 |
| EP | 3 073 670 | B1 | 9/2016 |
| GB | 0 441 156 | | 1/1936 |
| GB | 2 441 156 | A | 2/2008 |
| KR | 20160015375 | A | 2/2016 |
| WO | WO-90/13096 | A1 | 11/1990 |
| WO | WO-00/72245 | A1 | 11/2000 |
| WO | WO-03/038551 | A2 | 5/2003 |
| WO | WO-2004/081893 | A1 | 9/2004 |
| WO | WO-2004/090825 | A1 | 10/2004 |
| WO | WO-2005/116886 | A2 | 12/2005 |
| WO | WO-2009/151839 | A1 | 12/2009 |
| WO | WO-2011/017613 | A2 | 2/2011 |
| WO | WO-2011/053404 | A1 | 5/2011 |
| WO | WO-2012/054148 | A1 | 4/2012 |
| WO | WO-2012/131430 | A1 | 10/2012 |
| WO | WO-2012/150602 | A1 | 11/2012 |
| WO | WO-2013/044175 | A1 | 3/2013 |
| WO | WO-2013/075071 | A1 | 5/2013 |
| WO | WO-2013/082190 | A1 | 6/2013 |
| WO | WO-2015/036817 | A1 | 3/2015 |
| WO | WO-2015/103443 | A1 | 7/2015 |
| WO | WO-2015/135131 | A1 | 9/2015 |
| WO | WO-2016/015054 | A1 | 1/2016 |
| WO | WO-2016/025291 | A1 | 2/2016 |
| WO | WO-2017/035399 | A1 | 3/2017 |
| WO | WO-2018/005635 | A1 | 1/2018 |
| WO | WO-2022/154789 | A1 | 7/2022 |

OTHER PUBLICATIONS

"The Bitcoin Lightening Network: Scalable Off-Chain Instant Payments," by Joseph Poon; and Thaddeus Dryia. Jan. 14, 2016. (Year: 2016).

Are Central Bank Digital Currencies (CBDCs) the money of tomorrow (Year: 2020).

NPL Search Terms (Year: 2024).

Shehnaz Ahmed, Private partners could help RBI run a digital currency. (Year: 2021).

Shiravale, et al., Blockchain Technology: A Novel Approach in Information Security Research, IEEE 2018 (Year: 2018), 4 pps.

Yang, et al., Impact of Bitcoin's Distributed Structure on the Construction of the Central Bank's Digital Currency System IEEE, 2020 (Year: 2020), 4 pps.

Hinze et al.; Event-Based Applications and Enabling Technologies. https://www.researchgate.net/profile/Annika-Hinze/publication/220796268_Event-based_applications_and_enabling_technologies/Links/Ofcfd 50b638d9592a1000000/Event-based-applications-and-enabling-technologies.pdf (Year: 2009).

Technologies for Payment Fraud Prevention: EMV, Encryption, and Tokenization, Oct. 2014, Smart Card Alliance, pp. 1-34 (Year: 2014).

Yang, Ming-Hour; Security Enhanced EMV-Based Mobile Payment Protocol. https://patents.google.com/scholar/15767854982483958498?q (Security Enhanced EMV-Based Mobile Payment Protocol)&patents=false&scholar&oq=Security Enhanced EMV-Based Mobile Payment Protocol (Year: 2014).

Tene et al. Big Data for All: Privacy and User Control in the Age of Analytics. Northwestern Journal of technology and Intellectual Property. https://scholarlycommons.law.northwestern.edu/cgi/viewcontent.cgi?article= 1191 &context=njtip (Year: 2013).

Other USPTO Comm. with Refs. on US DTD Nov. 22, 2023.

Luz et al: "A Mobile NFC Payment Terminal for the Event-Wallet on an Android Smartphone" researchgat.net, (Year: 2012).

ASB, "How to command your cards with ASB Card Control" Apr. 20, 2015, https://www.youtube.com/watch?v=O1sfxvVUL74 (Year: 2015).

Austin Telco Federal Credit Union, "Lost or Stolen Cards", www.atfcu.org/lost-stolen-cards.htm; Apr. 9, 2004. 6 pages.

Authorize.Net. Authorize. Net Mobile Application: iOS User Guide. Sep. 2015. Authorize.Net LLC. Ver.2.0, 1-23. https://www.authorize.net/content/dam/anet-redesign/documents/iosuserguide.pdf (Year: 2015).

BancFirst, "Lost Card", https://www.bancfirst.com/contact.aspx, Oct. 28, 2003. 1 page.

CM/ECF, "CM/ECF Internet Credit Card Payment Guide", https://www.vaeb.uscourts.gov/wordpress/?page_id=340, Mar. 16, 2005. 12 pages.

Co-Op Think, Rachna Ahlawat at Co-Op THINK—Evolution Sessions from THINK14, Dec. 22, 2014, 26:22. https://www.youtube.com/watch?v=yEp-qfZoPhl (Year: 2014).

Cronian, Darrin "Credit card companies Freeze Spending whilst Abroad", published Jun. 9, 2007, Available at: http://www.travel-rants.com/2007/06/09/credit-card-companies-freeze-spending-whilst-abroad/.

Demiriz et al. "Using Location Aware Business Rules for Preventing Retail Banking Frauds" Jan. 15, 2015, IEEE (Year: 2015).

Diversinet enables new consumer mobile services from intersections inc .; MobiSecure wallet and vault helps identity management leader get closer to its customers. (May 30, 2007). PR Newswire Retrieved from https://dialog.proquest.com/professional/docview/450976918?accountid=131444 on Feb. 22, 2023 (Year: 2007).

Eickhoff et al: "Quality through Flow and Immersion: Gamifying Crowdsourced Relevance Assessments" , Proceedings of the 35th international ACM SIGIR conference on Research and development in information retrieval, Aug. 12, 2012. (Year: 2012).

Fiserv. CardValet: Mobile Application Training. Fiserv, Inc. 1-93. https://www.westernbanks.com/media/1664/ cardvalet-application .pdf (Year: 2015).

Fort Knox Federal Credit Union, "Lost or Stolen VISA Card", http://www.fortknoxfcu.org/loststolen.html, Feb. 1, 2001. 2 pages.

IEEE Xplore; 2009 First Asian Himalayas International Conference on Internet: Emergence of Payment Systems in the age of Electronic Commerce.; The state off Art. Author S Singh Nov. 1, 2009 pp. 1-18 (Year: 2009).

IP.com Search Query; May 5, 2020 (Year: 2020).

Konsko: "Credit Card Tokenization: Here's What You Need to Know", Credit Card Basics, Credit Card—Advertisement Nerdwallet (Year: 2014).

Merrick Bank, "Reporting Lost or Stolen Card Help Return to the Cardholder Center FAQs", http://www.merrickbank.com/Frequent-Asked-Questions/Report-Stolen-Card.aspx, Aug. 9, 2004. 1 page.

Microsoft, "Automatically summarize a document", 2016. 3 pages.

Notre Dame FCU "Irish Card Shield: How to Control Transaction Types" Jan. 15, 2016, 0:27, https://youtube.com/watch?v=0eZG1c6Bn38 (Year: 2016).

PCM Credit Union, "CardValet Tutorial" Jun. 24, 2015, https://www.youtube.com/watch?v=uGPh9Htw0Wc (Year: 2015).

Purchasing charges ahead. (1994). Electronic Buyers' News,, 68. Retrieved from https://dialog.proquest.com/professional/docview/681599288?accountid=131444 on Nov. 13, 2020 (Year: 1994).

RBC Royal Bank, "If Your Card is Lost or Stolen", http://www.rblbank.com/pdfs/CreditCard/FAQs.pdf, Oct. 1, 2002. 2 pages.

Smartphones as Practical and Secure Location Verification Tokens for Payments. (Year: 2014).

(56) References Cited

OTHER PUBLICATIONS

State Employees Credit Union, "Lost or Stolen Account Info", https://www.secumd.org/advice-planning/money-and-credit/privacy-fraud-protection/lost-or-stolen-account-info.aspx, May 20, 2005. 2 pages.

Transaction aggregation as a strategy for credit card fraud detection. (Year: 2009).

Union Bank & Trust, "Report Lost or Stolen Card", http://www.ubt.com/security-fraud/report-lost-or-stolen-cards, Jul. 10, 2005. 13 pages.

Urein et al: "A breakthrough for prepaid payment: End to end token exchange and management using secure SSL channels created by EAP-TLS smart cards", 2011 International Conference on Collaboration Technologies and Systems (CTS) (Year: 2011).

Using location aware business rules for preventing retail banking frauds. https://ieeexplore.ieee.org/stamp/stamp.jsp?tp=&arnumber=7351936 (Year: 2015).

Yang MH. Security enhanced EMV-based mobile payment protocol. Scientific World Journal. 2014.https://www.ncbi.nlm.nih.gov/ pmc/articles/PMC4181509/ (Year: 2014).

"Location based bank card fraud prevention using push notification technology," 2015, IP.com No. IPCOM000244440D (8 pages).

Mampaey, M., "Secure remittance transaction to bankless consumers in a fragmented applications market," 2011, in Bell Labs Technical Journal, vol. 16, Issue 2, pp. 219-233.

Yang, MH., "Security enhanced EMV-based mobile payment protocol," 2014, Scientific World Journal, 19 Pages.

Demiriz et al., "Using location aware business rules for preventing retail banking frauds," 2015 First International Conference on Anti-Cybercrime (ICACC), pp. 1-6. https://ieeexplore.ieee.org/documenU7351936? source=IQplus.

Dunman et al., "A Novel and Successful Credit Card Fraud Detection System Implemented in a Turkish Bank," 2013 IEEE 13th International Conference on Data Mining Workshops, Dallas, TX, USA. Retrieved from https://ieeexplore.ieee.org/documenU6753916? source=IQplus.

Ivatury, G., Mobile Phone Banking and Low-Income Customers, 2006, Retrieved from https://www.cgap.org/sites/default/files/CGAP-Mobile-Phone-Banking-and-Low-Income-Customers-Evidence-from-South-Africa-Jan-2006.pdf.

Park et al., "Leveraging Cellular Infrastructure to Improve Fraud Prevention," 2009 Annual Computer Security Applications Conference, Honolulu, HI, USA, https://ieeexplore.ieee.org/documenU5380689?source= IQplus.

Trappey et al., "Patent portfolio analysis of e-payment services using technical ontology roadmaps," 2016 IEEE International Conference on Systems, Man, and Cybernetics (SMC), Budapest, Hungary. Retrieved from https://ieeexplore.ieee.org/documenU7844992? source=IQplus.

\* cited by examiner

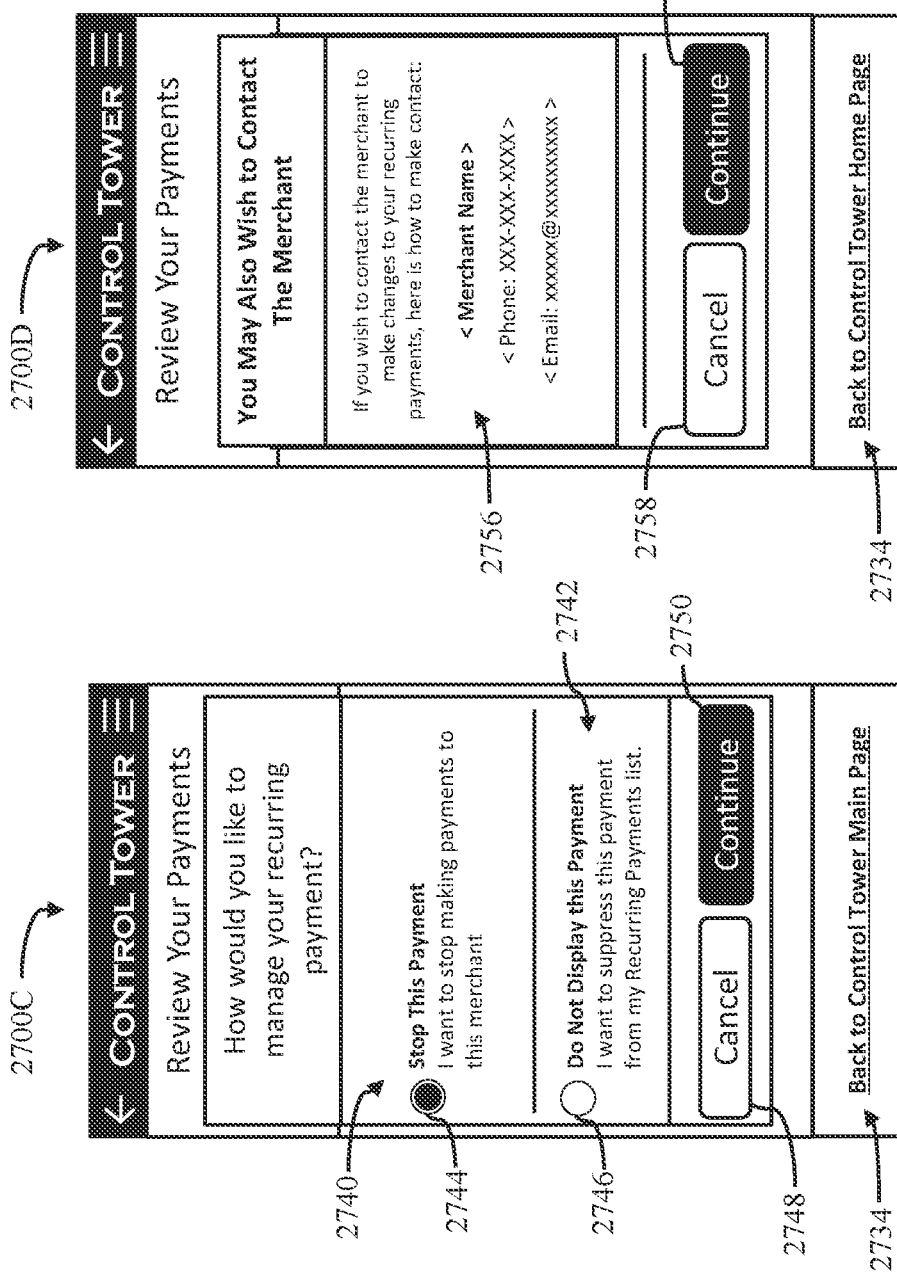

FIG. 28F

CONTROL TOWER

⏱ Recurring Payments

Entity 1 Account 1a ...1234 ▼
● On   Change Status

Recurring Payments to Entity 3:

Account 3b: Disabled {Until [DATE]}
Frequency: Monthly
Payment Range: $47.55 to $350
CHANGE STATUS
Enable [        Disable]

Account 3c: Disabled
Frequency: Quarterly
Payment Range: $1200 to $1200
CHANGE STATUS
Enable [        Disable]

Show More Recurring Payments 2800F, 2830

FIG. 28E

CONTROL TOWER

⏱ Recurring Payments

Entity 1 Account 1a ...1234 ▼

Disable Payments Confirmation

Please Confirm That You Wish To Disable Monthly Payments From Entity 1 Account 1a to Entity 3 Account 3b Choose Duration (Optional)
| 6 Months |
| 1 Year |
| Indefinitely |
| Other |

[ Cancel ]   [ Disable ]

Show More Recurring Payments 2800E, 2820, 2822

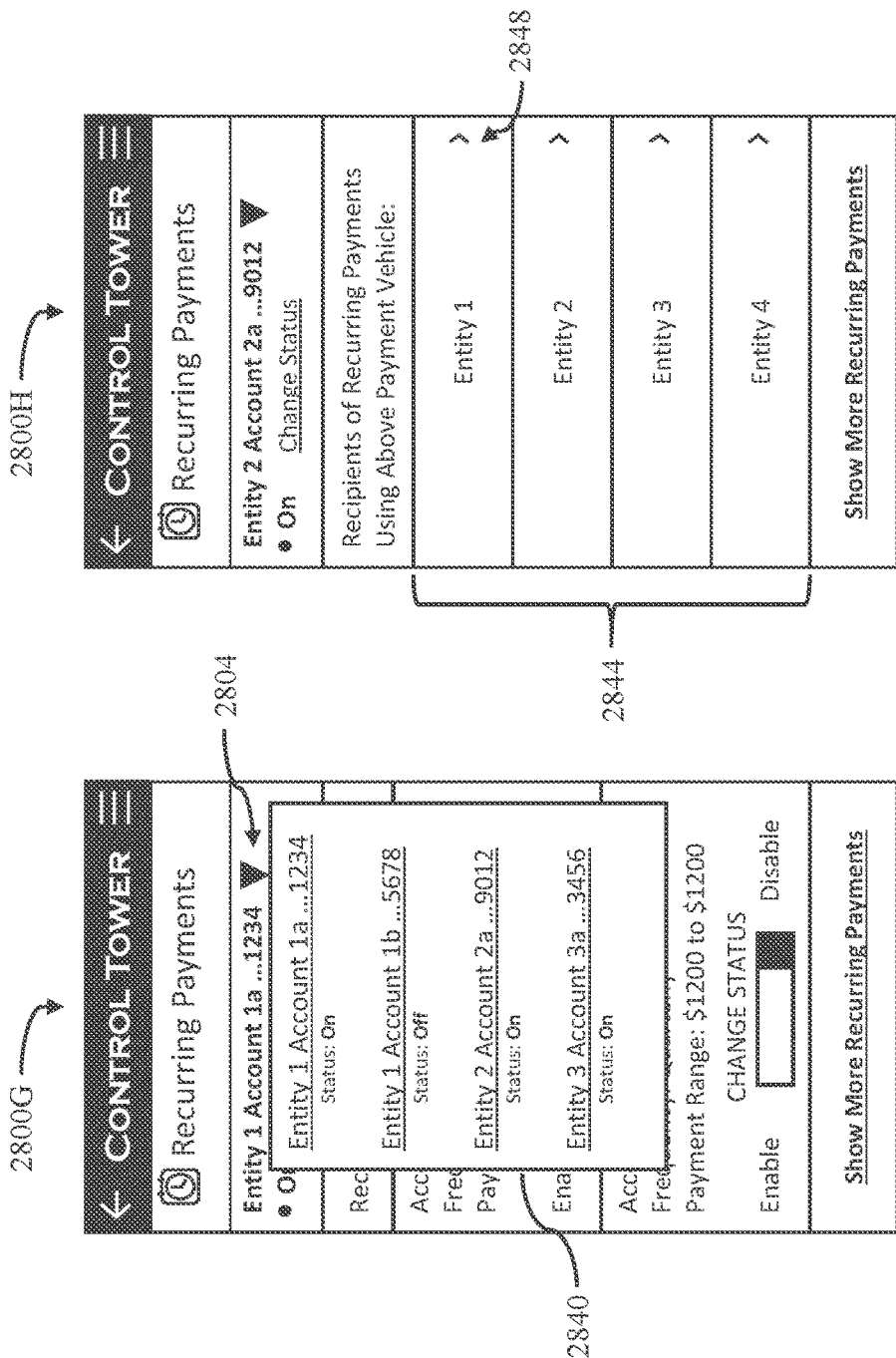

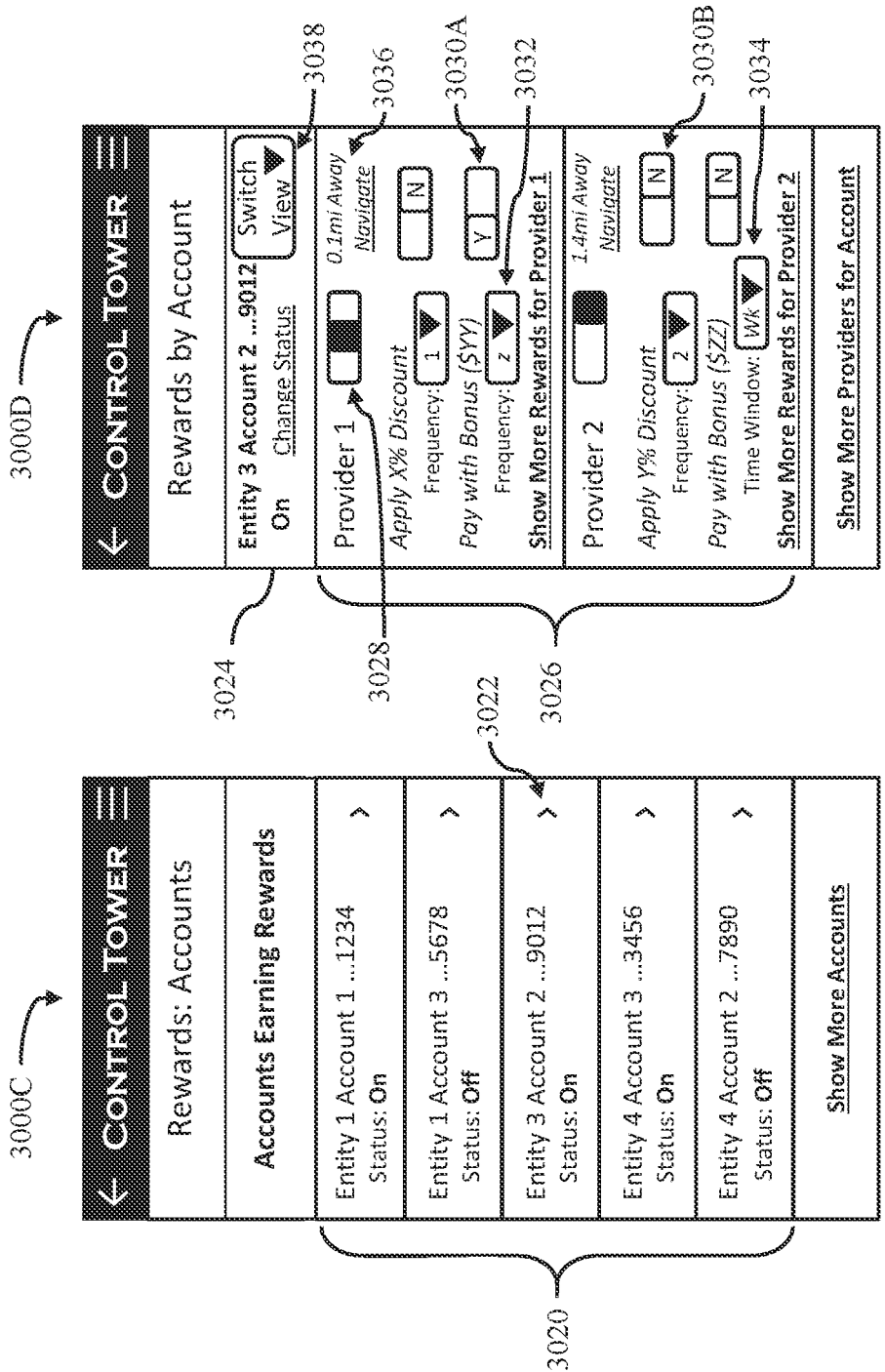

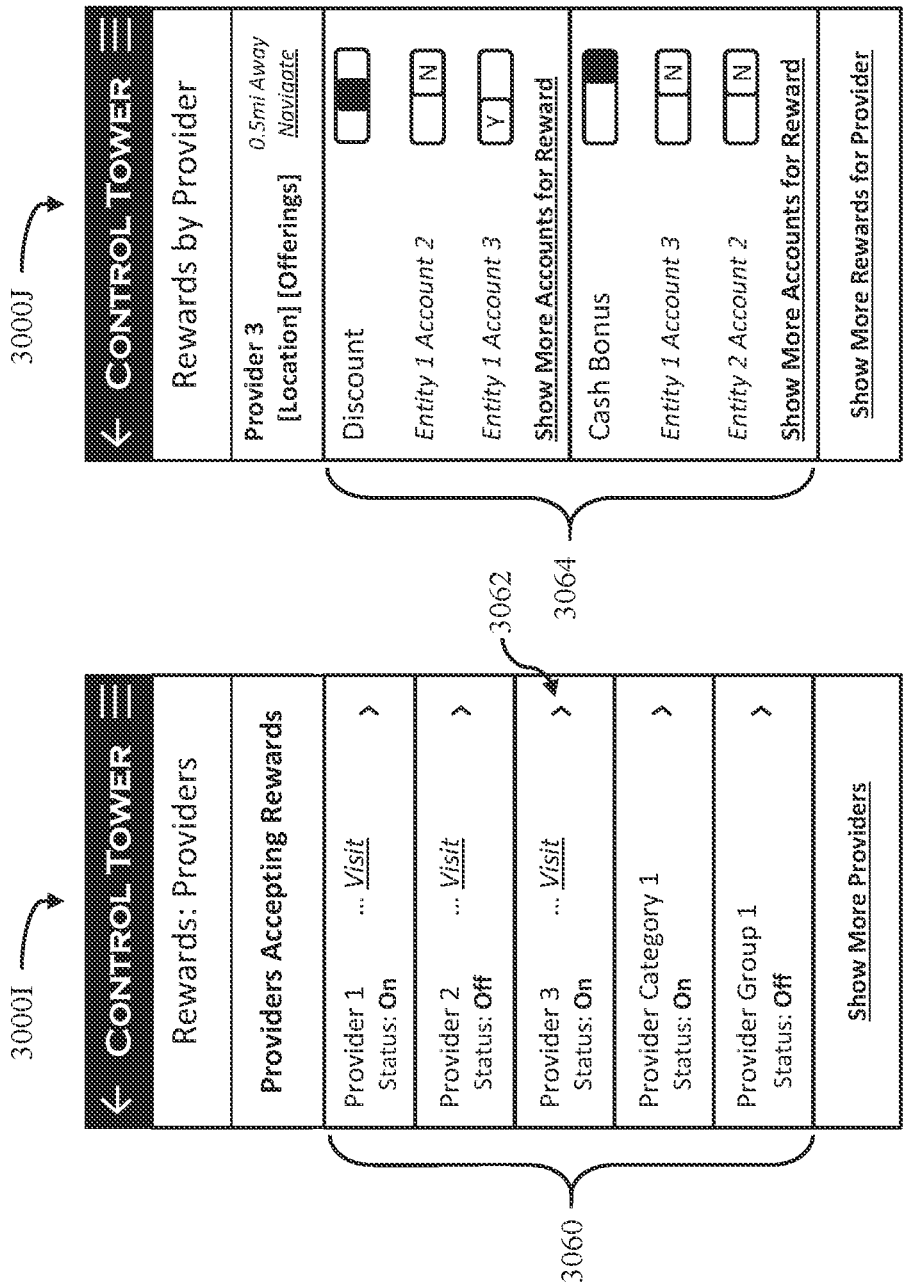

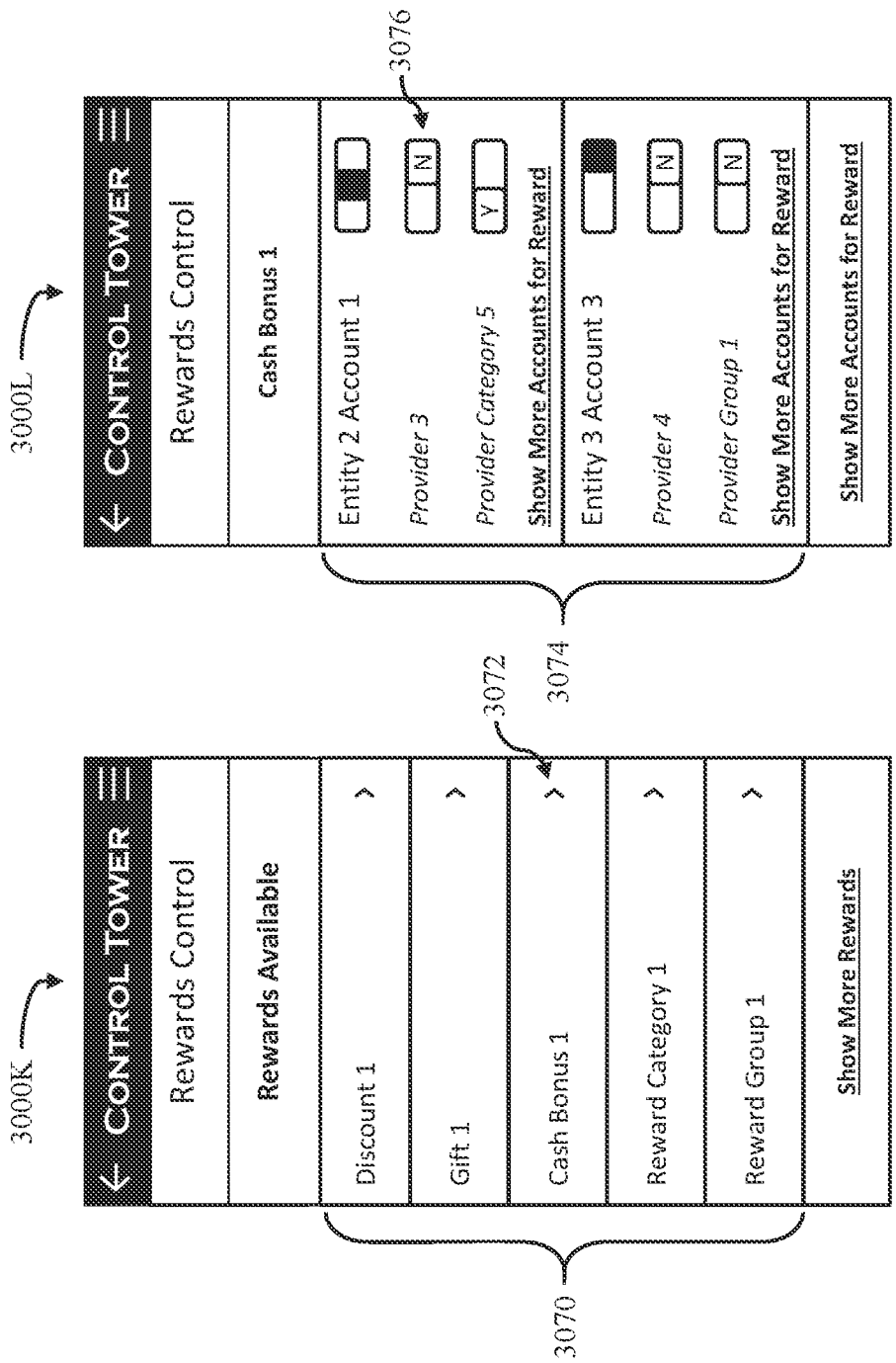

CONTROL TOWER FOR DEFINING ACCESS PERMISSIONS BASED ON DATA TYPE

CROSS-REFERENCE TO RELATED APPLICATIONS

This application is a continuation of U.S. patent application Ser. No. 17/209,500 filed Mar. 23, 2021, which is a continuation of U.S. patent application Ser. No. 17/005,124 filed Aug. 27, 2020 (now U.S. Pat. No. 10,963,589), which is a continuation of U.S. patent application Ser. No. 16/653,312 filed Oct. 15, 2019, which is a continuation-in-part of U.S. patent application Ser. No. 16/457,257 filed Jun. 28, 2019, which is a continuation-in-part of U.S. patent application Ser. No. 16/383,388 filed Apr. 12, 2019, which is a continuation-in-part of U.S. patent application Ser. No. 16/215,558 filed Dec. 10, 2018, which is a continuation of U.S. patent application Ser. No. 16/204,831 filed Nov. 29, 2018, which claimed priority to U.S. Provisional Patent Application No. 62/766,400 filed Oct. 16, 2018. U.S. patent application Ser. No. 16/204,831 is a continuation-in-part of U.S. patent application Ser. No. 15/723,078 filed Oct. 2, 2017, which claimed priority to U.S. Provisional Patent Application No. 62/529,360 filed Jul. 6, 2017, and to U.S. Provisional Patent Application No. 62/403,396 filed Oct. 3, 2016. U.S. patent application Ser. No. 15/723,078 is a continuation-in-part of U.S. patent application Ser. No. 15/629,423 filed Jun. 21, 2017, which claimed priority to U.S. Provisional Application No. 62/357,737 filed Jul. 1, 2016. Each of the above is incorporated herein by reference in its entirety.

TECHNICAL FIELD

Embodiments of the present disclosure relate to systems and methods for managing customer data and customer preferences across a plurality of platforms.

BACKGROUND

Many customers link information (e.g., account types, account balances, payment account information, etc.) maintained by a financial institution to devices (e.g., in a mobile wallet on a smartphone, wearable devices, Internet of Things devices, etc.) and to third-party systems (e.g., financial health monitoring services, merchant e-commerce systems, social media platforms, mobile wallet systems, etc.). The customer may share the information with a plurality of different services. For example, the customer may provide account information to a financial health monitoring service, payment card information to a plurality of different mobile wallet services, payment card information to their favorite retailers, and the like. Once the access is provided, the customer can manage preferences relating to the access at each of the third-party systems (e.g., via a third-party website or smartphone application). However, this process can be cumbersome when the customer has authorized a plurality of third-parties to have access to the information maintained by the financial institution. Moreover, information shared by the customer becomes stored in additional databases, exposing the customer to additional security risks and making the customer's information more likely to become available to unwanted parties (as a result of, for example, the additional databases being hacked or the customer information otherwise being intentionally or unintentionally leaked).

SUMMARY

Various embodiments relate to a method that may comprise providing a portal. The portal may be provided via a network such as the internet. The portal may be accessible via, for example, a user device. For example, the portal may be accessible via an application running on a user device. A user accessing the portal may be presented with one or more graphical interfaces. The portal may allow the user to view information on one or more accounts of the user. The method may comprise accepting a selection to enable use of a virtual rewards currency. The selection may be accepted via the portal. The selection may be to enable use of the virtual rewards currency for one or more subsequent electronic transactions. The electronic transactions may involve a select account. The method may comprise receiving an authorization request for an electronic transaction. The authorization request may be received from or via a provider device. The electronic transaction may involve a purchase by the user. The purchase may be from a provider corresponding to the provider device. The provider may be, for example, a merchant, online or otherwise. The provider device may have received account information corresponding to the select account for the purchase. The provider device may have received the account information from the user. The user may have provided the account information by inputting information. The information may have been input into the provider device. The user may, alternatively or additionally, present a payment vehicle associated with the select account to the provider, such as by presenting a payment card (e.g., a credit or debit card) at a point of sale device of the provider. Alternatively or additionally, the account information may be presented via, for example, a mobile wallet application implemented via the user device. The method may comprise applying the virtual rewards currency to cover at least a portion of the purchase.

In one or more implementations, the method may comprise accepting a second selection to disable use of the virtual rewards currency with respect to the select account. The second selection may be received via the portal.

In one or more implementations, the method may comprise presenting an indication that the virtual rewards currency was applied to the purchase. The indication may be presented graphically. The indication may be presented via the portal.

In one or more implementations, the method may comprise transmitting an approval of the electronic transaction involving the purchase by the user. The approval may be transmitted to the provider device.

In one or more implementations, the portal may allow the user to view information on accounts held by two or more entities. The information may be provided via communications with corresponding computing systems of the entities.

In one or more implementations, the virtual rewards currency may take different forms. The virtual rewards currency may be, or may comprise, a bonus earned for one of the accounts which may be accessible via the portal. The bonus may be, for example, a "cash back" bonus that may be earned based on use of the account for transactions. Alternatively or additionally, the virtual rewards currency may be a discount, gift, and/or another item of value provided to the user.

In one or more implementations, the portal may be implemented by a computing system of a financial institution. The financial institution may hold one or more accounts of the user.

In one or more implementations, the portal may allow the user to retroactively apply a second virtual rewards currency to a past transaction. The past transaction may have originally been processed without use of the second virtual rewards currency.

In one or more implementations, the portal may be configured to receive from the user device location data. The location may correspond to the location of the user device. The location data may have been detected using a location sensor of the user device. The portal may, alternatively or additionally, be configured to present a distance of the user device from the provider.

In one or more implementations, the portal may provide a selectable icon corresponding to the provider. The icon may be configured to, when selected, result in the presentation of directions to a physical location of the provider. The directions may be presented via an application, such as a map or navigation application, launched on the user device upon selection of the icon. Alternatively or additionally, the icon may be configured to, when selected, result in the presentation of a website or application. The website or application may be associated with the provider, and may be presented on the user device.

Various embodiments relate to a method that may comprise presenting an option to activate use of a virtual rewards currency. The option may be presented via a user device. The option may be to activate use of the virtual rewards currency for one or more subsequent transactions. A subsequent transaction may involve a select account. The select account may be held by a financial services provider. The method may comprise accepting an indication that a user of the user device has opted to activate use of the virtual rewards currency for the subsequent transaction involving the select account. The indication may be accepted via the user device. The method may comprise processing the transaction for which use of the virtual rewards currency was activated. The transaction may be processed such that the virtual rewards currency is applied to the transaction. The transaction may processed via a computing system of the financial services provider.

In one or more implementations, the option is presented via a portal. The portal may be, but need not be, implemented by a computing system of the financial services provider. For example, the portal may be implemented by a computing system of an entity other than the financial services provider.

In one or more implementations, processing the transaction may comprise receiving a request for authorization of the transaction. The request may be received from a merchant device, such as a point-of-sale device or a device of an online merchant. The method may comprise transmitting an approval of the transaction to the merchant device.

In one or more implementations, the computer system of the financial services provider may receive the request for authorization from the merchant device. The computer system of the financial services provider may transmit the approval to the merchant device.

In one or more implementations, the method may comprise detecting a physical location of the user device. The physical location may be detected via a user device. The physical location may be detected via a location sensor of the user device. The method may comprise presenting a second option for navigating to the physical location. The second option may be presented via the user device. The option may be for navigating via the user device, such as via a navigation application running on the user device.

In one or more implementations, the second option may be presented via a first application running on the user device. The method may comprise accepting a second indication that the user of the user device has opted to navigate to the physical location. The second indication may be accepted via an input device of the user device. The input device may or include, for example, a touchscreen, a virtual or physical keyboard, or otherwise. The method may comprise launching a second application. The second application may be launched via an operating system of the user device. The second application may presents a virtual map. The virtual map may correspond to the user device's present location.

Various embodiments relate to a computing system having a processor and a memory storing executable code which causes the computing system, when executed, to perform specific functions. The computing system may be configured to provide a portal. The portal may be presented via the internet or other network. The computing system may present (via a portal or otherwise) an option to use a virtual rewards currency. The option may be to use the virtual rewards currency with respect to a select account of a user. The option may be selectable via a user device, such a user device accessing the portal. The computing system may be configured to accept an indication that the user of the user device has opted to use the virtual rewards currency. The indication may be accepted via the portal. The computing system may be configured to apply the virtual rewards currency to a transaction involving the select account.

In one or more implementations, the computing system may be implemented by or otherwise associated with a financial services provider at which the select account is held. The computing system may instead be implemented by or otherwise associated with an entity other than a financial services provider at which the select account is held.

In one or more implementations, the transaction may be a past transaction, such as an already-processed transaction or otherwise one that was initiated prior to opting to use the virtual rewards currency. The transaction may also be a future transaction, such as an in-process transaction or otherwise one that is initiated subsequent to opting to use the virtual rewards currency.

One embodiment relates to a method of managing access to customer information associated with a customer of a financial institution. The method includes receiving, by a financial institution computing system associated with a financial institution, a request to view a set of access permissions from a first user device associated with the user. The method also includes identifying, by the financial institution computing system, the set of access permissions associated with the user, the set of access permissions identifying an entity or device that may request information regarding the user from the financial institution. The method also includes generating an access permission dataset based on the identified set of access permissions. The method also includes transmitting, by the financial institution computing system, the access permission dataset to the user device to facilitate the presentation of a data control interface to the customer via the user device, the data control interface configured to receive user inputs to change the set of data access permissions.

Another embodiment relates to a financial institution computing system associated with a financial institution. The financial institution computing system includes a network interface configured to communicate data over a network and an access control circuit. The access control circuit is configured to receive, by the network interface, a request to view a set of access permissions from a first user device associated with the user. The access control circuit is also configured to identify the set of access permissions associated with the user, the set of access permissions identifying an entity or device that may request information regarding the user from the financial institution. The access control circuit is further configured to generate an access permission dataset based on the identified set of access permissions. The access control circuit is further configured to transmit, by the network interface, the access permission dataset to the user device to facilitate the presentation of a data control interface to the customer via the user device, the data control interface configured to receive user inputs to change the set of data access permissions.

Various embodiments of the disclosure relate to methods, systems, and non-transitory computer readable medium for managing access to customer information of a customer. The customer information may be stored at a service provider computing system of a service provider. A third-party account may be linked with the customer information. The third-party account may be stored at a third party computing system. The third-party account may be linked with the customer information by the service provider computing system and/or by the third-party computing system. The link may define a subset of the customer information that is accessible to the third-party computing system. An instruction to delete customer data stored in a database of the third-party computing system may be received. The instruction to delete may be received from a service provider client application running on a computing device of the customer. The instruction to delete may be received by the service provider computing system. The instruction to delete may be generated in response to a corresponding selection by the customer. The instruction to delete may be generated by the service provider client application. The selection may be made via a graphical user interface presented by the service provider client application. A scrub command may be generated. The scrub command may be generated by the service provider computing system. The scrub command may identify the customer and/or the customer data to be deleted. The scrub command may be generated in response to receiving the instruction to delete. The scrub command may be transmitted to the third party computing system. The scrub command may be transmitted to cause the third-party computing system to delete the customer data that may have been identified by the scrub command. The customer data may be deleted by the third-party computing system from a database thereof.

In various implementations, an API call may be received. The API call may be received from the third-party computing system. The API call may be received by the service provider computing system. The API call may specify a subset of the customer information. The subset of the customer information specified in the API call may be transmitted to the third-party computing system. The customer information may be transmitted in response to receiving the API call from the third-party computing system. Restrictions may be placed on what customer data is accessible to the third-party computing system. Additionally or alternatively, restrictions may be placed on how accessible customer data may be used by the third party computing system. One or more restrictions may be placed by the customer. One or more restrictions may be placed via the service provider client application. Status information indicating whether the link is active or inactive may be transmitted to the computing device of the customer. The status information may be presented via the service provider client application running on the computing device. The scrub command may instruct the third-party computing system to delete the third-party account of the customer from the third-party computing system. The scrub command may instruct the third-party computing system to delete customer data of a specified type from the database of the third-party computing system. The scrub command may instruct the third-party computing system to delete all customer data, or a subset thereof, stored at the third-party computing system.

Various embodiments of the disclosure relate to a computing device, which may be a mobile computing device. The computing device may be associated with a customer of a service provider. The computing device may comprise a processor and memory with instructions which, when executed by the processor, cause the device to perform specific functions. The specific functions, or a subset thereof, may be performed via a service provider client application running on the computing device. The computing device may receive a request to link a third-party account of the customer with customer information stored at a service provider computing system. The third-party account may be stored at a third party computing system. The link may define a subset of the customer information that is accessible to the third-party computing system. The computing device may also present a graphical user interface. The graphical user interface may provide the customer with status information on the link. The graphical user interface may also allow the customer to make a selection to delete customer data stored in a database of the third-party computing system. The computing device may transmit an instruction to delete to the service provider computing system. The instruction to delete may be transmitted in response to the selection. The service provider computing system may generate a scrub command. The scrub command may be generated in response to receiving the instruction to delete. The scrub command may identify the customer and/or the customer data to be deleted. The scrub command may be transmitted to the third party computing system. The scrub command may be transmitted by the service provider computing system. The scrub command may be configured to cause deletion of the specified customer data. The customer data may be deleted by the third-party computing system.

In various implementations, the graphical user interface allows the customer to place restrictions on at least one of (1) what customer data is accessible to the third-party computing system and (2) how accessible customer data may be used by the third party. The graphical user interface may be presented via the service provider client application running on the computing device. The graphical user interface may identify the third-party account that is linked. The scrub command instructs the third-party computing system to delete a third-party account of the customer, to delete customer data of a specified type, and/or delete all customer data stored at the third-party computing system.

Various embodiments of the disclosure relate to a computing device, which may be a mobile computing device. The computing device may be associated with a customer of a service provider. The computing device may comprise a processor and memory with instructions which, when executed by the processor, cause the device to perform specific functions. The computing device may run a service provider client application. The computing device may perform the specific functions, or a subset thereof, via the service provider client application. The computing device may present a first graphical user interface. The first graphical user interface may, at least in part, identify a third-party account that is linked with customer information. The customer information may be stored at a service provider computing system of the service provider. The third-party account may be stored at a third party computing system. The link may define a subset of the customer information that is accessible to the third-party computing system. The computing device may also present a second graphical user interface. The second graphical user interface may include a selectable link which, when selected, transmits a message to the service provider computing system. The message may indicate that the customer wishes to delete customer data stored in a database of the third-party computing system. The service provider computing system may generate a scrub command. The scrub command may be generated in response to receiving the message. The scrub command may identify the customer and/or the customer data to be deleted. The computing device may transmits the scrub command to the third party computing system. The scrub command may be transmitted to cause the third-party computing system to delete the specified customer data.

Various embodiments of the disclosure relate to a computing device comprising a network interface configured to communicate via a telecommunications network. The computing device may also comprise one or more user interfaces for visually presenting graphical elements and for receiving user inputs. The computing device may moreover comprise a processor and a memory having stored thereon instructions which, when executed by the processor, cause the processor to perform specific functions. The computing device may be configured to present an interactive graphical interface via the user interfaces. The graphical interface may identify an entity for which an access permission to user information is controlled. The user information may be stored at a service provider computing system. The computing device may also be configured to present a display icon via the interactive graphical interface. The display icon may be selecting between a first user information and a second user information to be made accessible to the entity. The computing device may moreover be configured to receive, from the user interfaces, a signal. The signal may indicate a user input corresponding with a selection of one of the first user information and the second user information via the display icon. The computing device may additionally be configured to use the network interface to transmit to the service provider computing system an indication of which one of the first user information and the second user information has been selected. The service provider computing system may grant the entity access to the selected user information. Access to the selected user information may be granted following receipt by the service provider computing system of a request from the entity for user information.

In various implementations, the computing device may be configured to present, via the interactive graphical interface, an indication of whether access to user information is permitted or restricted for the entity. The computing device may also be configured to present, via the interactive graphical interface, a second display icon for selecting between at least a first setting to permit access to user information for the entity, and a second setting to restrict access to user information for the entity. The computing device may be a first computing device, and the entity may be a second computing device associated with the user. In certain versions, the second computing device may be a smartphone. In certain versions, the second computing device may be a tablet computer. In certain versions, the second computing device may be a wearable device. In certain versions, the second computing device may be a smart speaker. In certain versions, the second computing device may be a vehicle. The interactive graphical interface may be presented via a first application. The entity may be a second application. The second application may be configured to communicate with the service provider computing system to request access to user information. In certain versions, the first and second applications may both run on the computing device. In certain versions, the second application runs on a second computing device. The entity may be a third-party computing system. The user information may be account data for financial transactions involving the third-party computing system.

Various embodiments of the disclosure relate to a method for controlling access permissions to user devices. The method may comprise presenting, via one or more user interfaces, an interactive graphical interface. The graphical interface may identify an entity for which an access permission to user information may be controlled. The one or more user interfaces may be configured to visually present graphical elements and receive user inputs. The user information may be stored at a service provider computing system. The method may also comprise presenting, via the interactive graphical interface, a display icon. The display icon may be for selecting between a first user information and a second user information to be made accessible to the entity. The method may moreover comprise receiving, from the user interfaces, a signal. The signal may indicate a user input corresponding with a selection of one of the first user information and the second user information via the display icon. The method may additionally comprise using a network interface to transmit to the service provider computing system an indication of which one of the first user information and the second user information has been selected. The service provider computing system may grant the entity access to the selected user information. Access to the selected user information may be granted following receipt by the service provider computing system of a request from the entity for user information.

In various implementations, an indication of whether access to user information is permitted or restricted for the entity may be presented via the interactive graphical interface. A second display icon may be presented via the interactive graphical interface. The second display icon may be for selecting between at least a first setting to permit access to user information for the entity, and a second setting to restrict access to user information for the entity. The computing device may be a first computing device, and the entity may be a second computing device associated with the user. In certain versions, the second computing device may be a smartphone. In certain versions, the second computing device may be a tablet computer. In certain versions, the second computing device may be a smart speaker. In certain versions, the second computing device may be a vehicle. In certain versions, the second computing device may be a wearable device. The interactive graphical interface may be presented via a first application. The entity may be a second application configured to communicate with the service provider computing system to request access to the user information. The entity may be a third-party computing system. The third-party computing system may be associated with a merchant. The user information may be account data for transacting with the third-party computing system. The user information may be account data for making purchases from a merchant.

Various embodiments of the disclosure relate to a non-transitory computer readable medium having machine instructions stored thereon, the instructions being executable by a processor of a computing device to cause the processor to perform specific operations. The operations may comprise presenting an interactive graphical interface via one or more user interfaces. The graphical interface may identify an entity for which an access permission to user information is controlled. The one or more user interfaces may be configured to visually present graphical elements and receive user inputs. The user information may be stored at a service provider computing system. The operations may also comprise presenting a display icon via the interactive graphical interface. The display icon may be for selecting between a first user information and a second user information to be made accessible to the entity. The operations may moreover comprise receiving a signal from the user interfaces. The signal may indicate a user input corresponding with a selection of one of the first user information and the second user information via the display icon. The operations may additionally comprise using a network interface to transmit to the service provider computing system an indication of which one of the first user information and the second user information has been selected. The service provider computing system may grant the entity access to the selected user information.

In various implementations, the operations may comprise presenting, via the interactive graphical interface, an indication of whether access to user information is permitted or restricted for the entity. The operations may also comprise presenting, via the interactive graphical, a second display icon for selecting between at least a first setting to permit access to user information for the entity, and a second setting to restrict access to user information for the entity.

Various embodiments of the disclosure relate to a computing device. The computing device may comprise a network interface configured to communicate via a telecommunications network, one or more user interfaces for visually presenting graphical elements and for receiving user inputs, and a processor and a memory having stored thereon instructions which, when executed by the processor, cause the processor to perform specific functions. The computing device may be configured to present an interactive graphical interface via the user interfaces. The interactive graphical interface may identify an entity for which an access permission to user information is controlled. The user information may be stored at a service provider computing system. The computing device may also be configured to present a display icon via the interactive graphical interface. The display icon may be for selecting the access permission corresponding to the entity. The access permission may be selectable between at least a first setting to permit access to user information, and a second setting to restrict access to user information. The computing device may moreover be configured to receive a signal from the user interfaces. The signal may indicate a user input corresponding with a toggling of the display icon between the first and second settings. The computing device may additionally be configured to use the network interface to transmit to the service provider computing system at least one of an identification of the selected access permission and an indication that the access permission for the entity has changed. The service provider computing system may determine whether to grant the entity with access to the user information according to the access permission.

In various implementations, the computing device may be configured to present, via the interactive graphical interface, an identification of the user information accessible to the entity. The user information may be a first user information. The computing device may be configured to present a second display icon via the interactive graphical interface. The second icon may be for selecting between the first user information and a second user information to be made available to the entity. The computing device may be a first computing device. The entity may be a second computing device associated with the user. In some versions, the second computing device may be a smartphone. In some versions, the second computing device may be a tablet computer. In some versions, the second computing device may be a wearable device. In some versions, the second computing device may be a smart speaker. In some versions, the second computing device may be a vehicle. The interactive graphical interface may be presented via a first application. The entity may be a second application. The second application may be configured to communicate with the service provider computing system to request access to the user information. In some versions, the first and second applications may both run on the computing device. The entity may be a third-party computing system. The third-party computing system may be associated with a merchant. The user information may be account data for making purchases from the merchant.

Various embodiments of the disclosure relate to a method for controlling access permissions to user devices. The method may comprise presenting an interactive graphical interface via one or more user interfaces. The interactive graphical interface may identify an entity for which an access permission to user information is controlled. The one or more user interfaces may be configured to visually present graphical elements and receive user inputs. The user information may be stored at a service provider computing system. The method may also comprise presenting a display icon via the interactive graphical interface. The display icon may be for selecting the access permission corresponding to the entity between at least a first setting to permit access to user information, and a second setting to restrict access to user information. The method may moreover comprise receiving a signal from the user interfaces. The signal may indicate a user input corresponding with a toggling of the display icon between the first and second settings. The method may additionally comprise using a network interface to transmit to the service provider computing system at least one of an identification of the selected access permission and an indication that the access permission for the entity has changed. The network interface may be configured to communicate via a telecommunications network. The service provider computing system may determine whether to grant the entity with access to the user information according to the access permission.

In various implementations, an identification of the user information accessible to the entity may be presented via the interactive graphical interface. The user information may be a first user information. A second display icon may be presented via the interactive graphical interface. The second display icon may be for selecting between the first user information and a second user information to be made available to the entity. The computing device may be a first computing device, and the entity may be a second computing device associated with the user. The second computing device may be a smartphone, a tablet computer, a smart speaker, a vehicle, and/or a wearable device. The interactive graphical interface may be presented via a first application. The entity may be a second application configured to communicate with the service provider computing system to request access to the user information. The first and second applications may both run on the computing device. The entity may be a third-party computing system. The third-party computing system may be associated with a merchant.

The user information may be account data. The account data may be for making purchases from the merchant.

Various embodiments of the disclosure relate to a non-transitory computer readable medium having machine instructions stored thereon. The instructions may be executable by a processor of a computing device to cause the processor to perform specific operations. The operations may comprise presenting an interactive graphical interface via one or more user interfaces. The interactive graphical interface may identify an entity for which an access permission to user information is controlled. The one or more user interfaces may be configured to visually present graphical elements and receive user inputs. The user information may be stored at a service provider computing system. The operations may also comprise presenting a display icon via the interactive graphical interface. The display icon may be for selecting the access permission corresponding to the entity. The display icon may allow selection of the access permission between at least a first setting to permit access to user information, and a second setting to restrict access to user information. The operations may moreover comprise receiving, from the user interfaces, a signal indicating a user input corresponding with a toggling of the display icon between the first and second settings. The operations may additionally comprise using a network interface to transmit to the service provider computing system at least one of an identification of the selected access permission and an indication that the access permission for the entity has changed. The network interface may be configured to communicate via a telecommunications network. The service provider computing system may determine whether to grant the entity with access to the user information according to the access permission.

In various implementations, a second display icon may be presented via the interactive graphical interface. The second display icon may be for selecting between a first user information and a second user information to be made accessible to the entity.

Various embodiments of the disclosure relate to a service provider computing system comprising a network interface configured to communicate via a telecommunications network, a processor, and a memory having stored thereon instructions which, when executed by the processor, cause the processor to perform specific functions. The service provider computing system may receive, via the network interface, an access request from a third-party platform. The access request may identify a user and data corresponding to the user. The service provider computing system may also verify that the identified user has granted the third-party platform access to the identified data. In response to verifying that the identified user has granted access, the service provider computing system may use the network interface to transmit the identified data to the third-party platform. The service provider computing may moreover receive, from a user device of the user, an instruction. The instruction may identify the third-party platform and/or indicate what is to be done with the data provided to the third-party platform. The service provider computing system may additionally use the network interface to transmit a command to the third-party platform to cause the third-party platform to, consistent with the instruction from the user device, delete the data received from the service provider computing system and/or restrict how the data from the service provider computing system is used.

In various implementations, the command may be or include an API call to the third-party platform. The API call may identify the user and/or the data to be deleted and/or restricted. The access request may be an API call transmitted by the third-party platform to the service provider computing system. The command may instruct the third-party platform to delete the data from all computer-readable storage media controlled by the third-party platform. The instruction may identify a selection made, via a graphical interface presented by a client application running on the user device, between permitting a use of the data and prohibiting the use of the data. The data may identify a credit or debit card. The use may correspond with use of the credit or debit card in an identified category of financial transactions. The command may instruct the third-party platform to delete a user account of the user.

Various embodiments of the disclosure relate to a method of reclaiming user data. The method may comprise receiving an access request from a third-party platform. The access request may identify a user and/or data corresponding to the user. The method may also comprise verifying that the identified user has granted the third-party platform access to the identified data. The method may moreover comprise transmitting the identified data to the third-party platform in response to verifying that the identified user has granted access. The method may additionally comprise receiving, from a user device of the user, an instruction identifying the third-party platform and/or indicating what is to be done with the data provided to the third-party platform. The method may further comprise transmitting a command to the third-party platform to cause the third-party platform to, consistent with the instruction from the user device, delete the data or restrict how the third-party platform uses the data.

In various implementations, the command may include an API call to the third-party platform. The API call may identify the user and/or the data to be deleted and/or restricted. The command may instruct the third-party platform to delete the data from all computer-readable storage media controlled by the third-party platform. The command may instruct the third-party platform to delete a user account of the user. The third-party platform may be a social media platform. The user account may be a social media account of the user. The third-party platform may be a third-party computing system of a merchant. The data may be account data to be used for a purchase at the merchant. The user device may be a first user device of the user. The third-party platform may be a third-party client application running on at least one of the first user device and a second user device of the user. The instruction may identify a selection made, via a graphical interface presented by a client application running on the user device, between permitting a use of the data and prohibiting the use of the data. The data may include account data usable in financial transactions. The use may correspond with use of the data in an identified category of financial transactions. The account data may be for a credit or debit card. The identified category of financial transactions may be foreign transactions.

Various embodiments of the disclosure relate to a non-transitory computer readable medium having machine instructions stored thereon, the instructions being executable by a processor of a computing device to cause the processor to perform specific operations related to reclaiming user data. The operations may comprise receiving an access request from a third-party platform, the access request identifying a user and data corresponding to the user. The operations may also comprise verifying that the identified user has granted the third-party platform access to the identified data. The operations may moreover comprise, in response to verifying that the identified user has granted access, transmitting the identified data to the third-party platform. The operations may additionally comprise receiving, from a user device of the user, an instruction identifying the third-party platform and indicating what is to be done with the data provided to the third-party platform. The operations may further comprise transmitting a command to the third-party platform to cause the third-party platform to, consistent with the instruction from the user device, delete the data or restrict how the third-party platform uses the data.

Various embodiments relate to a method comprising providing a portal. The portal may include one or more graphical interfaces allowing a user to disable automated payments from selected accounts to selected recipients. The portal may be accessed via a user device. The portal may be configured to accept a first selection to disable a first automated payment in which a first financial account is used to make automated payments to a first recipient. The portal may be configured to accept a second selection of a second automated payment in which a second financial account is used to make automated payments to a second recipient. The first financial account may be held by one (a first) financial institution and the second financial account may be held by another (a second) financial institution. The first and second selections may be accepted via the user device accessing the portal.

In one or more implementations, at least one of the first and second recipients is a third financial account. The third financial account may be held at one of the first and second financial institutions. Alternatively, the third financial account may be held at a third financial institution.

In one or more implementations, the method may comprise disabling one or both of the first and second automated payments.

In one or more implementations, the portal may be implemented by a computing system of the first financial institution. Disabling the first automated payment may comprise declining a subsequent payment request from a first device corresponding to the first recipient.

In one or more implementations, disabling the second automated payment may comprise transmitting an indication to a computing system of the second financial institution that the second automated payment has been disabled.

In one or more implementations, the portal may be implemented by a first computing system of an entity other than the first and second financial institutions. Disabling the first recurring payment may comprise sending a transmission to a second computing system of the first financial institution. The transmission may be sent by the first computing system. The transmission may indicate that the first recurring payment is to be disabled.

In one or more implementations, disabling the second recurring payment may comprise sending a transmission to a third computing system of the second financial institution. The transmission may be sent by the first computing system. The transmission may indicate that the second recurring payment is to be disabled.

In one or more implementations, the transmission to the second computing system may comprise an API call to the second computing system. The API call may be accompanied by a security token authenticating the first computing system. The API call may additionally or alternatively be accompanied by an identification of a user and/or an account number associated with the first financial account.

Various embodiments relate to a method comprising providing a portal with one or more graphical interfaces. The graphical interfaces may allow a user to control automated payments from one or more financial accounts to one or more recipients. The portal may allow the user to control automated payments via a user device. The portal may be configured to accept selection of a financial account used to make automated payments. The portal may be configured to accept selection of a recipient of the automated payments from the selected financial account. The portal may be configured to accept an indication that the automated payments are to be disabled. One or more of the selections and the indication may be accepted via the user device. The method may comprise disabling the automated payments from the financial account to the recipient.

In one or more implementations, the method may be implemented by a computing system of a financial institution at which the financial account is held. The method may comprise declining a subsequent payment request. The subsequent payment request may be received from a computing device corresponding to the recipient of the automated payments.

In one or more implementations, the method may be implemented by a third-party computing system of a third-party that is not a financial institution at which the financial account is held. The method may comprise sending a transmission indicating that the automated payments have been disabled. The transmission may be sent to a financial institution computing system of the financial institution.

In one or more implementations, the portal may be configured to accept selection of a second financial account used to make automated payments. The portal may be configured to accept selection of a second recipient of the automated payments from the second financial account. The portal may be configured to accept an indication that the automated payments from the second financial account to the second recipient are to be disabled. One or more of the selections may be accepted via the user device. The method may comprise disabling the automated payments from the second financial account to the second recipient.

Various embodiments relate to a method of providing a portal accessible to a user device via a network. The portal may be configured to present a list that includes a first selectable icon corresponding to a first financial account. The list may include a second selectable icon corresponding to a second financial account. The list may be presented via a first graphical interface. The first and second financial accounts may be held at different financial institutions. The portal may be configured to accept a first indication that one of the first and second financial accounts has been selected by the user via one of the first and second selectable icons. The first indication may be accepted via the user device. The portal may be configured to present a selectable option to stop one or more subsequent recurring payments from the selected one of the first and second financial accounts. The selectable option may be presented via a second graphical interface. The second graphical interface may be accessed on the user device. The portal may be configured to accept a second indication that the option to stop subsequent recurring payments has been selected by the user via the selectable option. The second indication may be accepted from the user device.

In one or more implementations, the method is not implemented by either of the financial institutions at which the first and second financial accounts are held.

In one or more implementations, the method is implemented by a computing system associated with a financial institution holding one of the first and second financial accounts used for the recurring payments. The method may comprise declining a subsequent recurring payment request.

The subsequent recurring payment request may be received from an entity device corresponding to a recipient of the recurring payments to be stopped.

In one or more implementations, the portal may be configured to accept a selection of the other of the first and second financial accounts from which recurring payments are made. The selection may be accepted from the user device. The portal may be configured to accept a second selection to stop subsequent recurring payments from the other of the first and second financial accounts. The second selection may be accepted via the user device.

Various embodiments relate to a method comprising providing a portal with one or more graphical interfaces. The one or more graphical interfaces may allow a user to disable selected financial accounts for identified entities such that payments from the selected financial accounts will be declined for the identified entities. The selected financial accounts may be disabled via a user device. The portal may be configured to present to the user a first graphical interface with a list that includes a first selectable icon corresponding to a first entity, and a second selectable icon corresponding to a second entity. The first graphical interface may identify a financial account used to make recurring payments to the first and second entities. The first graphical interface may be accessible via the user device. The portal may be configured to accept a first indication that one of the first and second entities has been selected by the user via one of the first and second selectable icons. The first indication may be accepted from the user device. The portal may be configured to present to the user a selectable option to stop one or more subsequent recurring payments to the selected one of the first and second entities. The selectable option may presented via a second graphical interface. The second graphical interface may be accessed on the user device. The portal may be configured to accept a second indication that the option to stop subsequent recurring payments has been selected by the user via the selectable option. The second indication may be accepted from the user device. The portal may be configured to decline a recurring payment request. The recurring payment request may be received from an entity device corresponding to the selected one of the first and second entities. The recurring payment request may be received subsequent to acceptance of the second indication.

In one or more implementations, the portal may be configured to present a duration selector. The duration selector may be configured to allow the user to identify a duration during which recurring payment requests from the selected one of the first and second entities will be declined.

In one or more implementations, the duration selector may be configured to allow the user to select a number of months during which recurring payment requests will be declined, after which recurring payment requests will not be declined.

In one or more implementations, the portal may be implemented by a computing system of a financial institution holding the financial account used for the recurring payments. The portal need not be implemented by a computing system of a financial institution holding the financial account used for the recurring payments. The portal may instead be implemented by a computing system of a third-party entity other than the financial institution holding the financial account used for the recurring payments.

In one or more implementations, the portal may be configured to allow the user to define a set of access permissions identifying an entity or device that may request information regarding the user from the computing system.

In one or more implementations, the portal may be implemented by a computing system of a financial institution holding the financial account used for the recurring payments. The method may comprise accepting payment requests from a first entity device of the first entity and from a second entity device of the second entity. The payment requests may be accepted before accepting the second indication via the portal. The method may comprise initiating debits from the financial account for each payment request.

In one or more implementations, the portal may be accessed via a mobile application running on the user device.

In one or more implementations, the portal may be configured to display one or more prior recurring payments to the selected one of the first and second entities. The recurring payments may be displayed after accepting the first indication.

In one or more implementations, the portal may be configured to display a status of the financial account. The status may be displayed after accepting the first indication.

In one or more implementations, the method may comprise accepting an authorization to approve recurring payment requests from devices of the first and second entities. The authorization may be accepted via the user device.

In one or more implementations, the central portal may be configured to allow the user to disable selected financial accounts with respect to identified financial wallet accounts such that payments via the identified financial wallet accounts will be declined for the selected financial accounts.

In one or more implementations, the financial account may be a debit card of the user. The recurring payments may be made using the debit card.

Various embodiments relate to a computing system configured to provide a portal. The portal may be accessible to a user device via a network. The portal may be configured to allow a user to disable selected financial accounts for identified entities such that payments from the selected financial accounts will be declined for the identified entities. The user may be allowed to disable selected financial accounts via the user device accessing the central portal. The portal may be configured to present a list that includes a first selectable icon corresponding to a first entity, and a second selectable icon corresponding to a second entity. The list may be presented via a first graphical interface. The first graphical interface may identify a financial account used to make recurring payments to the first and second entities. The portal may be configured to accept a first indication that one of the first and second entities has been selected by the user via one of the first and second selectable icons. The first indication may be accepted from the user device. The portal may be configured to present a selectable option to stop one or more subsequent recurring payments to the selected one of the first and second entities. The selectable option may be presented via a second graphical interface accessed on the user device. The portal may be configured to accept a second indication that the option to stop subsequent recurring payments has been selected by the user via the selectable option. The second indication may be accepted from the user device. The computing system may be configured to decline a recurring payment request. The recurring payment request may be received from an entity device corresponding to the selected one of the first and second entities. The request may be received subsequent to acceptance of the second indication via the central portal.

In one or more implementations, the portal may be configured to present a duration selector. The duration selector may be configured to allow the user to identify a duration during which recurring payment requests from the selected one of the first and second entities will be declined.

In one or more implementations, the computing system may be associated with a financial institution holding the financial account used for the recurring payments. The central portal may be further configured to allow the user to define a set of access permissions identifying an entity or device that may request information regarding the user from the computing system.

Various embodiments relate to a user device running an application. The application may be configured to access, via a network, a portal implemented by a computing system. The portal may be configured to allow a user to disable selected financial accounts for identified entities such that payments from the selected financial accounts will be declined or approved for the identified entities by the computing system. The application may be configured to present a list that includes a first selectable icon corresponding to a first entity, and a second selectable icon corresponding to a second entity. The list may be presented via a first graphical interface. The first graphical interface may identify a financial account used to make recurring payments to the first and second entities. The application may be configured to accept a first indication that one of the first and second entities has been selected by the user via one of the first and second selectable icons. The first indication may be accepted via one or more user interfaces of the user device. The application may be configured to present a selectable option to stop one or more subsequent recurring payments to the selected one of the first and second entities. The selectable option may be presented via a second graphical interface. The application may be configured to accept a second indication that the option to stop subsequent recurring payments has been selected by the user via the selectable option. The second indication may be accepted via the one or more user interfaces. The application may be configured to transmit the second indication to cause the computing system to decline a recurring payment request. The payment request may be received by the computing system from an entity device corresponding to the selected one of the first and second entities. The payment request may be received subsequent to acceptance of the second indication.

In one or more implementations, the application may be configured to present a duration selector. The duration selector may be configured to allow the user to identify a duration during which recurring payment requests from the selected one of the first and second entities will be declined.

In one or more implementations, the computing system may be associated with a financial institution holding the financial account used for the recurring payments. The portal may be configured to allow the user to define a set of access permissions identifying an entity or device that may request information regarding the user from the computing system.

In one or more implementations, the application may be configured to present a hide-payee selector. The hide-payee selector may be configured to allow the user to select a payee to be excluded from a recurring payments list.

These and other features, together with the organization and manner of operation thereof, will become apparent from the following detailed description when taken in conjunction with the accompanying drawings.

BRIEF DESCRIPTION OF THE FIGURES

FIGS. 27A-27F show example recurring payment/stop payment interfaces, according to an example embodiment.

FIGS. 28A-28J show example automated payment control interfaces, according to example embodiments.

DETAILED DESCRIPTION

Referring to the figures generally, systems, methods, and apparatuses for providing a customer a central location to manage permissions provided to third-parties and devices to access and use customer information maintained by a financial institution or other service provider are described. The central location serves as a central portal where a customer of the financial institution can manage all access to account information and personal information stored at the financial institution. Accordingly, the customer does not need to log into each individual third-party system or customer device to manage previously provided access to the customer information or to provision new access to the customer information.

Figure 1:
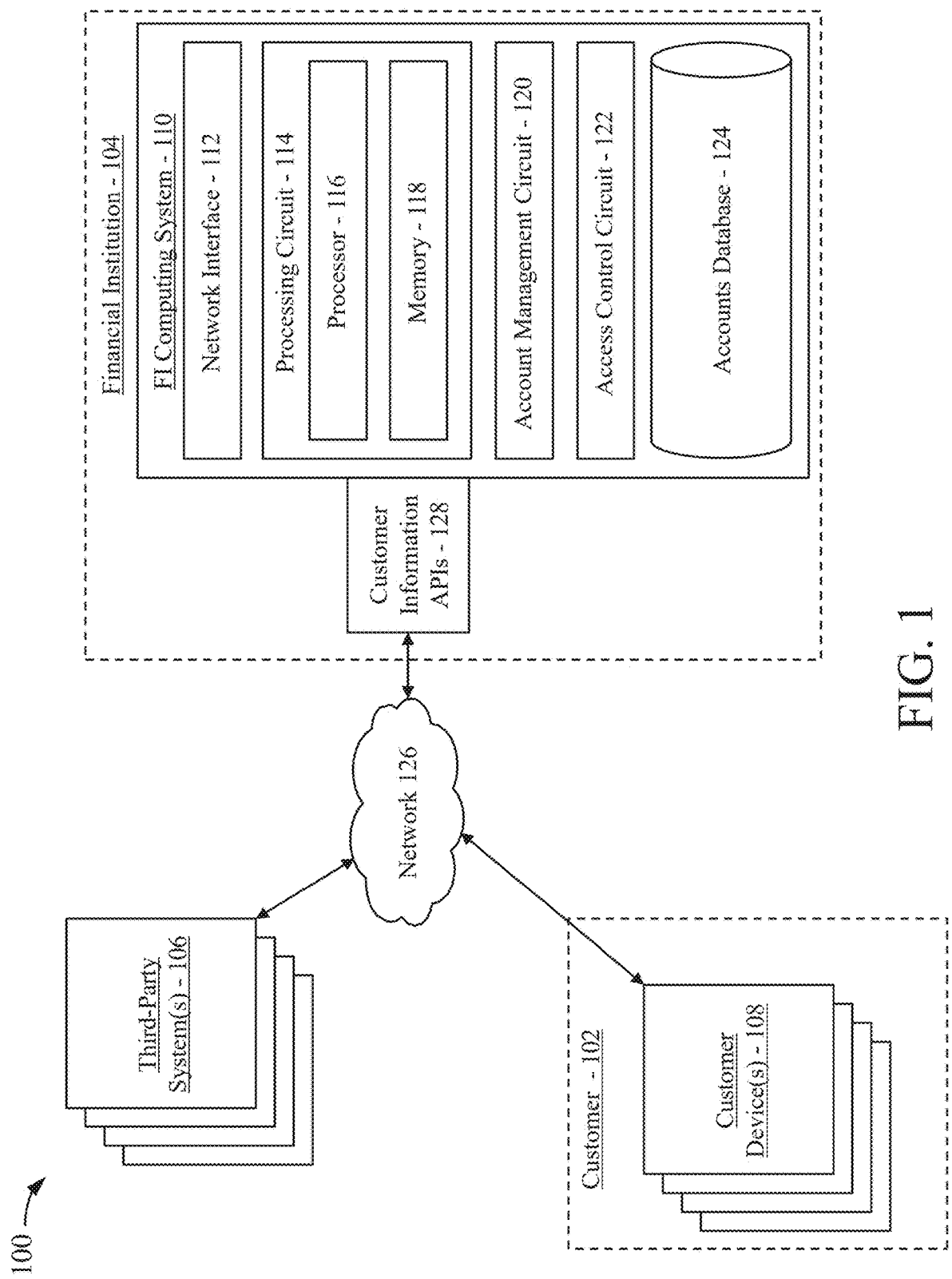
FIG. 1 is a block diagram of an information control system, according to an example embodiment.

Referring to FIG. 1, a view of an information management system 100 is shown according to an example embodiment. As described below in further detail, the information management system 100 facilitates the sharing of customer information associated with a customer 102 and maintained by a financial institution 104 to third-parties systems 106 and customer devices 108. The shared customer information can include any combination of account information associated with financial accounts held by the customer 102 with the financial institution 104 (e.g., types of accounts owned, account numbers, account balances, transaction information, bill due dates, etc.), documents that the customer 102 stores with the financial institution 104 or that are generated by the financial institution 104 (e.g., account statements, tax documents, scanned driver's license/passport, any uploaded files, etc.), and customer personal information stored by the financial institution 104 (e.g., identity information, authentication information, etc.).

The customer 102 is an account holder with the financial institution 104. The financial institution 104 includes a financial institution computing system 110. The financial institution computing system 110 maintains information about accounts held with the financial institution 104 and facilitates the movement of funds into and out of the accounts. Additionally, the financial institution computing system 110 facilitates the sharing and the provision of access to information associated with customer accounts to the customer 102, to customer devices 108, and to third-party systems 106. The financial institution computing system 110 includes a network interface 112. The network interface 112 is structured to facilitate data communication with other computing systems (e.g., the customer devices 108, the third-party systems 106, etc.) via a network 126. The network interface 112 includes hardware and program logic that facilitates connection of the financial institution computing system 110 to the network 126. For example, the network interface 112 may include a wireless network transceiver (e.g., a cellular modem, a Bluetooth transceiver, a WiFi transceiver, etc.) and/or a wired network transceiver (e.g., an Ethernet transceiver). In some arrangements, the network interface 112 includes the hardware and programming logic sufficient to support communication over multiple channels of data communication (e.g., the Internet and an internal financial institution network). Further, in some arrangements, the network interface 112 is structured to encrypt data sent over the network 126 and decrypt received encrypted data.

The financial institution computing system 110 includes a processing circuit 114 having a processor 116 and memory 118. The processor 116 may be implemented as a general-purpose processor, an application specific integrated circuit (ASIC), one or more field programmable gate arrays (FPGAs), a digital signal processor (DSP), a group of processing components, or other suitable electronic processing components. The memory 118 includes one or more memory devices (e.g., RAM, NVRAM, ROM, Flash Memory, hard disk storage, etc.) that store data and/or computer code for facilitating the various processes described herein. Moreover, the memory 118 may be or include tangible, non-transient volatile memory or non-volatile memory.

The financial institution computing system 110 includes an account management circuit 120 and an access control circuit 122. Although shown as separate circuits in FIG. 1, in some arrangements, the account management circuit 120 and/or the access control circuit 122 are part of the processing circuit 116. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting. The account management circuit 120 is structured to perform various account management functions, including maintaining an accounts database 124, updating account balances, applying interest to accounts, processing payments related to accounts, and the like. The access control circuit 122 is structured to manage the sharing and provision of customer information to third-party systems 106 and to customer devices 108 based on permissions and preferences of the customer 102.

The financial institution computing system 110 includes the accounts database 124. In some arrangements, the accounts database 124 is part of the memory 118. The accounts database 124 is structured to hold, store, categorize, and otherwise serve as a repository for information associated with accounts (e.g., loan accounts, savings accounts, checking accounts, credit accounts, etc.) held by the financial institution 104. For example, the accounts database 124 may store account numbers, account balances, transaction information, account ownership information, and the like. The accounts database 124 is structured to selectively provide access to information relating to accounts at the financial institution 104 (e.g., to the customer 102 via a customer device 108). In some arrangements, the financial institution computing system 110 includes other databases, such as customer document and information databases structured to store non-account related information or other documents associated with the customer 102 for distribution to third-parties at the approval of the customer 102.

Still referring to FIG. 1, the system 100 includes at least one third-party system 106. Each third-party system 106 is affiliated with a third-party that the customer 102 can authorize to access information associated with the customer 102 that is stored, generated, maintained, and/or controlled in part by the financial institution 104. For example, the third-party systems 106 may be affiliated with any combination of merchants (e.g., brick-and-mortar retailers, e-commerce merchants, etc.), financial health companies (e.g., investment firms, Mint®, etc.), mobile wallet systems (e.g., third-party mobile wallet systems not affiliated with or operated by the financial institution 104, mobile wallet systems affiliated with or operated by the financial institution 104), payment networks (e.g., payment networks affiliated with credit cards offered by the financial institution 104), social media networks, service providers (e.g., tax filing services), cloud storage systems (e.g., document back-up systems, such as Google® Drive, Dropbox®, etc.), utility providers (e.g., electric companies, cable companies, cell phone providers, gas companies, etc.), messaging networks, personal organizers (e.g., calendar and scheduling services, bill pay services, e-mail systems, etc.), governments, businesses (e.g., employers, businesses requesting information concerning the customer 102), or the like. Each of the third-parties may be provided access to different portions of the information associated with the customer 102 that is stored, generated, maintained, and/or controlled in part by the financial institution 104. For example, an e-commerce merchant may be provided access to payment account and billing address information, while a financial health company may be provided access to account balance information and transaction information. As described in further detail below, the customer 102 can provide a given third-party access to designated information, limit access to information, and revoke access to information through an access control portal ("access control tower") provided by the financial institution 104.

The customer 102 is associated with various customer devices 108. The customer devices 108 may include, for example, smartphones, tablet computers, laptop computers, desktop computers, wearables (e.g., smart watches, smart glasses, fitness trackers, etc.), internet of things ("IOT") devices (e.g., Amazon Echo®, smart appliances, etc.). Each of the customer devices 108 may be provided access to different portions of the information associated with the customer 102 that is stored, generated, maintained, and/or controlled in part by the financial institution 104. For example, a smartphone may be provided access to payment account and billing address information for a mobile wallet running on the smartphone, while an IOT device may be provided access to payment information, account balance information, and transaction information to execute purchases and review transactions. As described in further detail below, the customer 102 can provide a given customer device 108 access to designated information, limit access to information, and revoke access to information through the access control tower provided by the financial institution 104. In some arrangements, the customer devices 108 do not communicate with the financial institution computing system 110 via the network 126. For example, the customer devices 108 can include payment cards (e.g., credit cards, debit cards, smart cards, etc.) that have account information that can be linked by the financial institution computing system 110 to account information and customer preferences stored at the financial institution computing system 110.

The devices of the system 100 communicate via the network 126. The network 126 may include any combination of the Internet and an internal private network (e.g., a private network maintained by the financial institution 104). Through data communication over the network 126, the financial institution computing system 110 can share customer information with the third-party systems 106 and the customer devices 108.

The financial institution computing system 110 includes customer information APIs 128 that define how the financial institution computing system 110 communicates customer information with the third-party systems 106 and the customer devices 108. The APIs facilitate the sharing of and access to the customer information stored at the financial institution computing system 110 based on permissions and preferences provided by the customer 102.

The access control circuit 122 controls access to the customer information by the third-party systems 106 and the customer devices 108 via the APIs 128. In some arrangements, the financial institution computing system 110 provisions requested customer data to a given third-party system 106 or customer device 108 for local storage on the third-party system 106 or the customer device 108. For example, the financial institution computing system 110 can provision payment information, such as payment tokens associated with payment accounts, to a mobile wallet system for local storage at the mobile wallet system. In other arrangements, the financial institution computing system 110 provides access to remotely display, present, or analyze customer information stored at the financial institution computing system 110 while the financial institution computing system 110 retains control over the customer information. For example, the financial institution computing system 110 can provide access to a financial health system to present designated customer account information through a financial health website, such as balances, transaction information, and the like, when the financial health system requests the information, without directly transmitting the data to the financial health system.

Generally, through the information management system 100, the customer 102 can provision access to customer information to third-party systems 106 and to customer devices 108 (e.g., by permitting the third-party system 106 or the customer device 108 to communicate with the financial institution computing system 110 to retrieve the customer information). The customer information is maintained by the financial institution 104 via the financial institution computing system 110. The customer information can include any information associated with the customer 102 that is generated by or maintained by the financial institution 104, including customer account information (e.g., account numbers, billing address, balance information, transaction information, account type information, account statements, etc.), personal information (e.g., date of birth, social security number, tax identifications, addresses, phone numbers, e-mail addresses, aliases, etc.), information provided to the financial institution 104 during the account opening process (e.g., driver's license scans, passport scans, marriage certificates, property deeds, etc.). Additionally, customer information can include any other information provided by the customer 102 to the financial institution 104 for the purposes of controlling access to the provided information. This other information may include data files, personal information, documents, or the like. The customer 102 can provision access to the customer information through the third-party, the customer device 108, or via the FI computing system data control tower. Additionally, the customer 102 can manage all previously provided access permissions via the data control tower to change an access level, set permissions, revoke access, or the like. As described herein, the provision of the customer information can be managed on a payment level (e.g., managing all third-party and device access to customer account identifying information such as account numbers and billing addresses for the purposes of making payments), on an application level (e.g., managing third party and device access to customer information for purposes of incorporating such information into third party applications), and on a device level (e.g., managing the devices that may receive the customer information).

Figure 2:
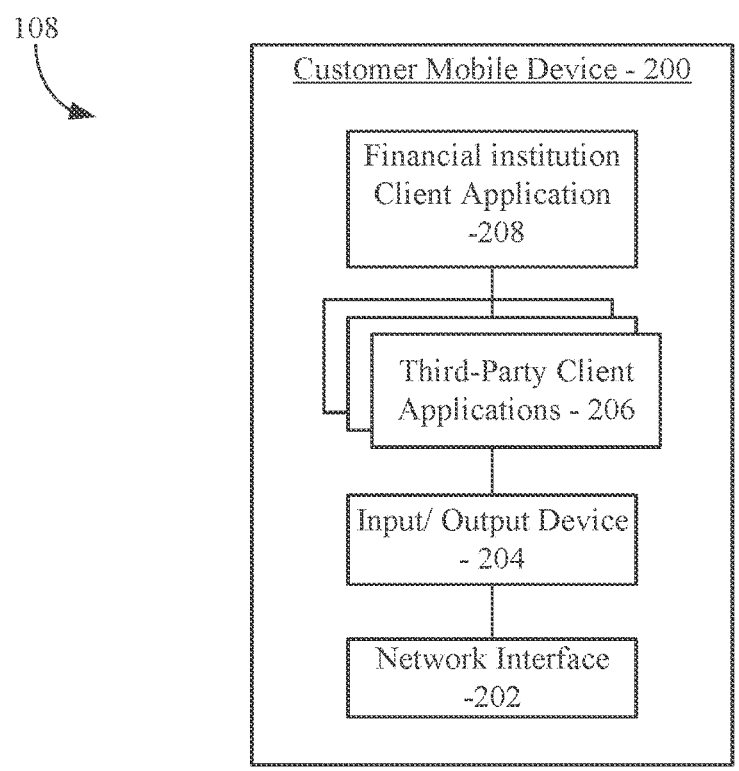
FIG. 2 is a block diagram of a customer mobile device, according to an example embodiment.

Referring now to FIG. 2, a more detailed view of a customer device 108 is shown, according to an example embodiment. The customer device 108 shown in FIG. 2 is a customer mobile device 200. The customer mobile device 200 is structured to exchange data over the network 126, execute software applications, access websites, generate graphical customer interfaces, and perform other operations described herein. The customer mobile device 200 may include one or more of a smartphone or other cellular device, a wearable computing device (e.g., eyewear, a watch or bracelet, etc.), a tablet, a portable gaming device, a laptop, and other portable computing devices.

In the example shown, the customer mobile device 200 includes a network interface 202 enabling the customer mobile device 200 to communicate via the network 126, an input/output device ("I/O" device) 204, third party client applications 206, and a financial institution client application 208. I/O device 204 includes hardware and associated logics configured to to exchange information with a customer and other devices (e.g., a merchant transaction terminal). An input aspect of the I/O device 204 allows the customer to provide information to the customer mobile device 200, and may include, for example, a mechanical keyboard, a touchscreen, a microphone, a camera, a fingerprint scanner, any customer input device engageable to the customer mobile device 200 via a USB, serial cable, Ethernet cable, and so on. An output aspect of the I/O device 204 allows the customer to receive information from the customer mobile device 200, and may include, for example, a digital display, a speaker, illuminating icons, LEDs, and so on. The I/O device 204 may include systems, components, devices, and apparatuses that serve both input and output functions, allowing the financial institution computing system 110 exchange information with the customer mobile device 200. Such systems, components, devices and apparatuses include, for example, radio frequency transceivers (e.g., RF or NFC-based transceivers) and other short range wireless transceivers (e.g., Bluetooth, laser-based data transmitters, etc.).

Third party client applications 206 are structured to provide the customer with access to services offered by various third parties (e.g., associated with third party systems 106). Some third party client applications 206 may be hard coded onto the memory of the customer mobile device 200, while other third party client application 206 may be web-based interface applications, where the customer has to log onto or access the web-based interface before usage, and these applications are supported by a separate computing system comprising one or more servers, processors, network interface circuits, or the like (e.g., third party systems 106), that transmit the applications for use to the mobile device.

In some arrangements, the third party client applications 206 are structured to permit management of at least one customer account associated with a third party service. Accordingly, a particular third party client application 206 may be communicably coupled to a third party system 106 via the network 126. Through this communicative coupling, the third party system 106 may provide displays regarding the particular third party service or application. For example, one third party client application 206 may include a calendar application, and the displays provided by third party client application 206 may enable the customer 102 to input information regarding customer events, meetings, appointments (e.g., information regarding the timing and location of customer events). Upon the customer 102 inputting such information regarding the customer events, the customer-input information is stored at a third party system 106, and incorporated into future displays provided to the customer 102 via the third party client application. Through such displays, the customer 102 is able view the previously-input information via a calendar interface. Other third party client applications 206 include, but are not limited to financial health applications (e.g., applications configured to provide the customer 102 with financial advice), and social media applications.

In some embodiments, some of the third party client applications 206 include APIs specifically configured to request information from the financial institution computing system 110. For example, the financial institution 104 may have arrangements with third parties providing third party client applications 206. Under such arrangements, the customer 102 is able to provide particular third party client applications 206 with access to subsets of information pertaining to the customer 102 stored at the financial institution computing system 110 (e.g., in the accounts database 124). Upon the customer 102 providing such permission to a third party client application 206, the customer mobile device 200 may transmit information requests to the financial institution computing system 110 via such APIs, and utilize information received from the financial institution computing system 110 to update the displays rendered viewable by the customer 102 via the third party client application 206.

To illustrate, the customer 102 may provide a calendar application with customer bill payment information stored at the financial institution computing system 110. The calendar application may include a widget specifically configured to enable the customer 102 to insert the bill payment information into the calendar application. This way, the customer 102 is reminded of bill payments in the third party client application 206.

In various arrangements, the particular communications channel through which customer financial information is provided to the third party client application 206 may vary depending on the implementation of the third party client application 206. For example, if the third party client application 206 is web-based, a third party system 106 providing the third party client application 206 to the customer mobile device 200 may receive the customer information maintained at the financial institution computing system 110, and incorporate that information into various displays rendered on the customer mobile device 200 via the third party client application 206

In situations where a third party client application 206 is a native application on the customer mobile device 200, the customer mobile device 200 may formulate and transmit an information request via an API in the third party client application 206 to the financial institution computing system 110. The information request may include an identifier (e.g., encryption key) that is based at least in part on the identity of the third party client application 206, on the type of information that may be shared with the third party client application 206, and/or on the customer devices 108 from which the information request may be transmitted. In some implementations, the information request may be routed via financial institution client application 208. For example, the third party client application 206 may make a request to the financial institution client application 208, which obtains the requested information from the financial institution computing system 110. As such, depending on the application permissions provided by the customer 102 via the methods described herein, the financial institution computing system 110 (and/or the financial institution client application 208) may allow or deny the third party client application 206 access to the requested information.

The financial institution client application 208 is structured to provide displays to the customer mobile device 200 that enable the customer 102 to manage financial accounts. Accordingly, the financial institution client application 208 is communicably coupled to the financial institution computing system 110 (e.g., the account management circuit 120 and the access control circuit 122) and is structured to permit management of the customer financial accounts and transactions. The displays provided by the financial institution client application 208 may be indicative of current account balances, pending transactions, profile information (e.g., contact information), and the like.

Further, in some embodiments, the financial institution client application 208 is structured to present displays pertaining to the access control tower discussed herein. In this regard, via the financial institution client application 208, the customer mobile device 200 is configured to receive various datasets from the financial institution computing system 110 describing the entities (e.g., third party systems 106, customer devices 108, third party applications 206) to which the customer 102 has provided access to customer financial information. The customer mobile device 200, via the financial institution client application 208, is configured to render such datasets into various data control tower interfaces. As described herein, through such interfaces, the customer 102 is able to modify the quantity of information available to these entities, and provide additional entities with access to information at the financial institution computing system 110.

In some embodiments, the customer mobile device 200 is configured (e.g., via the financial institution client application 208) to perform various operations described herein as being performed by the financial institution computing system 110. For example, in one embodiment, financial institution client application 208 includes APIs structured to integrate with various third party client applications 206 on the customer mobile device 200. Through such APIs, customer information received from the financial institution computing system 110 via the financial institution client application 208 may be shared with the third party client applications 206, and utilized by the third party client applications 206.

In some embodiments, the financial institution client application 208 is a separate software application implemented on the customer mobile device 200. The financial institution client application 208 may be downloaded by the customer mobile device 200 prior to its usage, hard coded into the memory of the customer mobile device 200, or be a web-based interface application such that the customer mobile device 200 may provide a web browser to the application, which may be executed remotely from the customer mobile device 200. In the latter instance, the customer 102 may have to log onto or access the web-based interface before usage of the applications. Further, and in this regard, the financial institution client application 208 may be supported by a separate computing system including one or more servers, processors, network interface circuits, etc. that transmit applications for use to the customer mobile device 200.

It should be understood that other customer devices 108 (e.g., customer devices 108 other than a customer mobile device 200) may include applications that are similar to the third party client applications 206 and financial institution client application 208 discussed above. For example, a customer smart appliance may include an application associated with the financial institution 104 that enables the customer 102 to view the access control tower, and manage customer accounts. In another example, a customer smart speaker may include an application through which the customer 102 may modify access permissions to various entities via voice commands.

Figure 3:
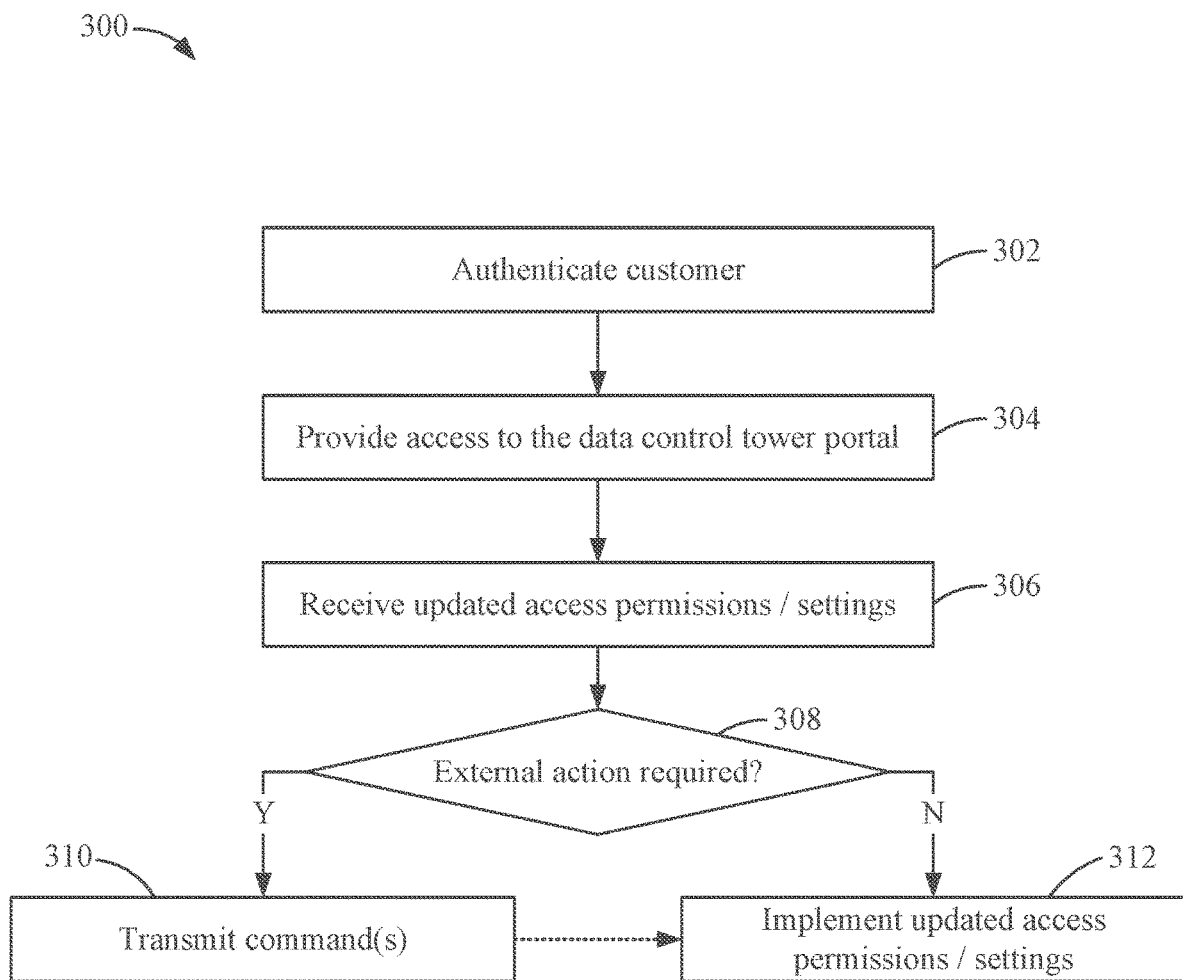
FIG. 3 is a flow diagram of a method of managing access to customer information maintained by a financial institution, according to an example embodiment.

Referring to FIG. 3, a flow diagram of a method 300 of managing access to customer information maintained by the financial institution 104 is shown according to an example embodiment. The method 300 is performed by the financial institution computing system 110 (e.g., by the access control circuit 122, by the processor 116, etc.).

The method 300 begins when a customer 102 is authenticated at 302. The financial institution computing system 110 receives an authentication request from the customer 102 via a computing device associated with the customer (e.g., a smartphone via a mobile banking application, a computing device via a web-based banking portal, etc.). In an alternate arrangement, the request may be received via an ATM (or other computing device allowing a user to perform financial transactions, such as receiving cash, making payments, transferring funds, etc.) associated with the financial institution 104. The authentication request indicates that an individual purporting to be the customer 102 is attempting to access the access control tower to manage access to the customer information associated with the customer 102. The authentication request includes customer authentication information (e.g., customer name, password, biometric, debit card dip in an ATM, PIN, etc.). Based on the customer authentication information, the request is either granted or denied. If the request is denied, step 302 of the method 300 does not occur, and the method 300 ends. The description of the method 300 continues for situations in which the customer 102 is authenticated.

Access to the data control tower portal is provided at 304. After the customer 102 is authenticated, the financial institution computing system 110 provides the customer 102 access to the data control tower portal. The access to the data control tower portal may be facilitated through a computing device associated with the customer (e.g., a smartphone via a mobile banking application, a computing device via a web-based banking portal, etc.). The computing device presents interactive graphical customer interfaces to the customer 102 through which the customer 102 can manage the access controls for the customer information. The data control tower portal may be part of a mobile banking application or a remote banking website associated with the financial institution 104. As noted above, in some arrangements, the access to the customer information can be managed on a payments level (e.g., managing all of the third parties that the customer 102 may engage in a transaction with accounts held by the customer 102 at the financial institution 104), on a device level (e.g., managing which customer devices 108 have access to data stored at the financial institution computing system 110), and on an application level (e.g., managing all third party client applications 206 on a customer mobile device 200 that have access to information stored at the financial institution computing system 110). FIGS. 4-7 and FIGS. 11-13 show example customer interfaces associated with the data control tower that demonstrate various management features of the data control tower.

Figure 4:
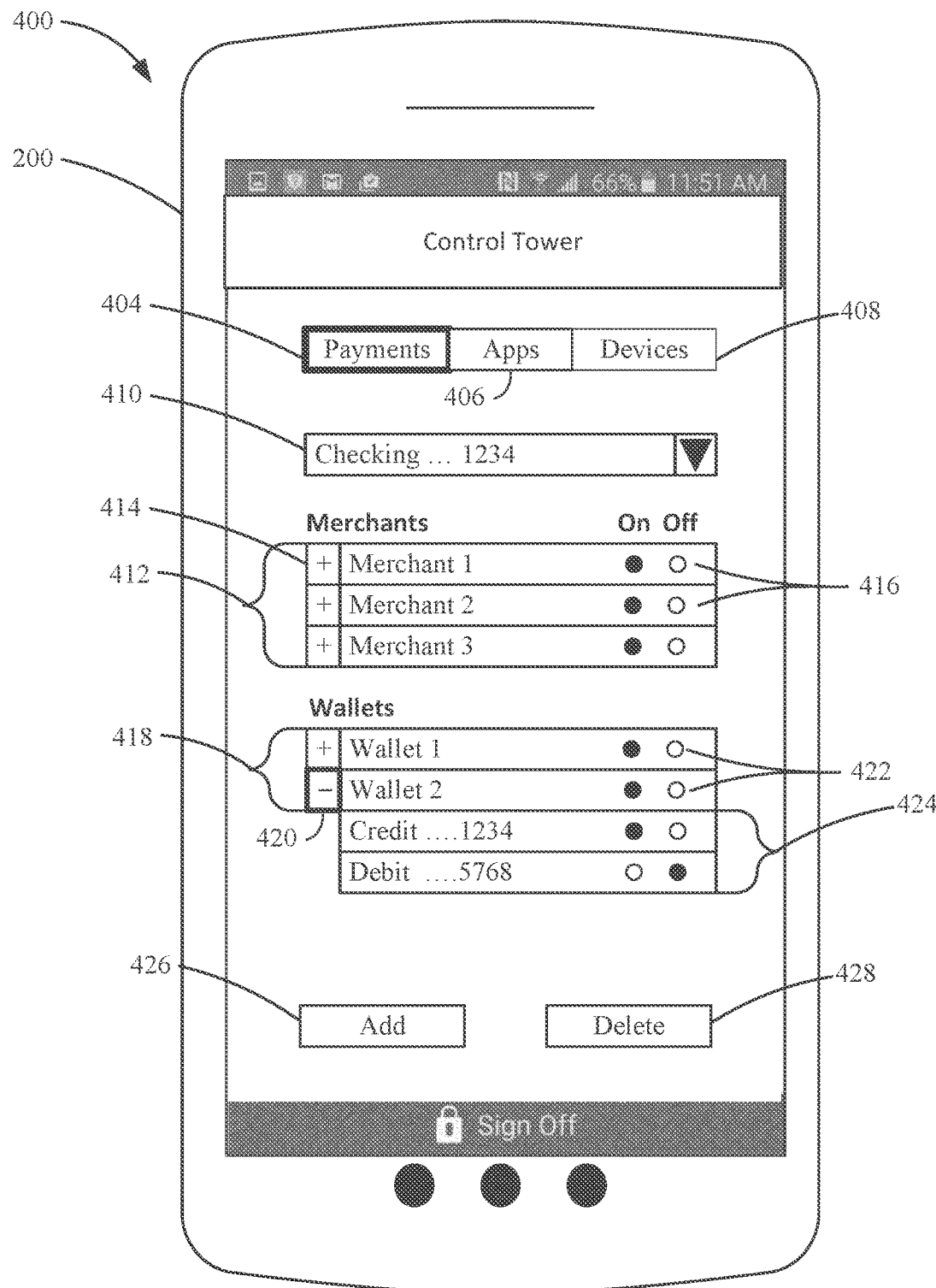
FIGS. 4-7 each show example data control tower customer interfaces, according to example embodiments.

Referring to FIG. 4, a data control tower customer interface 400 is shown according to an example embodiment. The customer interface 400 is shown as a display on the customer mobile device 200. The customer interface 400 includes a payments toggle 404, an applications toggle 406, and a devices toggle 408. As shown by the bolded outline of the payments toggle 404, the payments toggle 404 is selected. Accordingly, the customer interface 400 is a payment level customer interface. While in the payment level customer interface, the customer 102 can select an account held by with the financial institution 104 via the dropdown box 410. As shown in FIG. 4, the customer 102 has selected a checking account. After selecting a specific account, a merchant listing 412 and a wallet listing 418 is populated. Each entry in the merchant listing 412 identifies a merchant (e.g., brick-and-mortar merchants and ecommerce merchants) to which the customer 102 has provided or may provide permission to make a payment with an account (e.g., the selected checking account) held by the customer 102 at the financial institution 104.

To populate the merchant listing 412, the financial institution computing system 110 may access the accounts database 124. For example, the access control circuit 122 may retrieve a customer transaction history from the accounts database 124 and identify various merchants at which the customer 102 performed transactions using the selected checking account (or other accounts held by the customer 102 at the financial institution 104). Alternatively, the customer 102 may have previously permitted the financial institution 104 to provide account information to various merchants (e.g., via the add button 426 described below). Alternatively, the financial institution computing system 110 may transmit various requests to third party systems 106 which, in response (e.g., via various APIs provided at the third party systems 106) may transmit indications to the financial institution computing system 110 that the customer 102 has provided information describing the checking account (e.g., an account number) to the third party system 106. For example, the financial institution 104 may have arrangements with various merchants. Under such arrangements, the merchants may agree to notify the financial institution 104 upon the customer providing information associated with the financial institution 104 (e.g., information pertaining to a customer account) to the merchant.

Each entry in the merchant listing 412 may include a display button 414 as well as a status indicator 416. By pressing the display button 414 associated with a particular entry, the customer may provide an input to program logic being executed by the customer mobile device 200 (e.g., program logic that is part of the financial institution client application 208) to update the interface 400 to incorporate a merchant access mechanism for the merchant of the entry. The merchant access mechanism may be incorporated into the interface 400 in a similar manner as the wallet access mechanisms 424 described below. The merchant access mechanism may identify the information pertaining to the checking account (or other account) that was provided to the merchant. In various embodiments, the merchant access mechanism may include a tokenized account number (e.g., a surrogate value for the actual account number of the checking account), an actual account number, a debit card number, and so on.

The status indicators 416 indicate the status of various access permissions that the customer 102 has provided to various merchants. In the example shown in FIG. 4, the customer 102 is currently permitting each of the merchants identified in the merchant listing 412 to access at least some form of customer information maintained at the financial institution computing system 110. However, in some embodiments, the customer 102 may provide an input to program logic being executed by the customer mobile device 200 by interacting with the status indicators 416. For example, the customer 102 may revoke a particular merchant's permission to access customer information by pressing the "off" portion of a particular status indicator 416. In response, the customer mobile device 200 may transmit a notification signal to the financial institution computing system 110 and, in response, the access control circuit 122 may update the permissions for that merchant such that the financial institution computing system 110 will not grant various information requests regarding the customer 102 transmitted by the third party system 106 to the financial institution computing system 110 over the network 126. Alternatively or additionally, the financial institution computing system 110 may update settings associated with the customer 102's account such that any transaction request from that merchant is denied. Thus, by the interface 400, the customer 102 is able to control the access of various third party systems 106 to information.

Still referring to FIG. 4, the interface 400 further includes a wallet listing 418. The wallet listing 418 may include various entries (e.g., wallet 1 and wallet 2) describing various payment services that the customer has permitted the financial institution 104 to provide account information to. The payment services may include applications through which the customer 102 may perform various types of transactions (e.g., online transactions, person-to-person transactions, mobile wallet transactions, etc.). As such, entries in the wallet listing 418 may include mobile wallet applications (e.g., Samsung Pay®, Apple Pay®, etc.) and person-to-person payment applications (e.g., Venmo®, Zelle™, PayPal®, etc.). Similar to the entries in the merchant listing 412 discussed above, each entry may include a display button 420 and a status indicator 422. As indicated by the bolded outline of the display button 420, the display button 420 associated with a particular entry in the wallet listing 418 has been selected by the customer 102. As shown, upon the customer 102 selecting the display button 420, various wallet access mechanisms 424 are shown.

The wallet access mechanisms 424 may include the information that the customer 102 has permitted the payment service associated with the entry (e.g., wallet 2) of the wallet listing to access by the methods described herein. In the example shown, the wallet access mechanisms 424 present the customer 102 information pertaining to all account information that the customer 102 has permitted the payment service to access. As such, wallet access mechanisms 424 include an account number associated with both a credit account and a debit account (e.g., associated with the checking account). It should be understood that, in alternative arrangements, only wallet access mechanisms associated with the account selected via the dropdown box 410 may be shown. Additionally, different wallet access mechanisms 424 such as tokens, account names, and the like associated with the customer 102's accounts may also be shown. As shown in FIG. 4, the customer 102 has turned off the payment service's access to the debit card number associated with the checking account, and permitted the payment service to access to access the credit card number associated with a credit account held by the customer 102. In some embodiments, responsive to the customer 102 revoking an access permission to a particular wallet, the financial institution computing system 110 may transmit a signal to a third party wallet provider associated with the wallet configured to cause a payment token or the like to be deleted at the third party wallet provider.

The customer interface 400 also includes an add button 426 and a delete button 428. If the customer 102 interacts with the add button 426, the customer 102 can add a new merchant and/or payment service to the merchant listing 412 and/or wallet listing 418. For example, in response to the customer 102 selecting the add button 426, an additional interface is presented to the customer 102. The additional interface may include a drop down menu listing various merchants that the customer 102 may select to provide permission to access the customer information. Additionally, the interface may enable the customer 102 to identify the particular information that may be provided to the identified merchant. Upon the customer selecting a particular merchant to grant permission, the financial institution computing system 110 may update the access permissions stored in association with the account of the customer 102. As a result, upon receipt of a request from the identified merchant (e.g., via a third party system 106 over the network 126), the financial institution computing system 110 may provide the selected information to the merchant.

Figure 5:
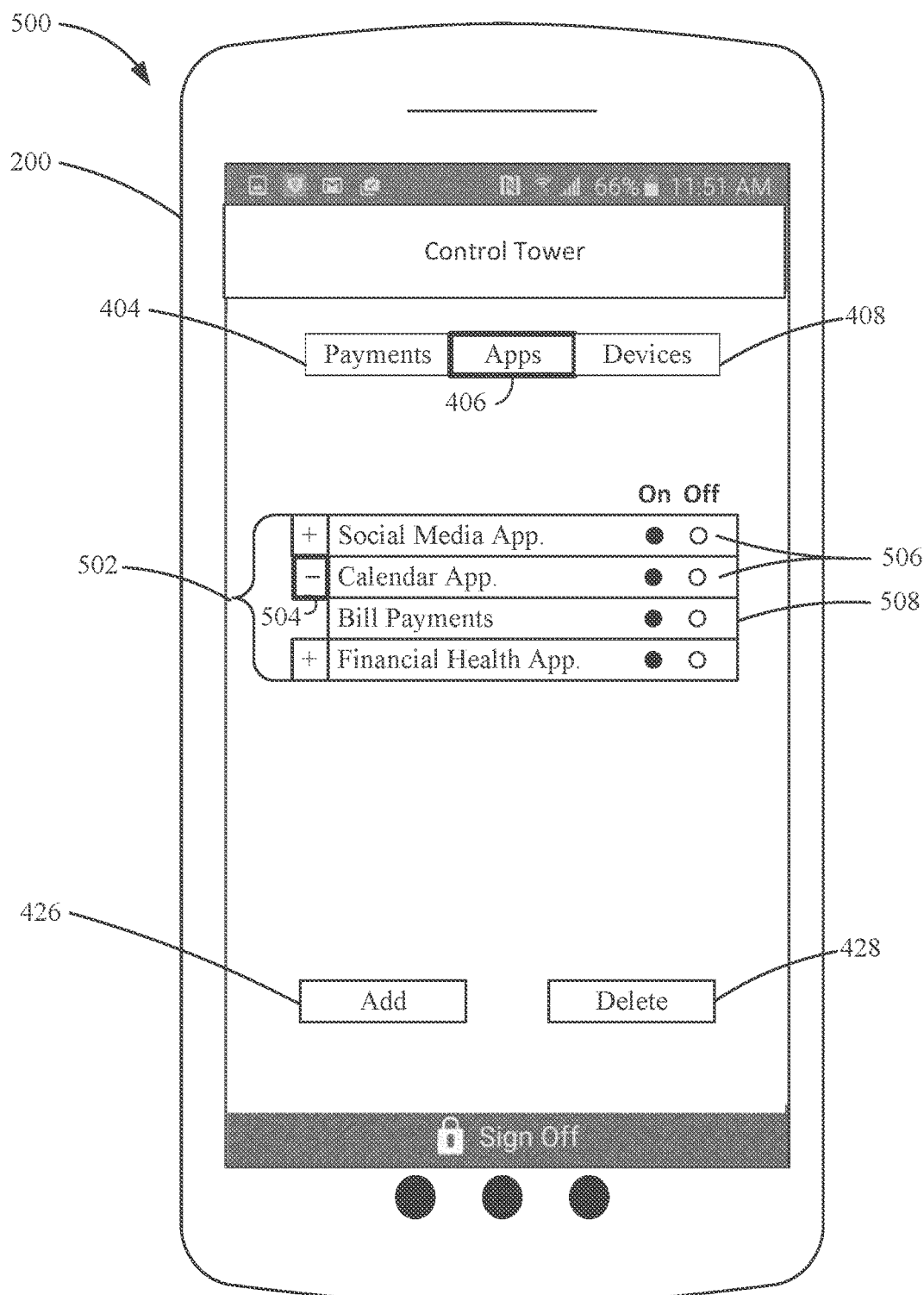

Referring to FIG. 5, a data control tower customer interface 500 is shown according to an example embodiment. The customer interface 500 is similar to the customer interface 400. As such, like numbering is used between FIGS. 4 and 5 to designate like components of the customer interfaces 400 and 500. The customer interface 500 is shown as being displayed on the customer mobile device 200. As with the customer interface 400, the customer interface 500 includes the payments toggle 404, the application toggle 406, and the devices toggle 408. As shown by the bolded outline of the applications toggle 406, the applications toggle 406 is selected. Accordingly, the customer interface 500 is an application level management customer interface. As shown, the interface 500 includes a listing 502 of various applications that the customer 102 has provided access to various forms of customer information maintained at the financial institution computing system 110. The listing 502 may include various third party client applications 206 installed on the customer mobile device 200 and/or other customer devices 108 that the customer 102 has provided access to information stored at the financial institution computing system 110.

Similar to the interface 400 discussed above, each entry in the application listing 502 may include a display button 504 and a status indicator 506. As indicated by the bolded outline of the display button 504, the customer 102 has selected the display button 504 to cause an application access mechanism 508 to be shown. The application access mechanism 508 may include a description of the customer information to which the customer 102 has provided the application access. In the example shown, the application associated with the selected display button 504 is a calendar application and the access mechanism is the customer's bill payments. By providing the calendar application with access to the customer 102's bill payments, the customer 102 may be reminded of upcoming payments via the calendar application. As such, various events or reminders may be created by the calendar application based on the information provided by the financial institution 104. For example, upon the customer 102 providing the calendar application with access to customer bill payment information (e.g., describing the recipient of the upcoming payment, the due date, and the amount owed), the calendar application may list upcoming payments owed by the customer 102.

The customer 102 may first provide the calendar application with access to customer bill payment information by, for example, hitting the add button 426. Upon the customer 102 hitting the add button 426, the customer 102 may be brought to another interface enabling the customer 102 to identify an application to provide with access to customer financial data.

Figure 6:
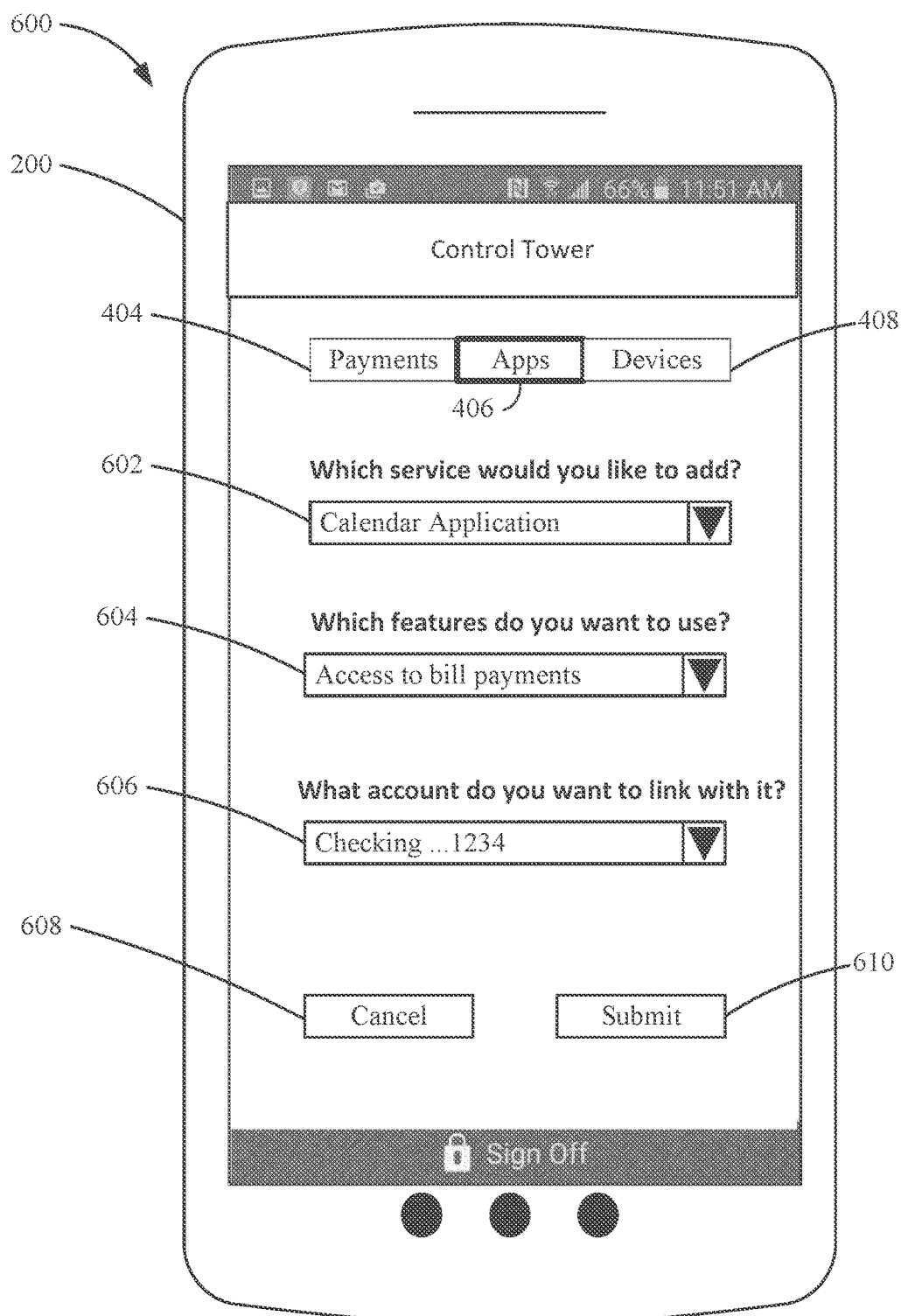

Referring now to FIG. 6, a data control tower customer interface 600 is shown according to an example embodiment. Like numbering is used between FIGS. 4-6 to designate like components of the customer interfaces 400, 500, and 600. The customer interface 600 is shown as displayed on the customer mobile device 200. As with the customer interfaces 400 and 500, the interface 600 includes a payment toggle 404, and application toggle 406, and a devices toggle 408. As shown by the bolded outline of the application toggle 406, the application toggle 406 is selected. In some embodiments, the customer interface 600 is presented upon the customer 102 selecting the add button 426 of the interface 500 discussed above. The interface 600 includes an application dropdown 602, a features dropdown 604, an account selection dropdown 606, a cancel button 608, and a submit button 610. The application dropdown 602 includes a list of various applications. For example, upon the customer 102 selecting the add button 426 on the interface 500, program logic being executed by a processor of the customer mobile device 200 may access an application registry to identify various applications installed on the customer mobile device 200. The application dropdown 602 may include an entry for each application installed on the customer mobile device 200. Alternatively, the application dropdown 602 may include a subset of the applications installed on the customer mobile device 200. For example, the financial institution 104 may only share customer information with a set of applications provided by trusted entities. As such, the program logic being executed by the processor of the customer mobile device 200 may cross reference the applications that are installed on the customer mobile device 200 with a list of trusted applications (e.g., based on application keys, titles, or the like) and incorporate the trusted applications that are installed on the customer mobile device 200 into the application dropdown.

The features dropdown 604 may include a dropdown list of various forms of information maintained by the financial institution computing system 110. Using the features dropdown, the customer 102 may select the forms of information to share with the application selected via the application dropdown 602. In some arrangements, the forms of information provided by the features dropdown 604 may be dependent on the particular application selected by the customer 102. Accordingly, once the customer 102 selects an application via the application dropdown, the features dropdown 604 may be populated. In the example shown, the customer 102 has selected a calendar application via the application dropdown 602 and selected to provide the calendar application with access to information regarding customer bill payments. After providing the calendar application with such access, the customer 102 may setup the calendar application to use the bill payment information. Such a setup process is described below in relation to FIGS. 8 and 9.

The accounts dropdown 606 lists various accounts held by the customer 102 at the financial institution 104. The customer 102 may select the account to use in conjunction with the selected application and/or feature. In the example shown, the customer 102 has selected a checking account to use in conjunction with a bill payment features integrated with the calendar application. Thus, according to the processes described below, the customer 102 may setup payments via the calendar application using the selected payment account. The cancel button 608 enables the customer 102 to cancel adding an application to the listing 502 of the interface 500. In some embodiments, upon the customer 102 selecting the cancel button 608, the customer 102 is brought back to the interface 500. The submit button 610 enables the customer 102 to provide an input to the program logic being executed to the customer mobile device 200 to share the identified information with the selected application. As such, the selected information may be incorporated into the selected application to facilitate the customer 102's utilization of the selected application.

Figure 7:
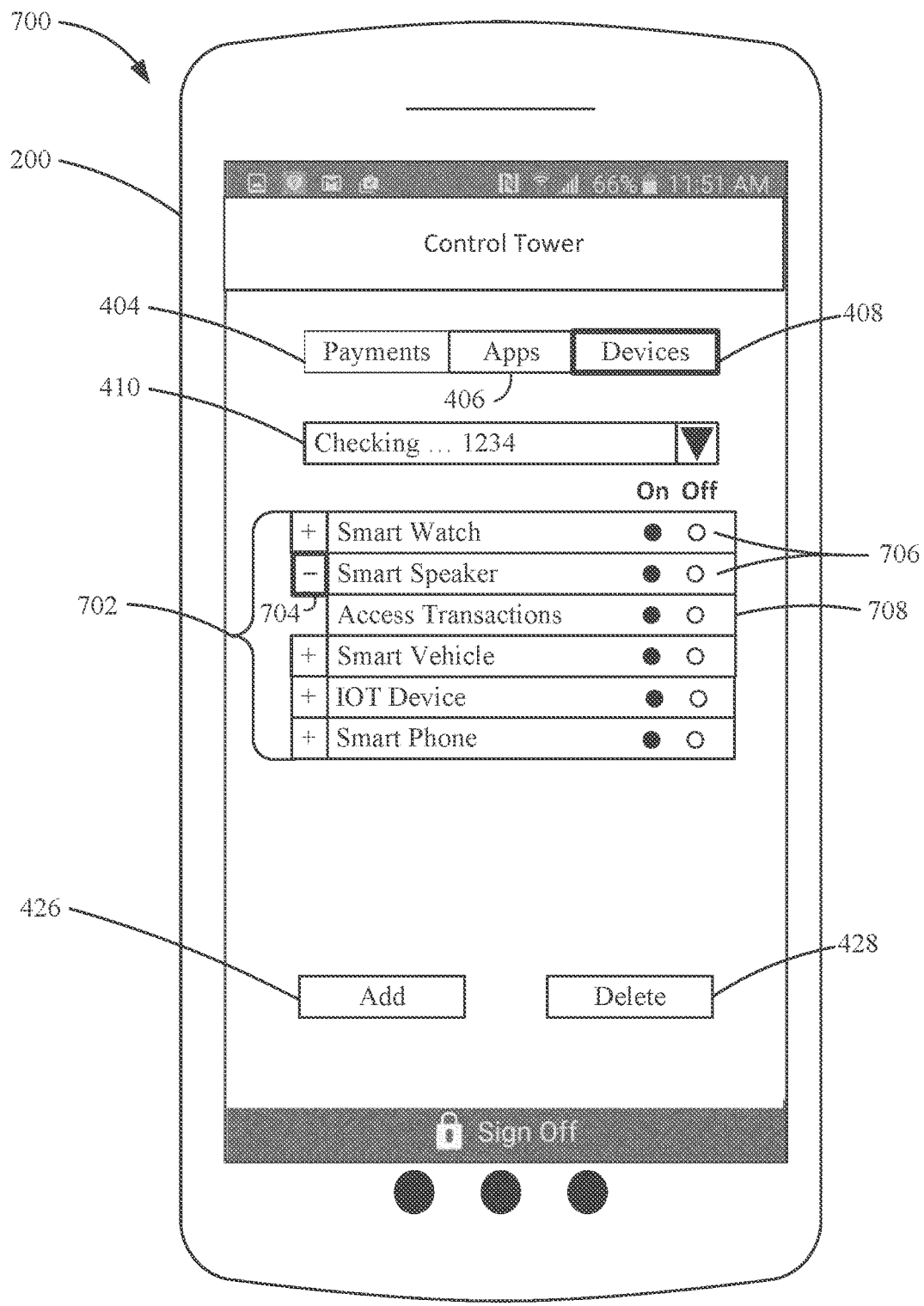

Referring now to FIG. 7, a data control tower customer interface 700 is shown according to an example embodiment. The customer interface 600 is similar to the customer interfaces 400 and 500. Like numbering is used between FIGS. 4-7 to designate like components. The customer interface 700 is shown as displayed on the customer mobile device 200. As with customer interfaces 400 and 500, the customer interface 700 includes the payments toggle 404, the applications toggle 406, and the devices toggle 408. As shown by the bolded outline of the devices toggle 408, the devices toggle 408 is selected by the customer 102. Accordingly, the customer interface 700 is a device level management customer interface. While in the device level management customer interface, the customer 102 can manage the information that various customer devices 108 have access to.

In the example shown, the interface 700 includes a device listing 702. The device listing may list various customer devices 108 that the customer 102 has registered with the financial institution 104. For example, for each customer device 108, the customer 102 may download and install an application provided by the financial institution 104, or register the customer device 108 via a website provided by the financial institution computing system 110. Upon registration and/or installation, a device identifier may be assigned to each customer device 108 by the financial institution computing system 110 and stored in association with the customer 102 (e.g., in the accounts database 124). Upon the customer 102 accessing the data control tower portal (e.g., at step 304 of the method 300), the financial institution computing system 110 may retrieve the various device identifiers stored in association with the customer 102 and transmit a device dataset to the customer mobile device 200 that is used by, for example, a mobile banking application of the customer mobile device 200 to populate the listing 702.

Various forms of customer devices 108 may populate various entries of the listing 702. Customer devices 108 may include, for example, smart phones, wearable computing devices (e.g., smart watches, smart glasses, and the like), smart speakers, vehicle computing devices, various IOT devices (e.g., thermostats, appliances, televisions, and the like), smart phones, tablets, video game consoles, and the like. Similar to the interfaces 400 and 500, each entry in the listing 702 may include a display button 704 and a status indicator 706. As shown by the bolded outline of the display button 704, the display button 704 of that particular entry has been selected by the customer 102. Selection of the display button 704 causes a device access mechanism 708 to be presented to the customer 102. Device access mechanism 708 may inform the customer 102 as to the type of information that may be accessed via the customer device 108 associated with the entry. In the example shown, the customer 102's smart speaker (e.g., an Amazon Echo®) has been provided with access to the transaction history of the customer maintained at the accounts database 124. In some embodiments, in response to the customer 102 selecting the display button 704, a plurality of potential device access mechanisms 708 may be presented to the customer 102. The device access mechanisms 708 may include all potential information that the customer may provide to the customer device 108 associated with the selected entry. Depending on the implementation, such device access mechanisms may include, amongst other things, customer account balance information, customer bill payment information, a customer transaction history, customer alerts, and customer account identifying information (e.g., account numbers, tokens, etc.).

By hitting the display button 704, the customer 102 may selectively modify the access of various customer devices 108 to various forms of information via manipulation of the status indicators 706. For example, by manipulating a status indicator 706 relating to a particular customer device 108, the customer 102 may provide an input to program logic (e.g., of a mobile banking application) being executed by the processor the customer mobile device 200. The input may cause the customer mobile device 200 to transmit a signal to the financial institution computing system 110 over the network 126 causing the financial institution computing system 110 to update customer account settings. For example, upon receipt of such a signal, the financial institution computing system 110 may update an entry of a customer device dataset maintained at the accounts database 124. The entry may include the device identifier discussed above associated with the selected customer device 108 as well as various access permissions. The entry may be updated such that, if the customer 102 were to attempt to access information from the selected customer device 108, the information would not be provided to the customer device 108 (e.g., the customer 102 may be presented with an "information unavailable" screen, or the like).

While the above examples relate to interfaces presented to the customer 102 via a customer mobile device 200, it should be understood that the customer 102 may perform similar operations with respect to several other types of customer devices 108. For example, the customer 102 may also adjust the third party systems 106 that have access to the customer financial information via a smartwatch, a smart appliance, a computing system in a vehicle of the customer 102, a smart speaker, and any other customer device 108 via applications or websites associated with the financial institution 104 implemented thereon.

Referring again to FIG. 3 and the method 300, updated access permissions or settings are received at 306. The financial institution computing system 110 receives the updated access permissions or settings from the customer 102 via the access control tower portal (e.g., from a computing device that the customer 102 is using to access the access control tower portal). The updated access permissions or settings may relate to merchants, payment services, applications, and devices discussed with respect to FIGS. 4-7.

The financial institution computing system 110 determines if external action is required to implement the updated access permissions or settings at 308. In some arrangements, the type of access permission or setting being updated requires that the financial institution computing system 110 transmits commands to a customer device 108 or to a third-party system 106 to implement the updated access permissions or settings. For example, if the updated access permission or setting relates to revoking or provisioning a payment token stored on a customer device 108, the financial institution computing system 110 may need to send a command to either (1) deactivate or remove the payment token from the customer device 108 or the third-party systems 106 affiliated with the mobile wallet (e.g., a third-party mobile wallet server, a payment network server that manages a token vault associated with the payment token, etc.) or (2) activate or provision the token to the mobile wallet via the customer device 108 and/or the third-party systems 106. In other arrangements, the type of access permission or setting being updated can be performed at the financial institution computing system 110 without additional commands sent to a customer device 108 or a third-party system 106. For example, if the updated access permission or setting relates to revoking a third-party's access to account balance information, the financial institution computing system 110 can perform an internal update at the financial institution computing system 110 adjusting the API permissions associated with the third-party without the need to send a command to the third-party system 106 associated with the affected third-party.

If external action is required, commands are transmitted to the appropriate recipient at 310. The financial institution computing system 110 transmits the update commands to the appropriate third-party systems 106 and/or customer devices 108. If no external action is required, the updated access permissions or settings are implemented at 312. The financial institution computing system 110 updates internal account access permissions or settings in the accounts database 124. Additionally, in some arrangements, the update to the account access permissions or settings requires both external and internal action. In such arrangements, both steps 310 and 312 are performed. Based on the updated settings and permissions, the financial institution computing system 110 facilitates the sharing (or denial of requests to access) customer information to the external systems (e.g., customer devices 108 and third-party systems 106).

In an example implementation, the customer 102 may utilize the data control portal to update payment information stored at various third party systems 106. For example, if the customer 102 gets a new account at the financial institution 104 or loses a credit card, the customer 102 may wish to update the payment information stored at the various third party systems 106. In some embodiments, upon the customer 102 updating account information stored in the accounts database 124, the financial institution computing system 110 (e.g., via the access control circuit 122) is configured to provide the updated information to the various third parties, applications, and devices to which the customer has provided access via the data control portal. For example, upon the customer changing an account number, the financial institution computing system 110 may transmit an information packet including the updated account information and a customer identifier to the third party system 106 associated with a particular merchant. Such customer identifiers may be established between the financial institution 104 and third party upon the customer providing the third party with access to information stored at the financial institution computing system 110. Thus, based on the customer identifier, the third party system 106 may identify a customer account at the third party (e.g., a shopping account) and update the customer's financial information associated with the account. Such a process may be repeated for any third party systems 106 having access to customer financial information. As such, the customer need not update account information stored at individual third party systems 106, as this can be accomplished via a single visit to the data control tower.

Figure 8:
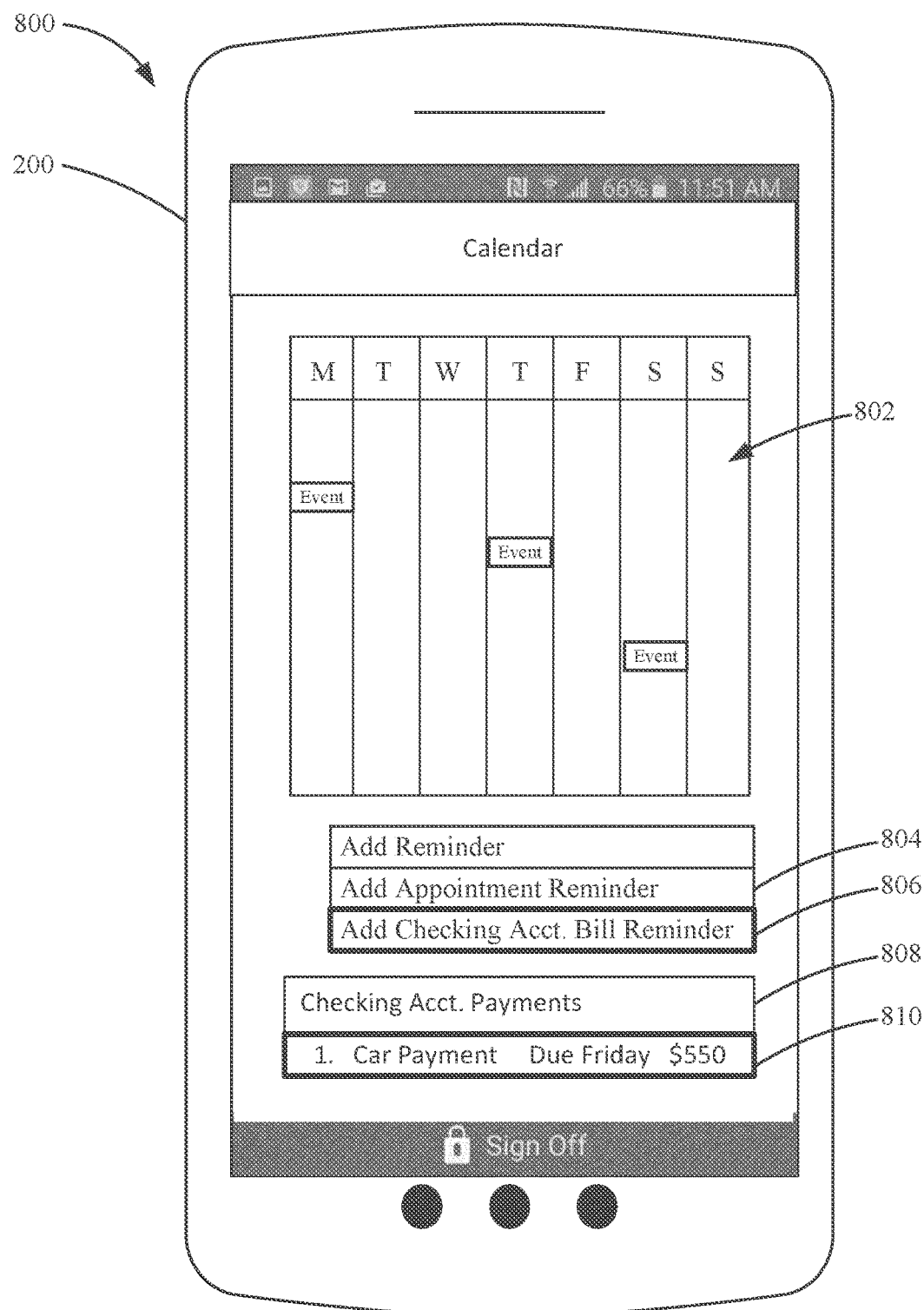
FIGS. 8-9 show third party client application customer interfaces, according to example embodiments.

Referring now to FIG. 8, a third party client application interface 800 is shown, according to an example embodiment. The third party client application interface 800 may be rendered by a third party client application 206 on the customer mobile device 200 upon the customer 102 providing the third party client application 206 with access to financial data (e.g., as discussed above with respect to FIGS. 5 and 6). In the example shown, the third party client application 206 is a calendar application. As such, the interface 800 includes a calendar window 802 describing various customer events. The interface 800 also includes addition buttons 804 enabling the customer 102 to add items that are included in the calendar window 802. In the example shown, among the addition buttons 804 is a financial event button 806. In an example, the third party client application 206 rendering the interface 800 includes a widget specifically configured to generate the financial event button 806 upon receipt of financial data from the financial institution computing system 110. In the example shown, the customer 102 has provided the third party client application 206 with information regarding customer bill payments (coinciding with the example shown in FIG. 6).

In an example, upon the customer 102 selecting the financial events button 806, the third party client application 206 configures the customer mobile device 200 to request customer bill payment information (e.g., via the customer mobile device 200 or via a combination of the customer mobile device 200 and a third party system 106) from the financial institution computing system 110. In response, the financial institution computing system 100 verifies that the access permissions stored in association with the customer 102 permit the requested information to be provided to the third party client application 206. If so, the requested customer financial data is provided to a computing system (e.g., the customer mobile device 200 or a third party system 106) associated with the third party client application 206.

Third party client application interface 800 further includes a financial information window 808 that includes the customer financial information received from the financial institution computing system 110. In the example shown, the financial information window 808 lists an upcoming bill payment 810. As such, through the systems and methods disclosed herein, the customer 102 is able to request and view financial data from various vantage points.

Figure 9:
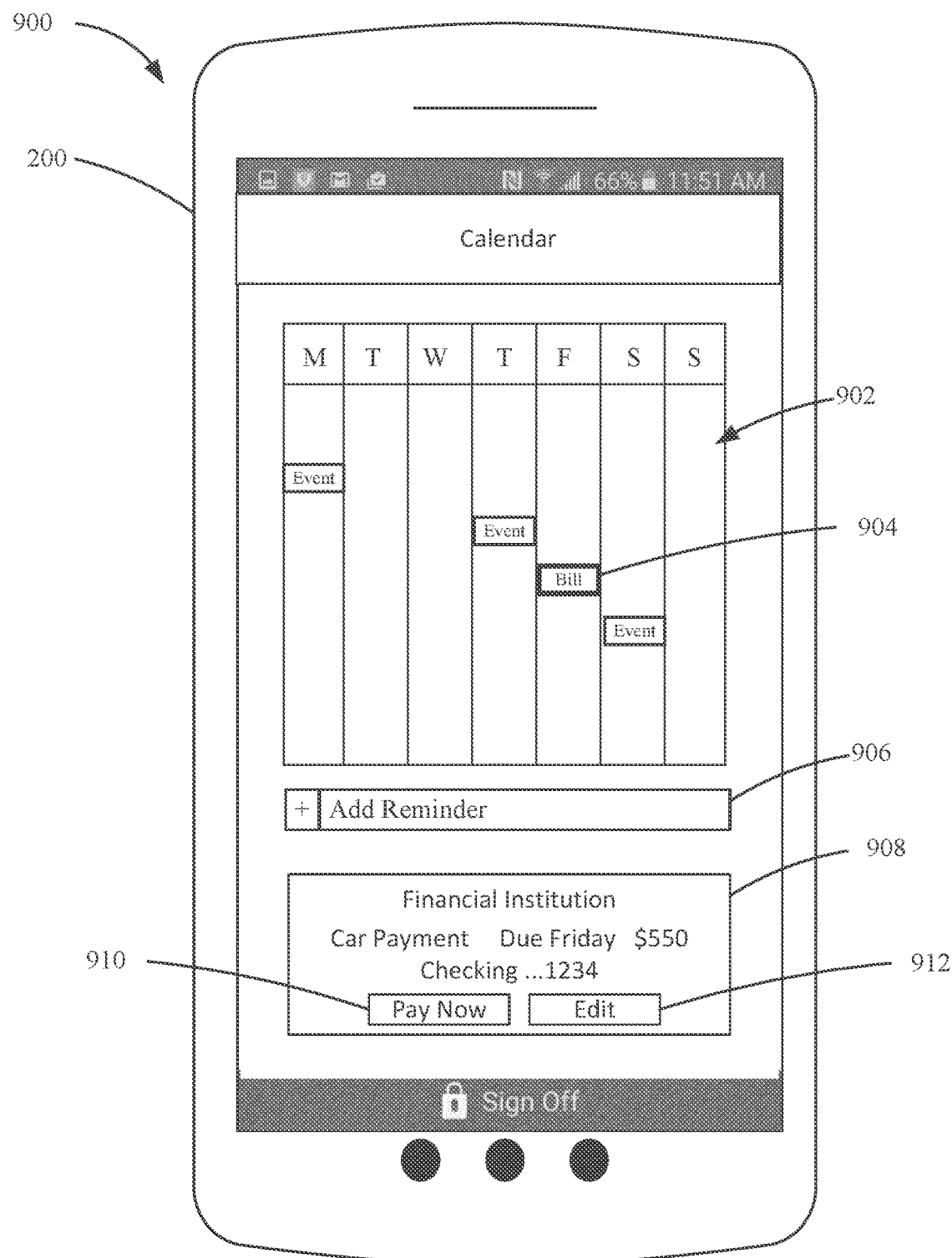

Upon the customer 102 selecting the upcoming bill payment 810, the displays presented via the third party client application 206 may be updated. Referring to FIG. 9, another third party client application interface 900 is shown, according to an example embodiment. The application interface 900 may be presented to the customer 102 upon the customer 102 selecting the upcoming bill payment 810 discussed in relation to FIG. 8. As shown, the interface includes a calendar window 902 describing various customer events. Calendar window 902 includes an additional event 904 that describes the upcoming bill payment 810 selected by the customer 102. Additionally, the interface 900 includes an addition button 906 enabling the customer 102 to input information regarding an additional customer event.

Interface 900 also includes a payment window 908. For example, the third party client application 206 rendering the interface 900 on the customer mobile device 200 may include a payments widget configured to generate transaction requests using customer account information received from the financial institution computing system 110 in accordance with various systems and methods disclosed herein. As discussed above in relation to FIG. 5, the customer may indicate a preference to provide a third party client application 206 with access to customer checking account information. Thus, the financial institution computing system 110, upon receiving an information request generated via the third party client application 206, may transmit both the customer bill payment information and the customer checking account information. Such information may be used by the third party client application 206 to formulate a transaction request in response to the customer 102 indicating such a preference (e.g., via the payment button 910). The payments widget may enable the customer 102 to request that a payment be made for the bill depicted by the additional event 904. The interface 900 also enables the customer 102 to change the account information shared with the third party client application 206 via an edit button 912. Upon the customer 102 selecting the edit button 912 an additional interface may be displayed to the customer 102 that enables the customer 102 to provide inputs to change the account used to make the depicted payment.

Figure 10:
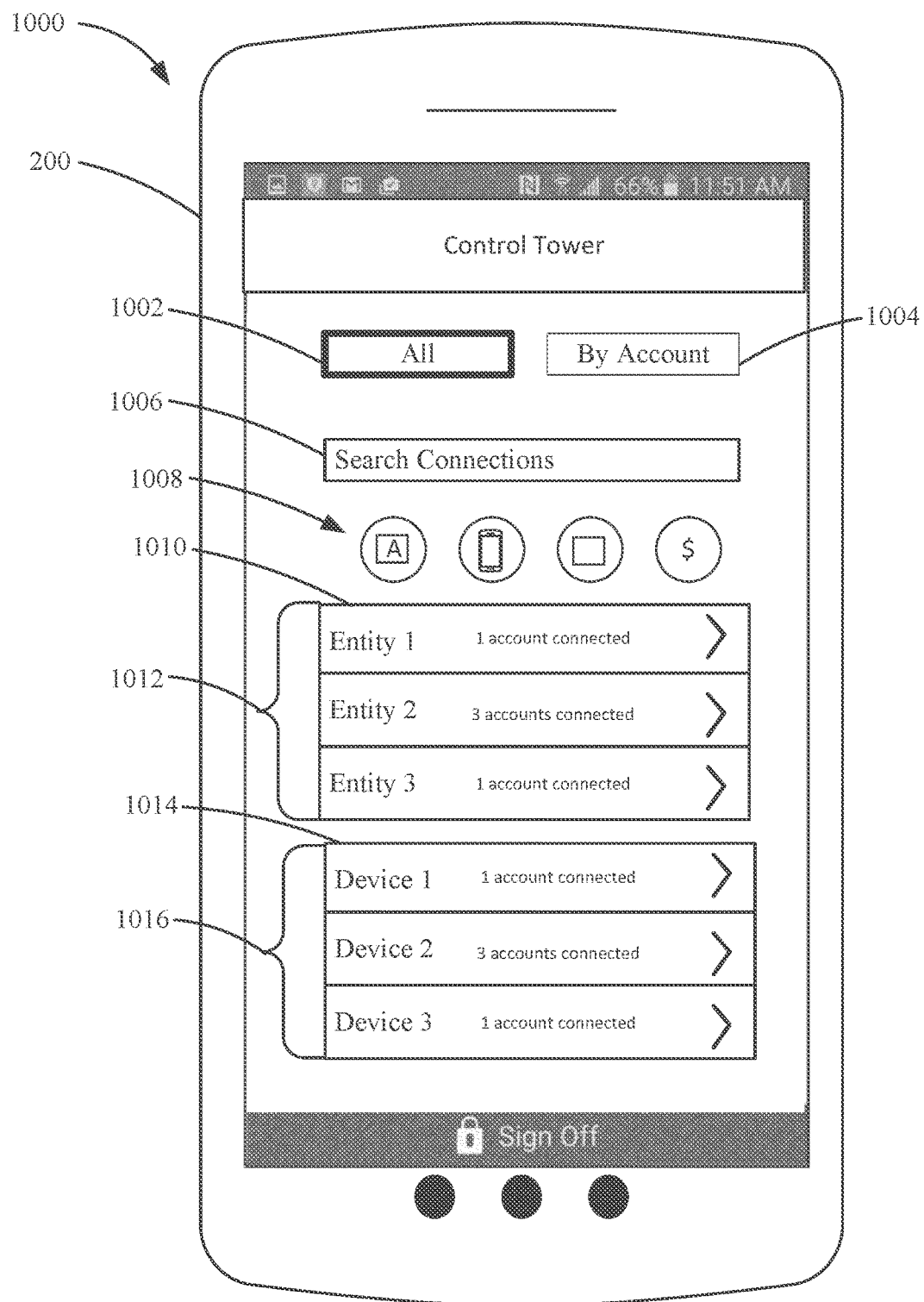
FIGS. 10-13 each show example data control tower customer interfaces, according to example embodiments.

Referring now to FIG. 10, a data control tower interface 1000 is shown, according to an example embodiment. The data control tower interface 1000 is shown as a display presented via the customer mobile device 200 (e.g., via the financial institution client application 208). In some embodiments, the interface 1000 serves as an alternative to the interfaces 400, 500, and 700 described above. As shown, the interface 1000 includes a generic access toggle 1002 and an account-by-account toggle 1004. As indicated by the emboldened generic access toggle 1002, the generic access toggle 1002 has been selected by the customer 102. The interface 1000 includes a connection search box 1006, functionality access points 1008, an entity listing 1010, and a device listing 1014. The connection search box 1006 enables the customer 102 to input the identity of an entity (e.g., application, merchant, or device) to which the customer 102 has provided access to the customer information. The functionality access points 1008 include various icons providing the customer with access to various functionalities provided via the financial institution client application 208. For example, the functionality access points 1008 may provide the customer with access to view balances associated with their accounts, transfer funds between accounts, register for accounts, make payments via a mobile wallet associated with the financial institution 104, and view statements associated with the accounts.

The entity listing 1010 lists each entity (e.g., applications and merchants) that the customer has provided any sort of access to the customer information stored at the financial institution computing system 110. The entity listing 1010 includes a plurality of selectable entries 1012. Each entry may list the number of accounts that have been connected to the associated entity. Upon the customer selecting a particular entity, a different interface may be presented to the customer 102 enabling the customer 102 to update that entity's access permissions. The device listing 1014 lists each customer device 108 having access to customer information. Similar to the entity listing 1010, the device listing 1014 includes entries 1016 associated with particular customer devices 108. While the entity listing 1010 and the device listing 1014 are shown as been separate from one another, it should be understood that, in one embodiment, the entity listing 1006 and device listing 1110 are combined into a single listing.

In various embodiments, the data control tower interface 1000 may take alternative forms. For example, in some embodiments, the generic access toggle 1002 enables the customer to view/scroll through various categories of accesses to customer information. For example, a first category box may generally include a listing of the customer's accounts or cards associated with the financial institution 104. Via this category box, the customer may select any of the cards to view various forms of information regarding the selected card (e.g., balance, general off and on status, transaction listing, etc.). An example of such an interface presented to the customer when the customer selects a card is described with respect to FIG. 20. Additional category boxes may include recurring payments made via the customer's accounts at the financial institution 104, the customer's application data sharing preferences, and the customer's mobile wallets. As such, the data control tower interface 1000 provides the customer with a single access point to perform a various diverse array of actions with respect to their finances.

In some embodiments, an additional category of accesses to customer information may include aggregators that access the customer's information at the financial institution 104 on behalf of the customer to perform functions on behalf of the customer. By selecting a particular aggregator on the data control tower interface 1000, the customer may provide inputs to disable the aggregator's access to customer information. For example, the financial institution computing system 110 may update access permissions associated with the customer information APIs 128 to deny information requests coming from third party systems 106 known to be associated with the aggregator. As such, the customer has control over the locations to which private information is disseminated. Other aggregators may utilize customer account information (e.g., account numbers) obtained from the financial institution 104 to make payments on behalf of the customer. For these types of aggregators, the data control tower interface 1000 enables the customer to quickly turn off payments made by these aggregators.

In some instances, aggregators that customers permit to access their information may provide the information to third parties (i.e., "sub-aggregators."). Such data transfers between aggregators and sub-aggregators limit the customers' ability to control locations at which their data is stored. Beneficially, the systems and methods described herein enable customers to prevent such transfers. This is accomplished through the financial institution 104 monitoring relationships between aggregators and various sub-aggregators. For example, as part of an information sharing arrangement between an aggregator and the financial institution 104 (e.g., to establish a customer information API 128), the financial institution may require the aggregator to recurrently provide an updated listing of sub-aggregators with which they share information. Additionally, the financial institution 104 may require the aggregator to update their sharing of customer information with the sub-aggregators in response to the customer providing an input to do so via the data control tower portal described herein. Using the information provided by the aggregators under such an arrangement, the financial institution 104 may maintain a directory mapping aggregators to sub-aggregators.

In some embodiments, the directory is used to populate the data control tower interface 1000. For example, upon the customer providing an input to view an aggregator's access permissions, the customer mobile device 200 may query the directory for a listing of sub-aggregators associated with that aggregator (i.e., a listing of sub-aggregators that the selected aggregator shares information with). The listing of sub-aggregators may appear on the data control tower interface 1000 in conjunction with a set of toggle switches enabling the customer to turn off that sub-aggregator's access to the customer's information. Upon the customer turning off a sub-aggregator's access, the customer mobile device 200 (e.g., either directly or via the financial institution computing system 110) may issue a command to a third party system 106 associated with the selected aggregator to update data access permissions such that the customer information is no longer shared with the indicated sub-aggregator. Thus, the data control tower portal described herein provides the customer with very complete control of the locations at which their information is accessed.

In various embodiments, a customer may choose to restrict sharing of information in general or in relation to particular third parties, accounts, devices, applications, and/or types of information. The customer may limit sharing of information by selecting, for example, a "restrict sharing" icon in a data control tower user interface. In certain implementations, the customer may wish to prohibit a recipient of the customer's information (e.g., the third party, device, and/or application) from giving another third party, device, and/or application access to all of the information, or a subset of the information (e.g., more sensitive information, such as financial account information). In some versions, a level of sharing may be set on a spectrum ranging from "no sharing" to "all sharing allowed" using, for example, a slider that may be moved by swiping in one direction to reduce the level of sharing allowed, and an in opposing direction to increase the level of sharing allowed. In some implementations, example intermediary levels of sharing may correspond with, for example, permission to share non-personal information only, permission to share non-financial information only, permission to share anonymized information only, permission to share with particular recipients or for particular purposes, etc. In certain implementations, setting a level or type of sharing that is permitted may allow the customer to set privacy settings with a third party to control what is allowed to happen with the customer's information. In some implementations, a limitation on information sharing may limit the services or functionalities that can be provided by, for example, a third party computing system, an application, or a device. For example, restricting the sharing of financial information by a wallet application may turn off one or more accounts (e.g., debit and credit cards) listed under the functionality of the wallet application (see, e.g., 424 in FIG. 4) or the access to transactions to be provided to a computing device like a smart speaker (see, e.g., 704 in FIG. 7)

Figure 11:
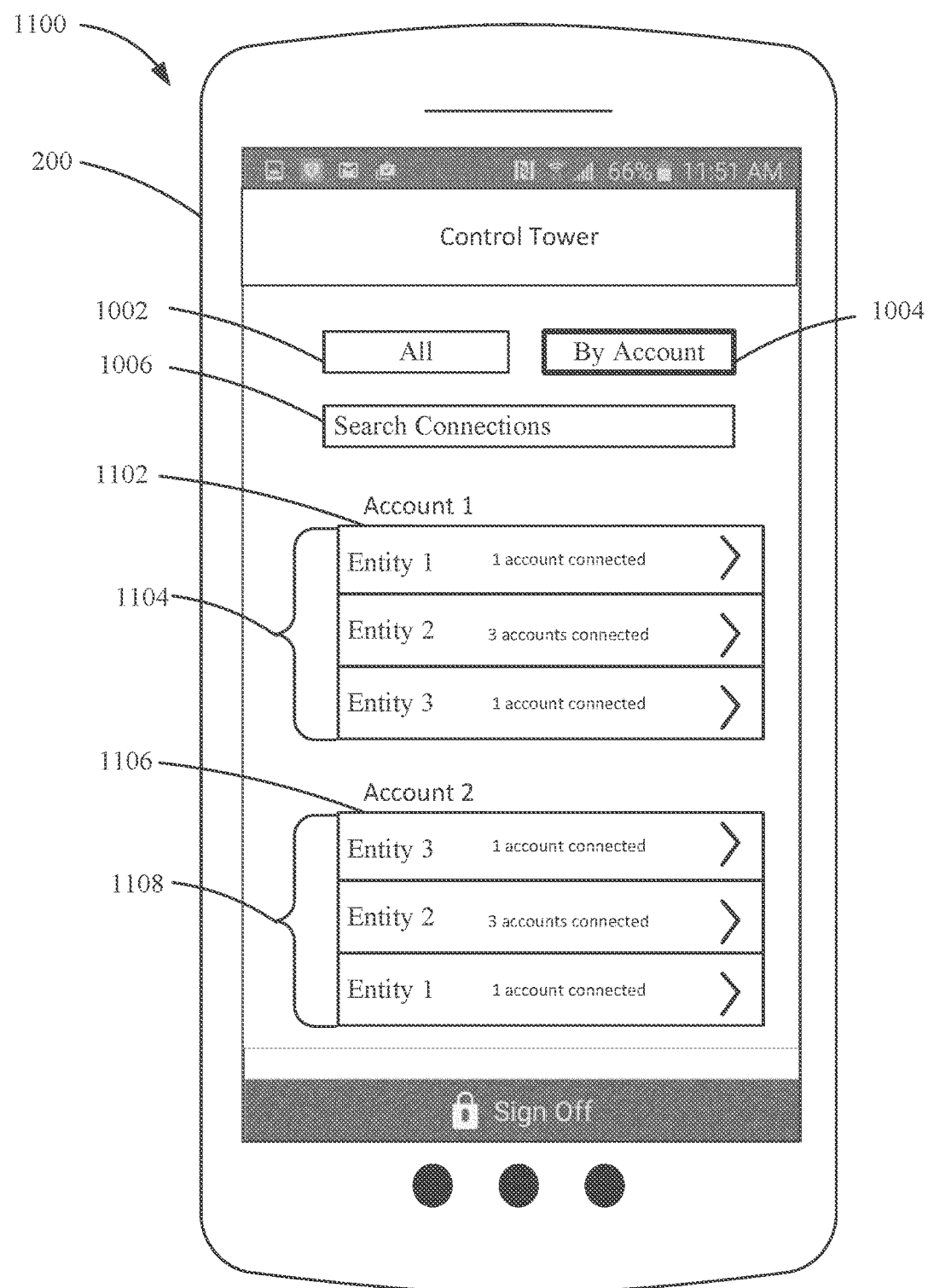

Referring now to FIG. 11, a data control tower interface 1100 is shown, according to an example embodiment. The data control tower interface 1100 is similar to the data control tower interface 1000 described with respect to FIG. 10 in that the interface 1100 also includes a generic access toggle 1002, an account-by-account access toggle 1004, and a connections search box 1006. As indicated by the emboldened account-by-account access toggle 1004, the account-by-account access toggle 1004 has been selected by the customer 102.

As shown, the interface 1100 includes a first account listing 1102 and a second account listing 1106. The first and second account listings 1102 and 1106 including listings 1104 and 1108 of various entities (e.g., applications, customer devices 108, third party systems 106) that the customer has provided information regarding the associated account to. As such, the customer 102 may quickly view various locations that currently have access to information associated with a particular account.

Figure 12:
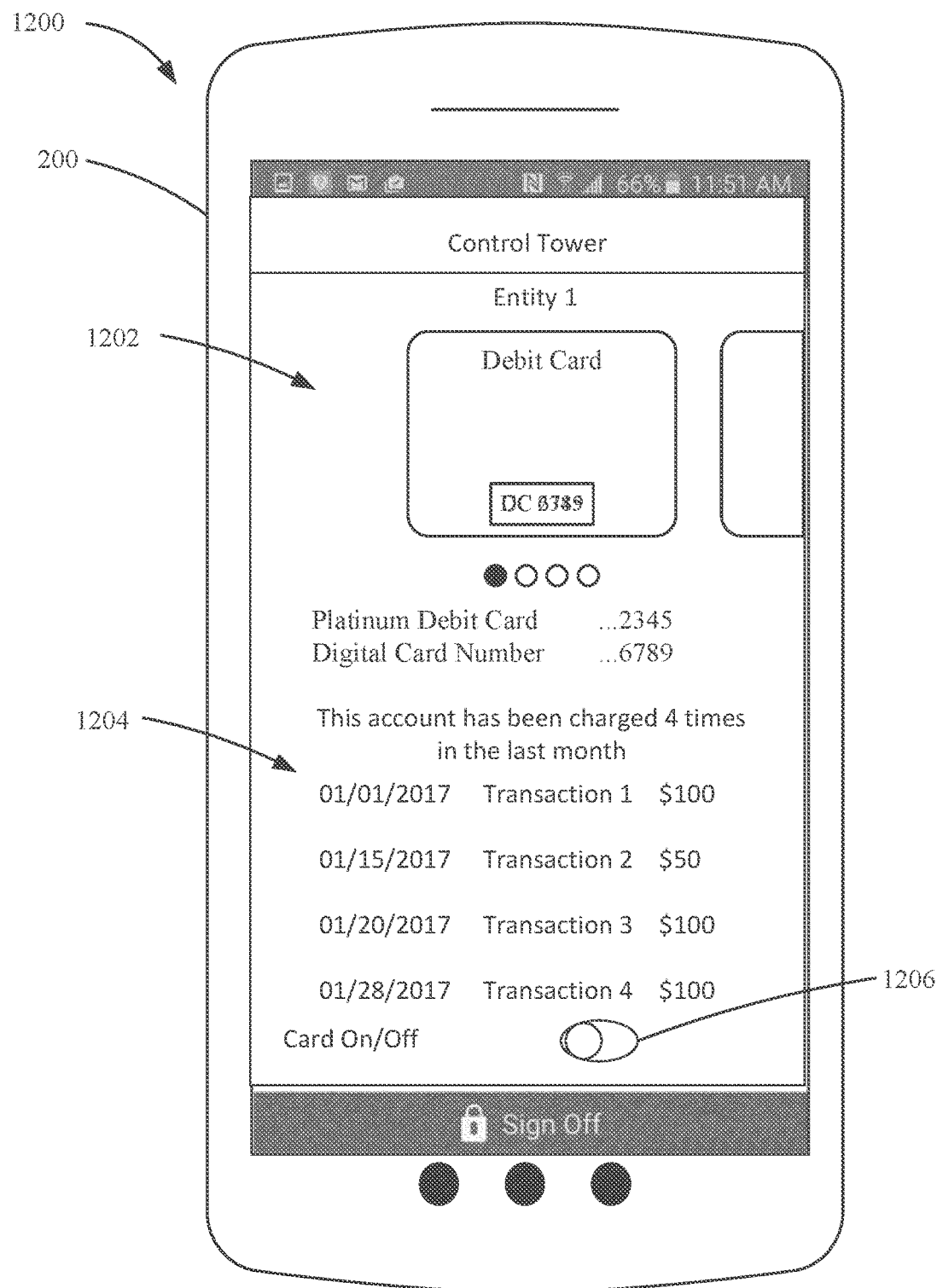

Referring now to FIG. 12, an entity permission control interface 1200 is shown, according to an example embodiment. The entity permission control interface 1200 (or another interface similar thereto) may be presented to the customer 102 (e.g., via the financial institution client application 208) upon the customer selecting an entity in any of the listings 1010, 1014, 1102, and/or 1108 described with respect to FIGS. 10 and 11. In the example shown, the interface 1200 is presented to the customer 102 upon the customer 102 selecting a merchant in merchant listing 1010 described with respect to FIG. 10. As shown, the interface 1200 includes an account selection portion 1202, a transaction listing 1204, and an account access toggle switch 1206. The account selection portion 1202 includes all of the accounts that the customer 102 has enabled the merchant to access. The account selection portion 1202 includes graphical depictions of the various accounts that the customer has provided access to. The customer 102 may swipe the account selection portion 1202 to select a particular account. Upon the customer selecting an account, the customer mobile device 200 may query the accounts database 124 to retrieve the customer's transactions with that particular account at the merchant, and use that data to populate the transaction listing 1204. Alternatively, the customer mobile device 200 and/or financial institution computing system 110 may initiate communications with an associated third party system 106 to obtain the customer 102's transaction data. As such, the transaction listing 1204 presents the customer 102 with the customer's transactions at the associated merchant occurring within a predetermined period (e.g., as of account opening, last year, last month, etc.).

The account access toggle switch 1206 is configured to receive a customer input to permit/revoke the depicted merchant's access to information associated with the selected account. In the example shown, the customer 102 is providing the third party system 106 associated with the merchant with access to the account information. In response to the customer 102 switching the account access toggle switch 1206 to an opposing position, the customer mobile device 200 may transmit a command to the financial institution computing system 110 causing the financial institution computing system 110 to update the customer 102's access permissions to prevent the merchant from having access to the associated account information. In some embodiments, the account access toggle switch 1206 is configured to receive a customer input to temporarily inactivate the selected account.

In various embodiments, account information may be saved by a third party for use in future transactions. For example, a customer may make a purchase at a merchant using a particular account (e.g., a credit or debit card), and the merchant may save the account information so that the next time the customer makes a purchase from the merchant, the customer does not have to re-enter the account information. The customer may permit multiple online merchants to save information corresponding to several accounts for future use. The customer may subsequently change his or her mind and wish that the saved account information be deleted. This may be accomplished, in some implementations, via a user interface allowing the customer to select or toggle, for example, a "delete saved account information" option with respect to one or more entities, without having to make separate, cumbersome requests with each entity. Deleting saved account information need not necessarily, in certain implementations, restrict the entity from accessing the account information for use for a transaction in the future (without saving the account information after the transaction has completed). Rather, deleting the saved information removes the information from the entity's databases. Such removal decreases the risk that, if the entity's computing systems are hacked or the information in the databases is otherwise leaked or made public, the customer's information would be compromised. The ability to conveniently choose to delete saved information from one or more third-party databases via a control tower application, while still potentially making the information available to the third party on an as-needed basis in the future, is less cumbersome, saving time and computing resources, and enhances the security of sensitive customer information by better controlling its availability and retention.

Figure 13:
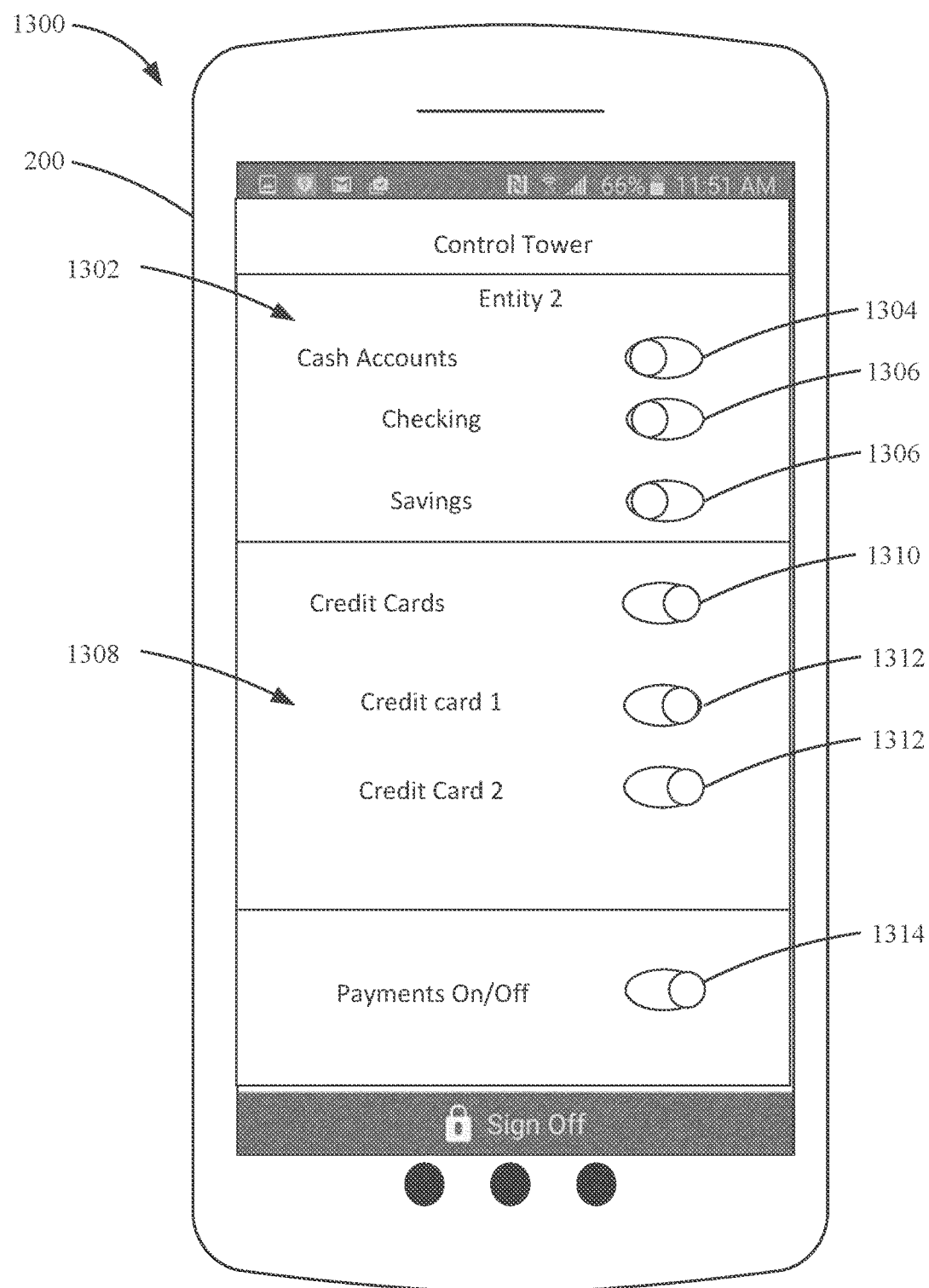

Referring now to FIG. 13, an entity permission control interface 1300 is shown, according to an example embodiment. The entity permission control interface 1300 (or another interface similar thereto) may be presented to the customer 102 (e.g., via the financial institution client application 208) upon the customer 102 selecting an entity in any of the listings 1010, 1014, 1102, and/or 1108 described with respect to FIGS. 10 and 11. In the example shown, the interface 1300 is presented to the customer 102 upon the customer 102 selecting an application (e.g., a financial health application, or a payment services application) in listing 1010 described with respect to FIG. 10. The interface 1300 includes a cash accounts listing 1302, a credit account listing 1308, and a payments toggle switch 1314. The cash accounts listing 1302 includes a general toggle switch 1304 and toggle switches 1306 associated with individual cash accounts of the customer 102. With the general toggle switch 1304, the customer 102 may permit or revoke the associated application's access to information (e.g., transaction history, balance information, etc.) associated with all of the customer's cash accounts. Using the toggle switches 1306, the customer may revoke the application's access to individual cash accounts. Similarly, the credit account listing 1308 includes a general toggle switch 1310 and individual toggle switches 1310 enabling the customer 102 to permit or revoke access to information regarding the customer 102's credit accounts.

The payments toggle switch 1314 is configured to receive a customer input to enable or disable payments via the application associated with the selected application. Thus, using the toggle switches 1304, 1306, 1310, and 1312, the customer may permit the application to access information associated with the depicted accounts. Using the payments toggle switch 1314, the customer generally enables payments to be made via the selected application. In other words, the payments toggle switch 1314 is configured to update a set of transaction rules maintained at the financial institution computing system 110 (e.g., via the account management circuit 120). As a result, if the customer disables payments via a particular application, any transaction requests received from the customer mobile device 200 via that application will be denied. As, such, the data control portal enables the customer 102 to manage particular entities' access to information as well as the manner in which that information may be used.

Figure 14:
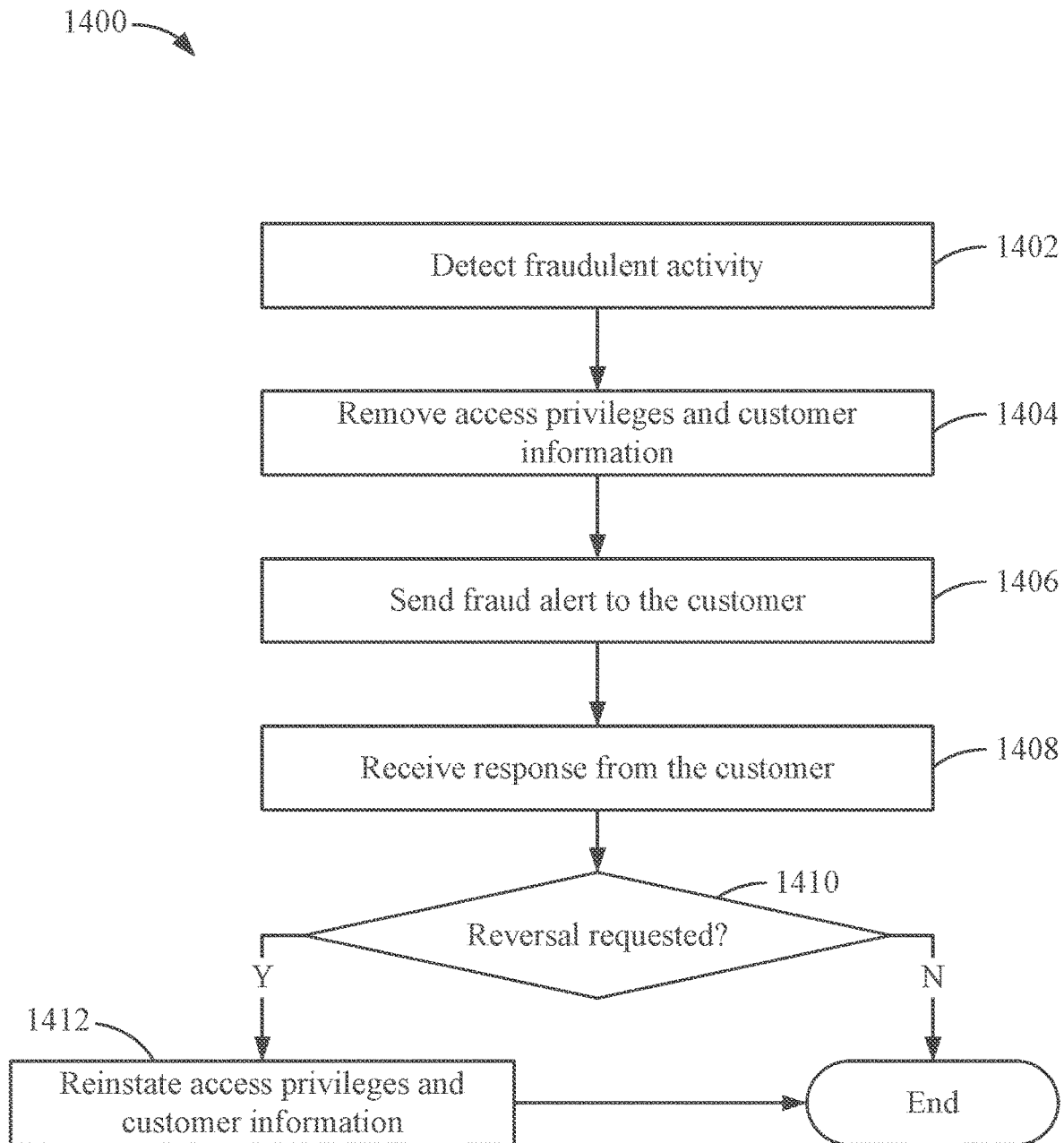
FIG. 14 is a flow diagram of a method of mitigating potential fraud associated with access to customer information, according to an example embodiment.

Referring to FIG. 14, a flow diagram of a method 1400 of mitigating potential fraud associated with access to customer information is shown according to an example embodiment. The method 1400 is performed by the financial institution computing system 110 (e.g., by the access control circuit 122, by the processor 116, etc.).

The method 1400 begins when fraudulent activity is detected at 1402. In some arrangements, the financial institution computing system 110 determines there is fraudulent activity associated with the customer 102 based on analyzing customer information access patterns, transaction patterns, and the like. The fraudulent activity may relate to compromised financial information (e.g., a compromised payment token associated with fraudulent purchases, a compromised account number, a compromised payment device, etc.) or misappropriation of other customer information (e.g., fraudulent access to customer information stored at the financial institution computing system 110, fraudulent downloads of data or document stored at the financial institution computing system 110, or the like). In some arrangements, the fraudulent activity can be reported by the customer 102 (e.g., via a customer device 108) if the customer 102 becomes aware of potential fraudulent activity associated with the customer information managed by the financial institution computing system 110. Similarly, in some arrangements, the fraudulent activity can be reported by the third-party associated with the fraud. For example, if a merchant becomes aware that the merchant's e-commerce system has been hacked by fraudsters, and that the customer information stored on or able to be accessed by the e-commerce system is at risk, the merchant can transmit a message to the financial institution computing system 110 indicating the fraud. In still further arrangements, the financial institution computing system 110 can identify potentially fraudulent activity from other sources, such as news agencies that report on data breaches associated with the third-party systems 106.

In an example, the financial institution computing system 110 detects an unusual pattern of activity in association with a third party client application 206. For example, customer information may be requested via a third party client application 206 at a more frequent than usual rate. In another example, the financial institution computing system 110 (e.g., via the account management circuit 120) detects an unusual pattern of activity based on customer transaction data. For example, if the account management circuit 120 receives a transaction request from a particular customer device 108 to request payment to a particular merchant, the account management circuit 120 may compare the amount of the transaction to transactions previously engaged in by the customer 102 (e.g., stored in the accounts database 124) and, if the amount differs from previous transactions engaged in by the customer 102, or if customer 102 has never engaged in a transaction at the particular merchant, detect an unusual pattern of activity.

After fraudulent activity is detected at 1402, access privileges are removed at 1404. The financial institution computing system 110 removes access privileges to the customer information in at least one of a plurality different ways. In some arrangements the financial institution computing system 110 revokes access privileges to the customer information stored at the financial institution computing system 110 (e.g., customer information stored in the accounts database 124). In other arrangements or additionally, the financial institution computing system 110 can pull customer information from the third-party system 106 or at the customer device 108 associated with the detected fraudulent activity. For example, if a payment token is associated with the fraudulent activity, the financial institution computing system 110 can prevent a third-party mobile wallet from accessing the payment token via the customer information APIs 128 and/or pull the payment token from the third-party mobile wallet computing system if the payment token was previously transmitted to the third-party mobile wallet computing system.

An alert is sent to the customer 102 at 1406. The financial institution computing system 110 transmits an alert to a customer device 108 associated with the customer 102. The alert may be any of a text message, an automated telephone call, an e-mail, an in-application push notification, or a combination thereof. The alert indicates that potential fraudulent activity was detected with respect to the customer information. In some arrangements, the alert identifies a specific third-party system 106 associated with the potential fraudulent activity. For example, the alert may indicate that a specific third-party system 106 is attempting to access a piece of customer information that is out of the norm of access patterns associated with the third-party system 106. In some arrangements, the alert is customer-interactive such that the customer 102 can reply to the alert (e.g., by interacting with a hyperlink, by interacting with embedded buttons, by replying, etc.) to indicate that the potential fraudulent activity was unauthorized or authorized.

Figure 15:
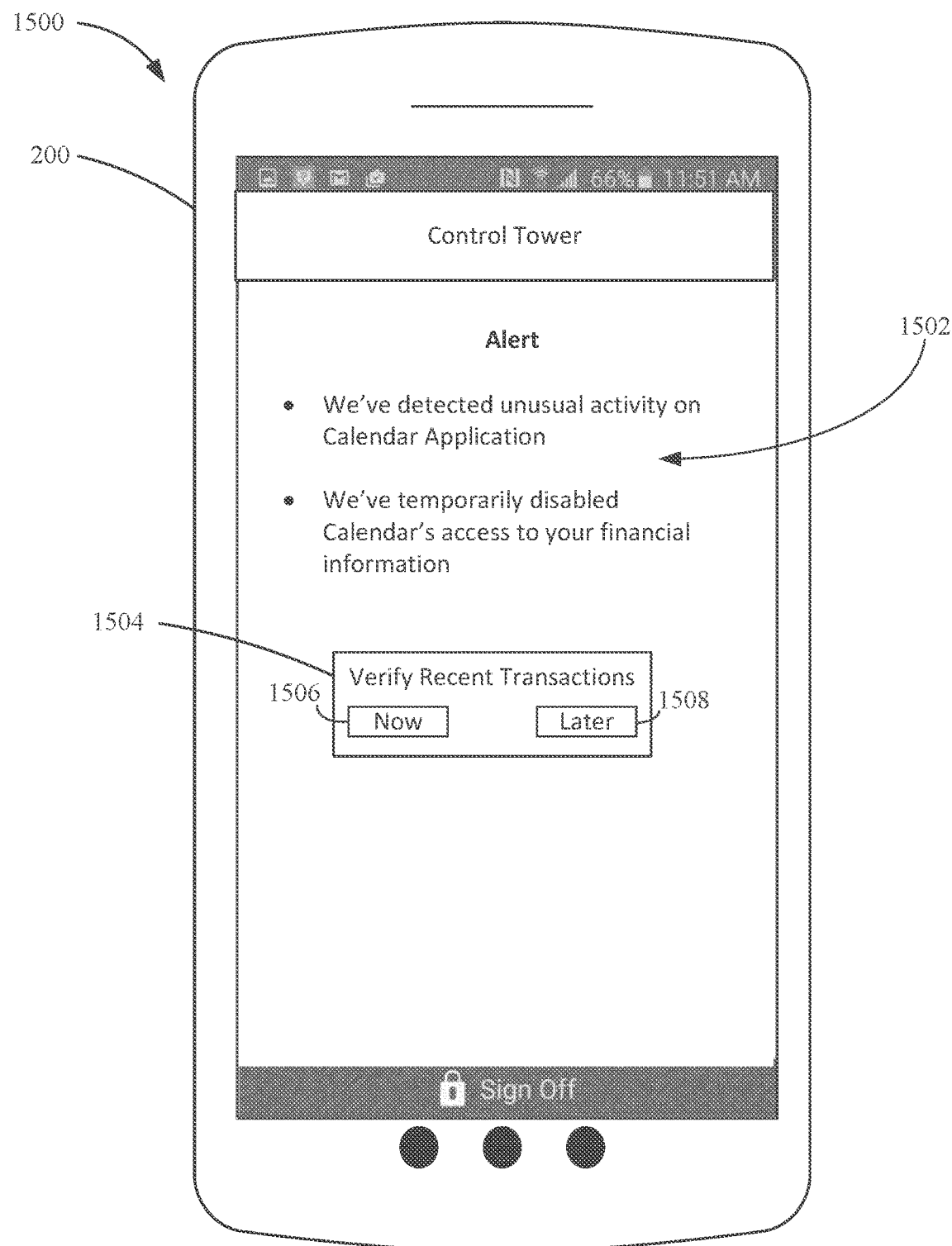
FIG. 15 shows an example customer alert interface, according to an example embodiment.

Referring now to FIG. 15, an alert interface 1500 is shown, according to an example embodiment. The alert interface 1500 may be rendered to the customer 102 via a financial institution client application 208 on the customer mobile device 200. Additionally, alert interfaces similar to the alert interface 1500 may be displayed on various other customer devices 108 at the same time that the alert interface 1100 is presented via the customer mobile device 200. As such, the customer 102 is alerted of the detected fraudulent activity irrespective of the particular customer device 108 possessed by the customer 102 at the time the unusual activity is detected and the customer alerted. In this regard, fraud alerts in other forms are envisioned. For example, the financial institution computing system 110 may formulate a sound notification and transmit the sound notification to a customer device 108 that includes a smart speaker.

In the example shown, the alert interface 1500 includes a description 1502 of actions taken by the financial institution computing system 110 (e.g., via the access control circuit 122) and the reason that such actions were taken. For example, the financial institution computing system 110 (e.g., via the access control circuit 122) may update the access privileges associated with a particular third party client application 206 on the customer mobile device 200, and the description 1502 may indicate as much to the customer 102. Additionally, the alert interface 1500 includes a customer action window 1504. The customer action window 1104 requests the customer 102 to verify recent transactions that caused delivery of the alert to the customer 102. Customer action window 1504 includes a first option 1506 enabling the customer 102 to view recent transactions (or information requests) and to indicate their legitimacy to the financial institution computing system 110. Customer action window 1504 also includes a deferral option 1508 enabling the customer 102 to put off the verification process to a later time.

Figure 16:
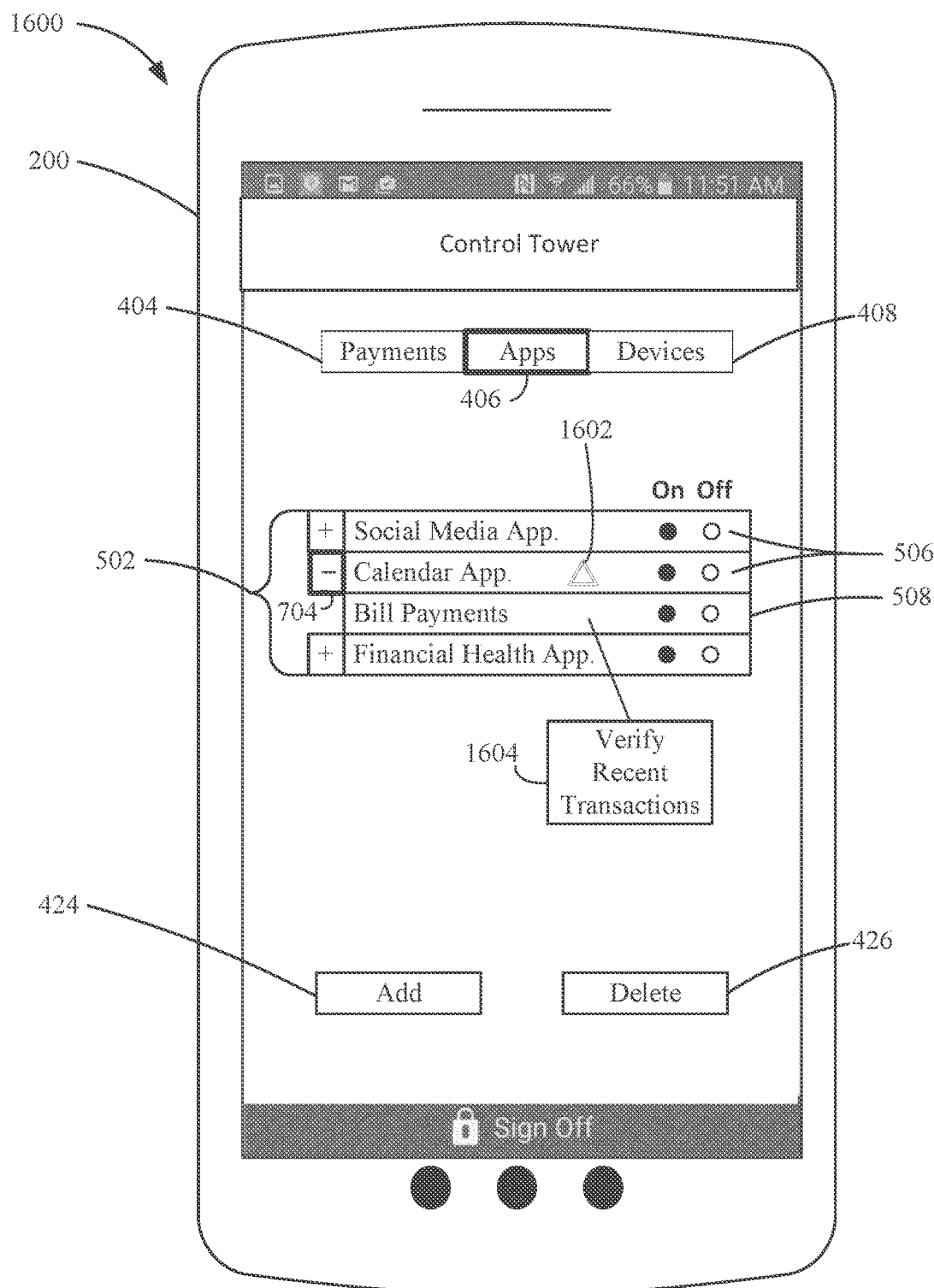
FIG. 16 shows an example data control tower customer interface, according to an example embodiment.

Referring now to FIG. 16, a data control tower customer interface 1600 is shown according to an example embodiment, the customer interface 1600 is similar to the customer interface 500 discussed above. Like numbering is used between FIGS. 5 and 16 to designate like components. As with the customer interface 1400, an application toggle 406 has been selected by the customer 102. In some embodiments, the customer interface 1600 is presented to the customer 102 after the customer 102 selects the deferral option 1508 presented to the customer 102 on the alert interface 1100 discussed above.

In various embodiments, the interface 1600 is presented to the customer 102 upon the customer 102 accessing the data control tower (e.g., via performance of the steps 302 and 304 discussed above) after unusual activity with respect to customer application activity has been detected. In the example shown, the interface 1600 includes an unusual activity indication 1602 notifying the customer 102 that unusual activity has been detected with respect to a particular application listed in the application listing 502. Additionally, the customer interface 1600 includes a verification button 1604 enabling the customer 102 to view the transactions that caused the display of the unusual activity information 1302.

Referring back to FIG. 14 and the method 1400, a customer response is received at 1408. In some arrangements, the financial institution computing system 110 receives a response from the customer 102 via the customer device 108. The customer response may be input by the customer 102 into the alert transmitted to a customer device 108 at 1406. The customer response provides an indication as to whether the potential fraudulent activity is authorized or unauthorized. In arrangements where the potential fraudulent activity is authorized by the customer 102, the customer response may include a reversal request. The financial institution computing system 110 determines if the customer response includes a reversal request at 1410. If a reversal request was received, the access privileges removed at 1404 are restored at 1412. If a reversal request was not received, or after the access privileges are restored at 1412, the method 1400 ends.

Figure 17:
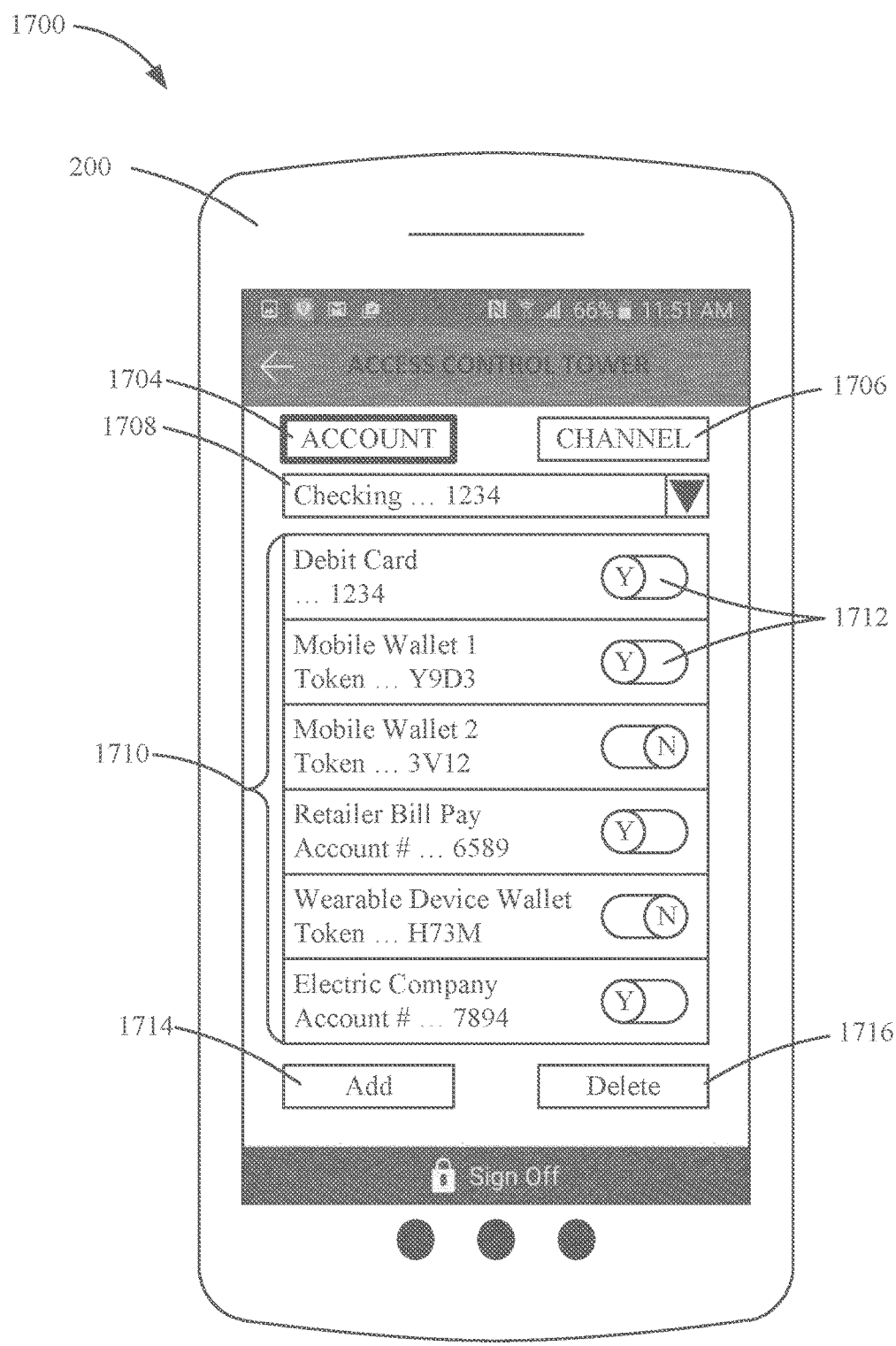
FIGS. 17-19 each show example data control tower customer interfaces, according to example embodiments.
Figure 18:
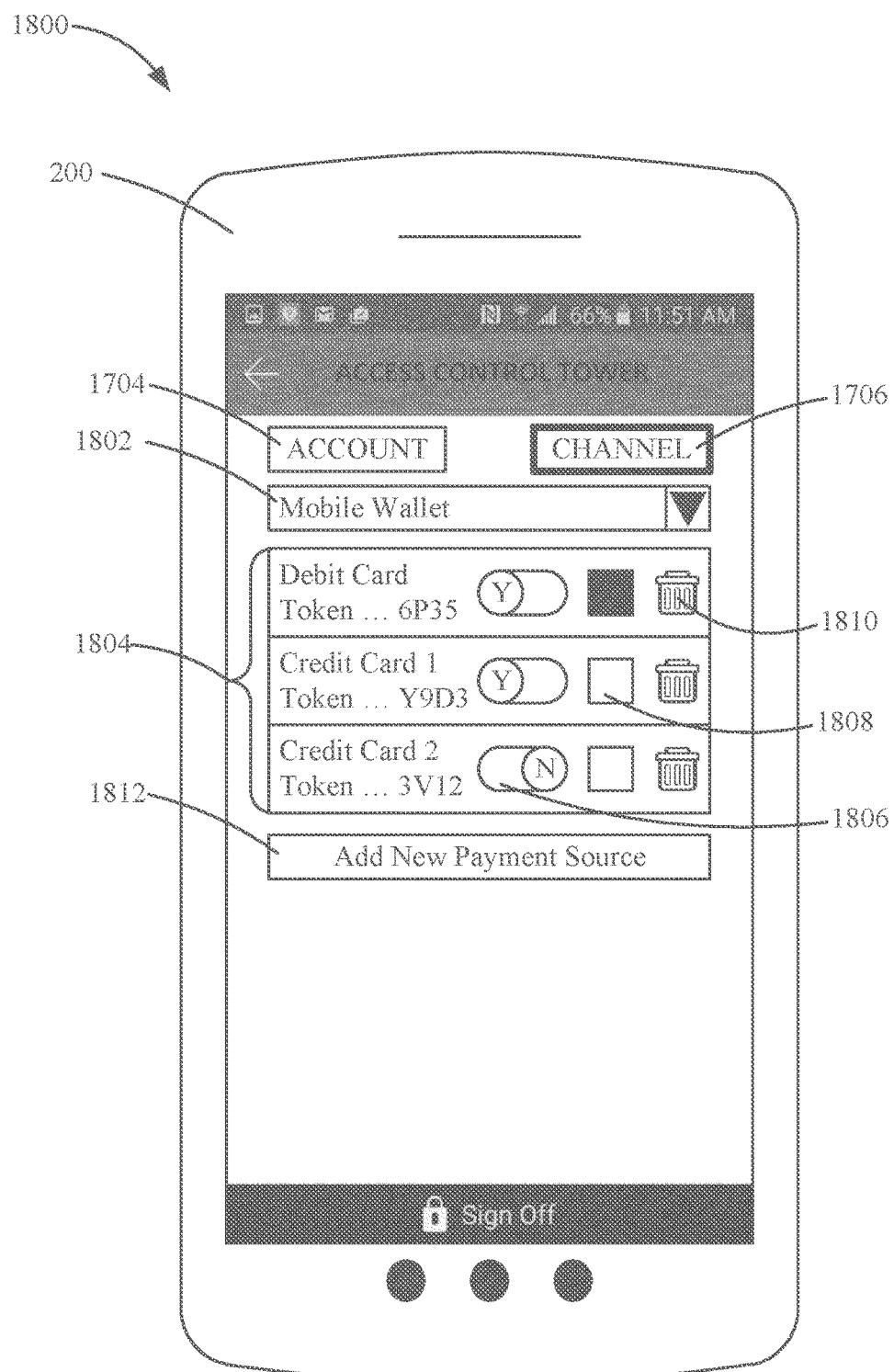
Figure 19:
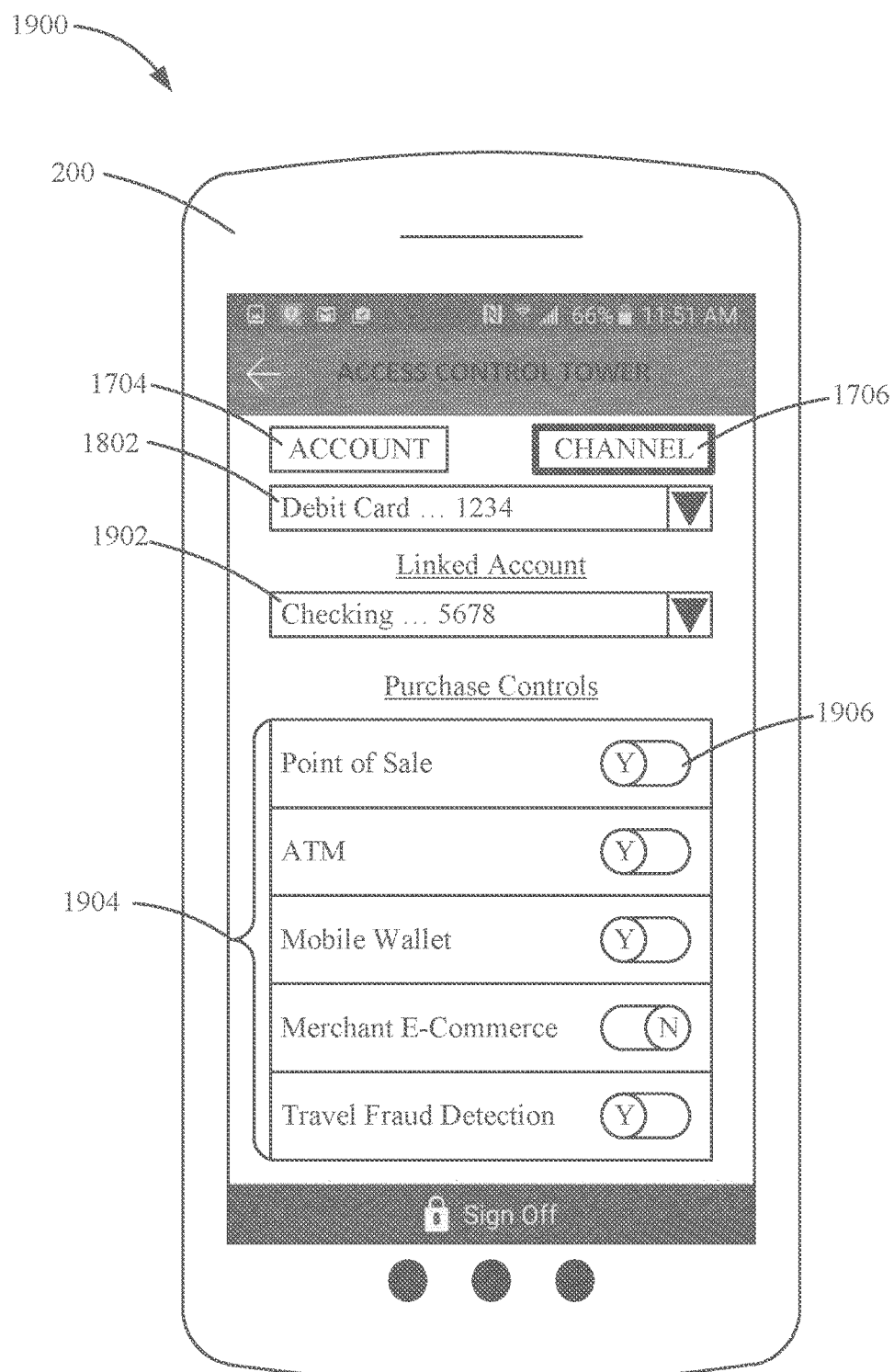

Referring generally to FIGS. 17-19, example data control tower interfaces are shown, according to various example embodiments. For example, the interfaces shown in FIGS. 17-19 may serve as alternatives to those shown in FIGS. 4-7 described herein. Referring to FIG. 17, a data control tower user interface 1700 is shown according to an example embodiment. The user interface 1700 is shown as a display on the mobile device 200 described with respect to FIG. 2. The user interface 1700 includes an account toggle 1704 and a channel toggle 1706. As shown by the bolded outline of the account toggle 1704, the account toggle 1704 is selected. Accordingly, the user interface 1700 is an account level management user interface. While in the account level management user interface, the customer 102 can select an account held with the financial institution 104 via the drop down box 1708. As shown in FIG. 17, the customer 102 has selected a checking account. After selecting a specific account, a listing 1710 of connected account access channels is populated. The listing 1710 identifies each channel that the customer 102 has previously configured to access the checking account. Each entry in the listing 1710 identifies a specific channel (e.g., a debit card, mobile wallet 1, mobile wallet 2, etc.), a channel access mechanism (e.g., a debit card number, a token identifier, an account number, etc.), and whether the channel access is currently active or inactive via a slider toggle 1712 (where "Y" means the channel is active, and "N" means the channel is inactive). A channel may be a customer device 108 (e.g., a wearable device, a payment card, etc.) or a third-party system 106 (e.g., a mobile wallet, a retailer bill pay system, a utility company system, etc.).

The customer 102 can interact with a given slider toggle 1712 to activate or deactivate a given channel's access to the selected account. For example, as shown in the user interface 1700, the debit card is active (as shown by the associated slider toggle 1712 being in the "Y" position). Accordingly, when the customer 102 attempts to use the debit card to make a payment (e.g., a purchase with a merchant) or withdraw cash from an ATM, the debit card is linked to the checking account identified in the drop down box 1708, and the payment can go through or funds can be withdrawn (assuming the checking account has the appropriate balance). If the customer 102 interacts with the slider toggle 1712 to deactivate the debit card's access to the checking account (e.g., by sliding the toggle 1712 to the "N" position), the debit card is no longer linked to the checking account. If the sliding toggle 1712 is in the "N" position and the customer 102 attempts to use the debit card at a merchant point-of-sale system or an ATM, the transaction will be denied or not processed from the checking account.

The user interface 1700 also includes an add button 1714 and a delete button 1716. If the customer 102 interacts with the add button 1714, the customer 102 can add a new channel to the listing 1710 of approved channels that are linked to the identified account. In doing so, the customer 102 may need to register the customer device 108 (e.g., by providing a device identifier, by providing a primary account number of a payment card, by logging into an application or website via the customer device 108, etc.) or the third-party system 106 (e.g., by logging into a third-party website or application associated with the third-party system 106) with the financial institution 104 to pair the channel with the financial institution computing system 110. If the customer 102 interacts with the delete button 1716, the customer 102 can select a channel in the listing 1710 to revoke access of the selected channel to the account.

In certain implementations, toggling the sliding toggle 1712 to "N" temporarily deactivates the channel's link to the account while maintaining the link for possible future reactivation and use. Deactivation of a link can be implemented, for example, by declining requests for access unless and until the link reactivated, without requiring re-registration to reestablish a new link between the channel and the account. By contrast, deletion of a channel may dissociate the account from the channel and sever the link between the account and the deleted channel, such that subsequent steps (e.g., selecting add button 1714 or otherwise registering or "signing up" anew) may be required for relinking. In some implementations, deleting a channel may include deletion or deactivation of encryption keys and access tokens such that a new key and/or access token would need to be generated if a new link is to be established.

In various embodiments, deletion of a channel may additionally or alternatively require or involve deletion of certain information with respect to the customer or the account. For example, deletion of a channel may result in deletion of customer data from the computing systems of a third party, from relevant applications, and/or from applicable devices. In some implementations, deletion of an account may result in the transmission of a scrub command, instruction, or message from the financial institution client application 208, from the financial institution computing system 110, and/or from a third-party intermediary (e.g., a computing system in a financial network, such as a computing system of Visa Inc.) to one or more third-party systems 106, customer devices 108, and/or third-party client applications 206. In some implementations, the scrub command, instruction, or message may request or require, for example, that the customer's account (e.g., a PayPal account) be deleted from third-party systems. Additionally or alternatively, the scrub command, instruction, or message may request or require, for example, that all customer data, or a specified subset thereof, be wiped from third-party systems and applications. In some implementations, if a customer selects the delete button 1716, the customer may be prompted (e.g., via another graphical user interface) about whether a scrub command is desired. The customer may be asked, for example, "Would you like your data scrubbed from third-party systems and applications?" If the customer responds affirmatively, the scrub command may be transmitted. Otherwise, if the customer does not respond affirmatively, the link may be severed without the scrub command being transmitted.

Referring to FIG. 18, a data control tower user interface 1800 is shown according to an example embodiment. The user interface 1800 is similar to the user interface 1700. As such, like numbering is used between FIGS. 17 and 18 to designate like components of the user interfaces 1700 and 1800. The user interface 1800 is shown as a display on the mobile device 200. As with the user interface 1700, the user interface 1800 includes the account toggle 1704 and the channel toggle 1706. As shown by the bolded outline of the channel toggle 1706, the channel toggle 1706 is selected. Accordingly, the user interface 1800 is a channel level management user interface. While in the channel level management user interface, the customer 102 can select a channel that is paired with the financial institution 104 via the drop down box 1802. A channel may be a customer device 108 (e.g., a wearable device, a payment card, etc.) or a third-party system 106 (e.g., a mobile wallet, a retailer bill pay system, a utility company system, a cloud storage system, etc.). As shown in FIG. 18, the customer 102 has selected a mobile wallet as the channel to manage. After selecting a specific channel, a listing 1804 of accounts associated with the channel is populated. The listing 1804 identifies each account that that the customer 102 has previously configured to be accessed by the selected channel. Each entry in the listing 1804 identifies a specific account (e.g., a debit card, a credit card, etc.), an account access mechanism (e.g., a payment token), and whether the account is currently active or inactive via a slider toggle 1806 (where "Y" means the account is active, and "N" means the account is inactive).

The customer 102 can interact with a given slider toggle 1806 to activate or deactivate the selected channel's access to an account associated with the slider toggle 1806. For example, as shown in the user interface 1800, the token associated with credit card 1 is active (as shown by the associated slider toggle 1806 being in the "Y" position). Accordingly, when the customer 102 attempts to make a payment with the mobile wallet (e.g., a purchase with a merchant) credit card 1 is listed as an option for the payment source of the transaction. If the customer 102 interacts with the slider toggle 1806 to deactivate the channel's access to the token associated with credit card 1 (e.g., by sliding the toggle 1806 to the "N" position), the credit card is no longer listed as a payment source in the mobile wallet (or is listed as an unavailable payment source). For example, in response to the customer 102 deactivating the channel's access, the financial institution computing system 110 may transmit a command to a third party system 106 associated with a token service provider instructing the third party system 106 to delete or temporarily deactivate the token.

Each entry in the listing 1804 also includes a default payment indicator 1808 and a delete payment button 1810. The default payment indicator 1808 is highlighted to indicate the default payment source of the mobile wallet. As shown in FIG. 18, the selected default payment method for the mobile wallet is the debit card. If the customer 102 interacts with the default payment indicator 1808 of a different entry (e.g., credit card 1 or credit card 2), the customer 102 can change the default payment source for the mobile wallet even though the customer is not interacting directly with the mobile wallet. If the customer 102 interacts with the delete payment button 1810 for a given entry, the customer 102 can remove the associated payment source from the mobile wallet. Thus, the user interface 1800 enables the customer 102 to deactivate and activate tokens, select a default payment vehicle for a mobile wallet, and remove a payment vehicle from a mobile wallet on the same user interface. To populate the user interface 1800, the financial institution computing system 110 may utilize one of the customer information APIs 128 associated with a mobile wallet provider of the mobile wallet selected via the drop down box 1802. In other words, in response to receiving an indication of the customer 102's selection of the mobile wallet via the drop down box 1802, the financial institution computing system 110 may formulate an API information request including an identifier associated with the third party system 106. The API information request may request information regarding the customer 102's mobile wallet account (e.g., token activation statuses, default payment vehicles, etc.). Upon receipt of the API information request, the third party system 106 may verify the financial institution computing system 110 and, in response, provide the requested information.

Still referring to FIG. 18, the user interface 1800 also includes an add new payment source button 1812. If the customer 102 interacts with the add new payment source button 1812, the customer 102 can provision a payment token associated with a new payment source to the mobile wallet. The customer 102 can manually input the payment card information (e.g., primary account number, expiration date, billing address, card security code, card verification value, etc.) or select a payment card that the customer 102 has that is associated with (i.e., issued by) the financial institution 104. When the payment card information is provided by the customer 102, the FI computing system 110 can automatically request a payment card token (e.g., from a payment network associated with the payment card) and transmit the payment card token to the mobile wallet system (e.g., via a customer information API 128) such that the payment card is provisioned to the mobile wallet.

Referring to FIG. 19, a data control tower user interface 1900 is shown, according to an example embodiment. The user interface 1900 is similar to the user interfaces 1700 and 1800. As such, like numbering is used between FIGS. 17 through 19 to designate like components of the user interfaces 1700, 1800, and 1900. The user interface 1900 is shown as a display on the mobile device 200. As with the user interfaces 1700 and 1800, the user interface 1900 includes the account toggle 1704 and the channel toggle 1706. As shown by the bolded outline of the channel toggle 1706, the channel toggle 1706 is selected. Accordingly, the user interface 1900 is a channel level management user interface. While in the channel level management user interface, the customer 102 can select a channel that is paired with the financial institution 104 via the drop down box 1802. As shown in FIG. 19, the customer 102 has selected a debit card as the channel to manage. The debit card channel of FIG. 19 has different manageable features than the mobile wallet of FIG. 18. Accordingly, the specific channel level management user interfaces presented to the customer 102 while accessing the access control tower portal may differ depending on the channel selected by the user.

The debit card specific user interface 1900 includes a linked account drop down box 1902. The linked account drop down box 1902 allows the customer 102 to change the account associated with the selected debit card. As shown in FIG. 19, the debit card is currently linked to a checking account ending in "5678". If the customer 102 has additional demand deposit accounts with the financial institution 104, the customer 102 selects a different account to associate the debit card with via the drop down box 1902.

Additionally, the user interface 1900 includes a plurality of different purchase controls 1904. Each of the purchase controls 1904 includes a toggle slider 1906 that allows the customer 102 to activate or deactivate a particular control associated with the debit card (where "Y" means the feature is active, and "N" means the feature is inactive). The purchase controls 1904 may include a point of sale control that either permits or blocks the debit card from being used at a merchant point of sale system, an ATM control that either permits or blocks the debit card from being used at an ATM, a mobile wallet control that either permits or blocks the debit card from being used in a mobile wallet, a merchant e-commerce control that either permits or blocks the debit card from being used at a merchant e-commerce site, a travel fraud detection control that turns on or off a fraud detection feature, and the like. The customer 102 can interact with a given toggle slider 1906 to activate or deactivate the associated purchase control 1904. The available purchase controls may vary by channel. In some implementations, toggling a toggle slider (or other user input) alternatively or additionally restricts the storage of customer data information following use of the information in a transaction. For example, a user input may allow the customer to prohibit customer information from being stored, such as prevention of the storage by an e-commerce merchant of debit or credit card information as a stored payment method.

Figure 20:
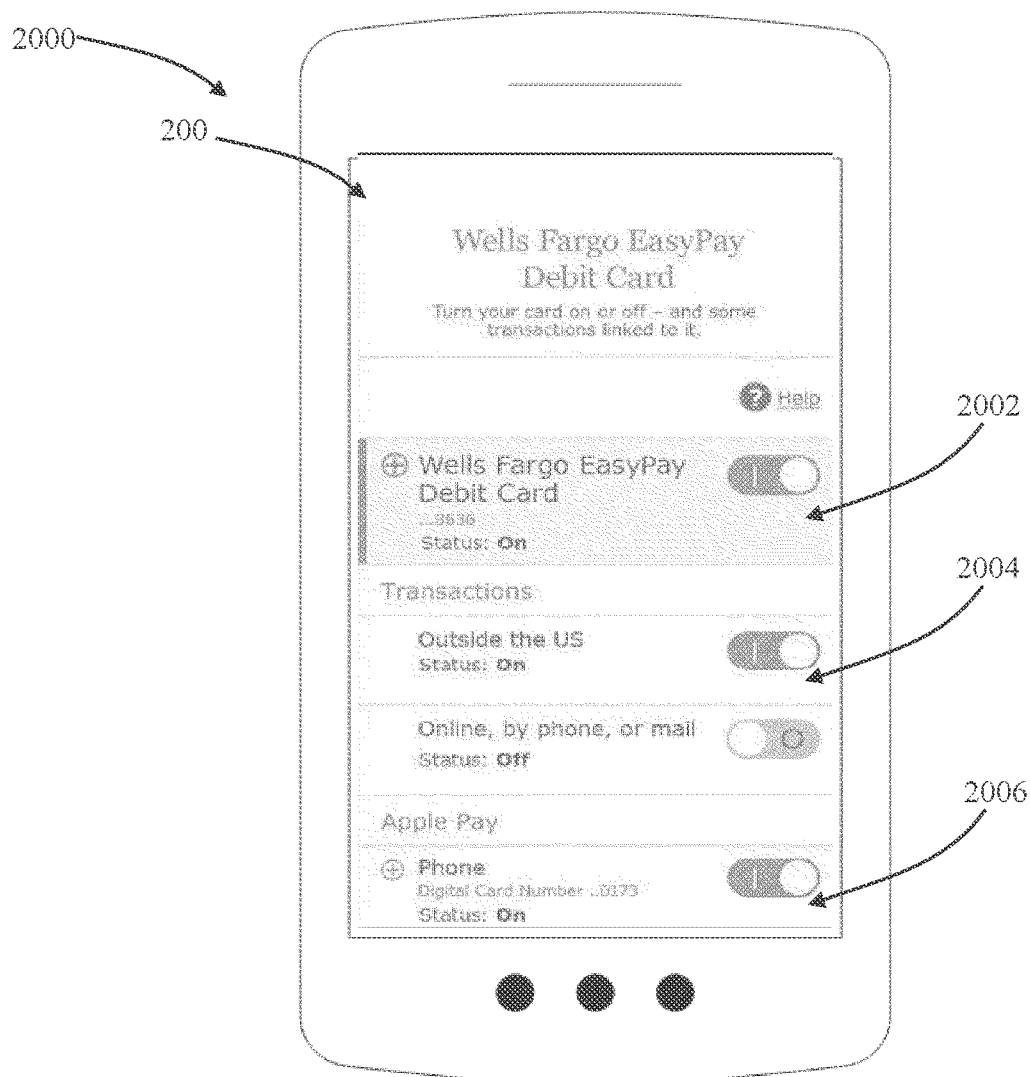
FIG. 20 shows an example account control customer interface, according to an example embodiment.

Referring now to FIG. 20, an account control customer interface 2000 is shown, according to an example embodiment. In various embodiments, the customer is presented with the account user interface 2000 (e.g., via the financial institution client application 208) upon the customer selecting an account on the data control tower interface 1000 described with respect to FIG. 10. As shown, the account control customer interface 2000 includes a listing of various controls associated with an account. As shown, a first toggle switch control 2002 is configured to receive an input from the customer to turn off the account as a whole. As a result of receiving this input, the customer mobile device 200 transmits a notification signal to the financial institution computing system 110, which in turn temporarily deactivates the customer's account from use in any sort of transaction. This is particularly useful if the customer temporarily misplaces a card. Another set of toggle switches 2004 provides the customer with a more particularized control. For example, via the set of toggle switches 2004, the customer is able to turn the selected accounts on and off for international and United States payments. As shown, the selected account has been turned off for international transactions, but left on for domestic transactions. As such, upon receipt of a transaction request from an international payment network, the financial institution computing system 110 would automatically deny the transaction request. This way, fraudulent international transaction activity can be prevented. Additionally, the customer need not contact the financial institution to turn the account on prior to travelling internationally.

Another toggle switch 2006 enables the customer to turn the selected account on and off for use in a particular mobile wallet. Thus, the account control interface 2000 may include a number of toggle switches similar to the toggle switch 2006 depending on the mobile wallets that the customer has registered for. In response to the customer switching a card off for a particular mobile wallet, the financial institution computing system 110 may contact a token service provider associated with the mobile wallet (or contact the mobile wallet provider directly) to, for example, deactivate an account token to disable access. In various embodiments, the account control customer interface 2000 includes many additional transaction controls. For example, the user may manually restrict amounts (e.g., transactions exceeding a threshold dollar value), locations (e.g., transactions in certain geographical locations, certain types of merchants such as certain retailers, etc.), times (e.g., between specified hours, on particular days of the week or month or on holidays, etc.), and the like that the card may be turned off or turned on for use in transactions. As such, not only does the financial institution client application 208 provide the customer with control over external entities that have access to customer account information, but it also provides the customer with an extensive amount of personal controls over each individual account.

In various embodiments, a control tower portal allows the customer to instruct entities (e.g., third party computing systems and applications, customer computing devices, etc.) to delete accounts, restrict the use or sharing of customer data, and/or to delete customer data (e.g., all data or data of a particular type). In some implementations, restrictions on customer data or deletion thereof may be accomplished by, for example, the financial institution computing system 110 and/or the financial institution client application 208 making an API call to third party systems 106 to have customer data restricted or deleted (or marked for subsequent restriction or deletion). The control tower portal may allow for multiple levels of deletion or scrubbing. For example, an account may be deleted, all accounts may be deleted, all accounts of a certain type may be deleted, certain customer data or customer data of particular types may be deleted, and/or all customer data may be deleted. In some implementations, only customer data received from the financial institution computing system 110 through access granted by the customer (and not received by the third party from other sources, such as directly from the customer) may be marked for deletion. Advantageously, the ability to choose to have account data deleted empowers the customer with the right to be partially or wholly forgotten.

Figure 21:
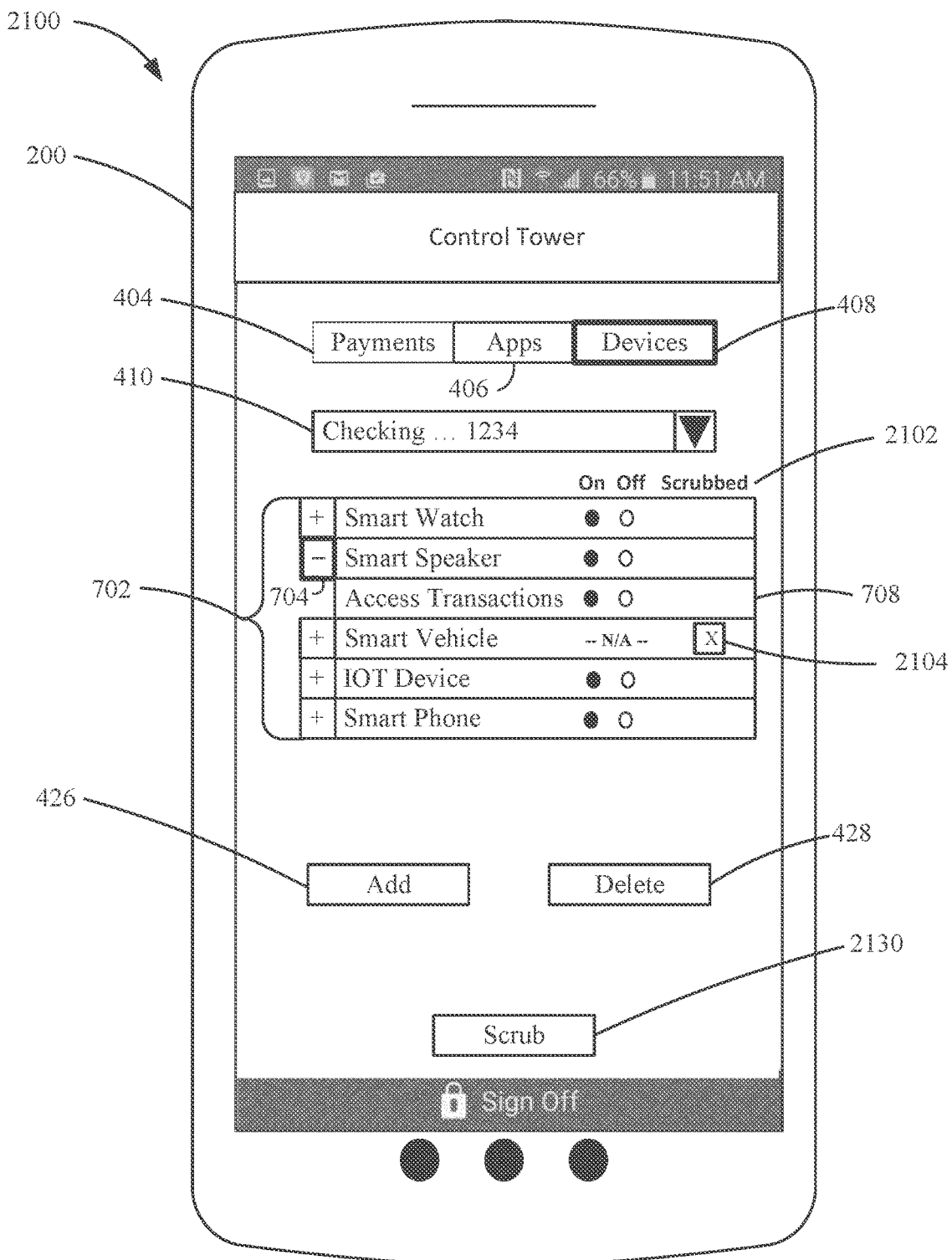
FIG. 21 shows an example device control customer interface for management of various devices, according to an example embodiment.

Referring to FIG. 21, a data control tower customer interface 2100 is shown according to an example embodiment. The customer interface 2100 is similar to the customer interfaces 400 and 700. Like numbering is used between FIGS. 4 and 7 to designate like components. The customer interface 2100 is shown as a display on the customer mobile device 200. The interface 2100 includes a device listing 702 with customer devices 108 that the customer 102 has registered with the financial institution 104. In addition to the add button 426 and the delete button 428, customer interface 2100 additionally provides a scrub button 2130 to allow the customer to have customer data deleted from one of the devices in the device listing 702. In response to selection of the scrub button 2130, the customer may be asked to select which device to scrub. In various implementations, after a device to be scrubbed has been selected, the customer may be asked (e.g., via another interface) to identify the customer data to be deleted from the device. For example, the customer may be allowed to specify that personal information should be deleted (e.g., name, address, telephone number, social security number, etc.), financial information should be deleted (e.g., account numbers, balances, etc.), all customer data should be deleted (e.g., all data that the device received via the financial institution computing system 110, or all customer information regardless of source), an account should be deleted (e.g., a subscription, profile, or payment account), etc.

In the example customer interface 2100, devices from which customer data have been deleted or accounts deleted are marked as having been "scrubbed" by scrubbed icon 2104. As shown in customer interface 2100, the smart vehicle has been scrubbed. The customer may wish to scrub a device if, for example, the device is lost, stolen, sold, or donated (such as a stolen car or a lost smart watch). It is noted that, as a consequence of the smart vehicle being scrubbed, granting the smart vehicle with access to customer data cannot be turned on or off (as indicated by the "—N/A—" in FIG. 21). The link may be re-established via add button 426, and/or the smart vehicle may be removed from device listing 702 via delete button 428.

Figure 22:
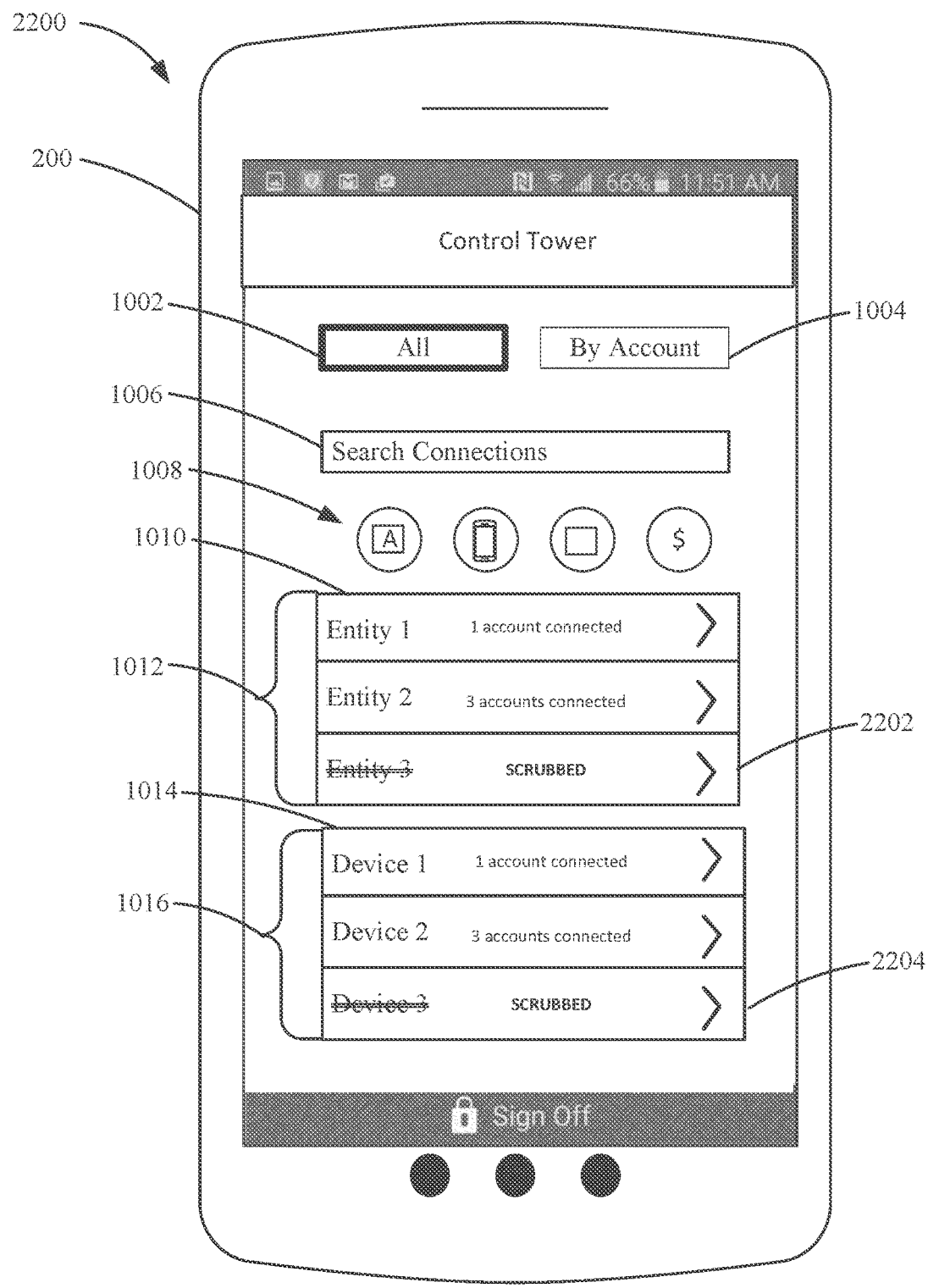
FIG. 22 shows an example account control customer interface for management of connections of various accounts, according to an example embodiment.

Similarly, referring to FIG. 22, a data control tower interface 2200 is shown, according to an example embodiment. The data control tower interface 2200 is shown as a display presented via the customer mobile device 200 (e.g., via the financial institution client application 208). In some embodiments, the interface 2200 serves as an alternative to interfaces 400, 500, 700, and 1000 described above. As shown, the interface 2200 includes entity listing 1010 (e.g., applications and merchants) and device listing 1014 (e.g., customer devices 108). Among the entity entries 1012, entity 2202 ("Entity 3") is indicated as having been scrubbed. In some implementations, the indication that the entity has been scrubbed is not presented in interface 2200 until confirmation is received from the entity (e.g., a third party client application 206 and/or a third party system 106) by the financial institution client application 208 (directly or via the financial institution computing system 110) that the account or other customer data has been deleted from the entity's computing system. Similarly, among device entries 1016, device 2204 ("Device 3") is indicated as having been scrubbed, which may not be presented until confirmation is received by the financial institution client application 208 (directly or via the financial institution computing system 110) directly from the device or from a computing system with which the device is networked. In certain implementations, scrubbed entities and devices can be removed from listings 1010 and 1014, respectively, using a delete button (similar to the delete button in FIG. 21, not shown in FIG. 22).

Figure 23:
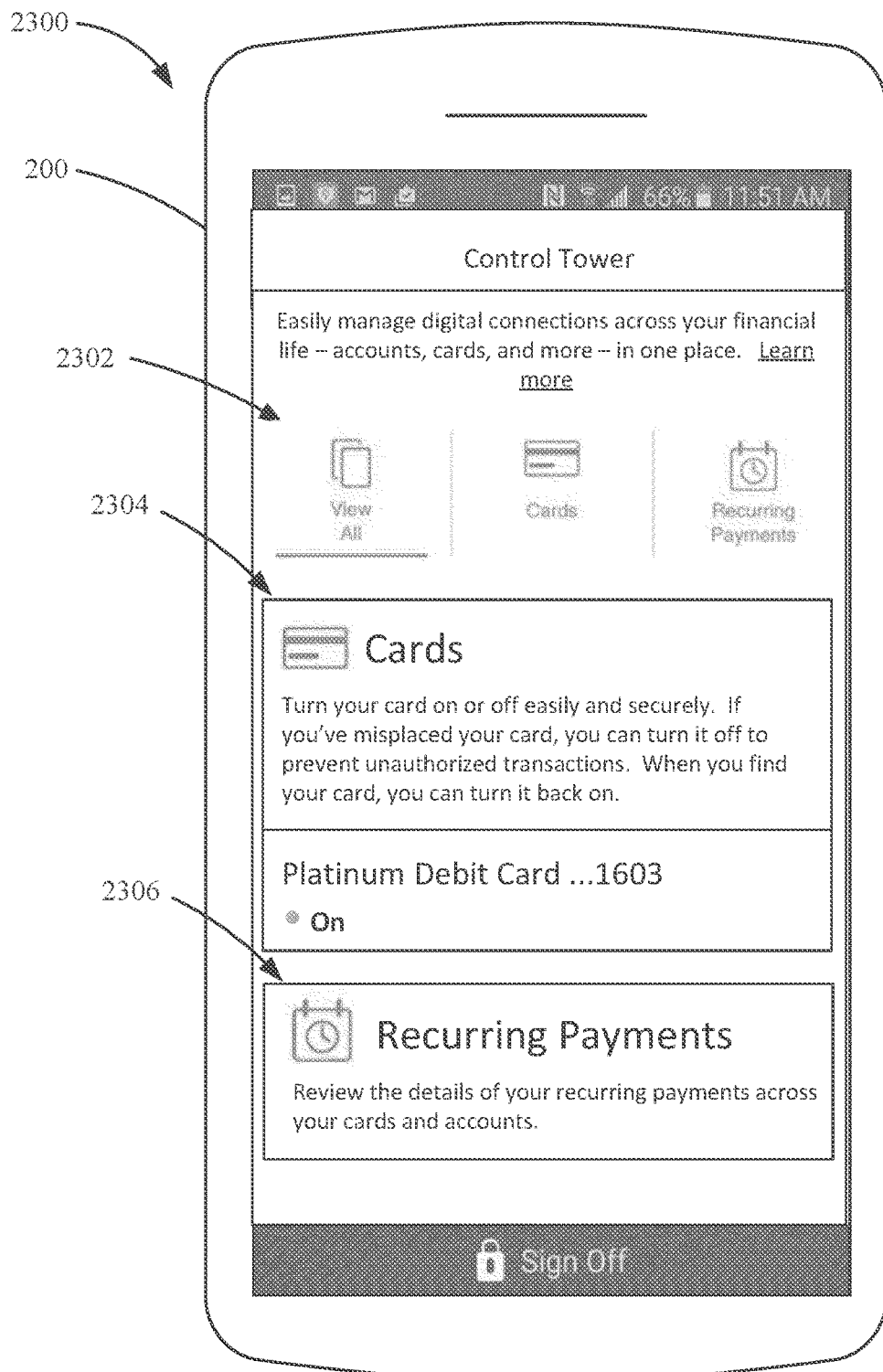
FIG. 23 shows an example account control customer interface for management of various accounts, according to an example embodiment.

Referring to FIG. 23, a data control tower interface 2300 is shown, according to an example embodiment. The data control tower interface 2300 is shown as a display presented via the customer mobile device 200 (e.g., via the financial institution client application 208). In some embodiments, the interface 2300 serves as an alternative to interfaces 400, 500, 700, and 1000 described above. Interface 2300 may serve as a landing page for a customer using control tower to manage digital connections between entities, applications, devices, etc. As shown, interface 2300 includes an access toggle 2302 that allows the customer to select viewing all digital connections, cards, and recurring payments. As indicated by the underlining, "View All" has been selected by the customer 102. The interface 2300 includes a card listing 2304 and a recurring payments listing 2306. The card listing 2304 identifies customer accounts and their statuses. At 2304, the Platinum Debit Card with number ending in 1603 is indicated as being "on" or enabled or otherwise accessible.

Figure 24:
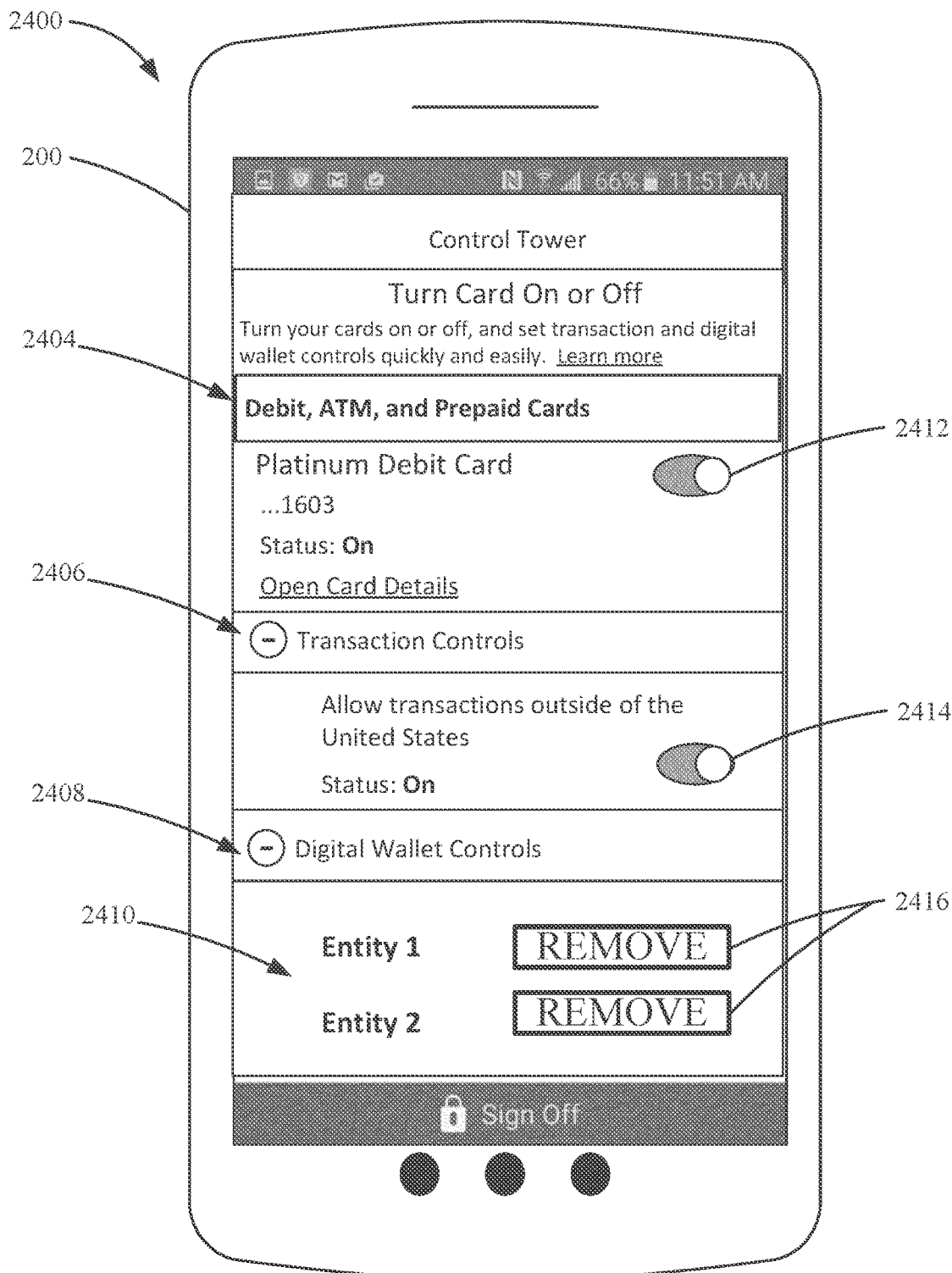
FIG. 24 shows an example account control customer interface allowing for accounts to be turned on/off or removed/deleted, according to an example embodiment.

Referring to FIG. 24, a data control tower interface 2400 is shown, according to an example embodiment. The data control tower interface 2400 is shown as a display presented via the customer mobile device 200 (e.g., via the financial institution client application 208). In some embodiments, the interface 2400 serves as a "details" page showing more details with respect to, for example, one of the cards listed in FIG. 23. In interface 2400, "Debit, ATM, and Prepaid Cards" 2404 are listed, as are their statuses. For the Platinum Debit Card ending in 1603, a transaction controls section 2406 allows the customer to control the transactions that may involve the debit card through, for example, geographical or other restrictions. In interface 2400, the identified card is not restricted from being used internationally, as indicated by the status toggle 2414. The customer may use the status toggle 2414 to block transactions outside of the United States for the card.

A digital wallet controls section 2408 allows for control over the use of the card in transactions and funds transfers. An entities listing 2410 lists entities that are linked with the card (e.g., that may use the card for transactions, like making purchases or funds transfers, or that otherwise may access data related to the card, such as for checking account balance, confirming that the account is still open, or determining the next payment due date). Entities listing 2410 in interface 2400 includes two entities (Entity 1 and Entity 2), and each entity is provided with a corresponding remove button 2416. Selection of the remove button 2416 for an entity allows the customer to, for example, delete customer data and/or delete the account that is maintained by the entity and with which the customer's debit card is linked. For example, Entity 1 may be PayPal Holdings or Amazon.com, and the customer may have a PayPal account which uses the debit card for payments, or an account at Amazon- .com which uses the debit card for purchases. In various versions, the customer may press the remove button 2416 corresponding with one of the entities to, for example, delete the user account at the entity (e.g., delete the PayPal account or Amazon.com account). Alternatively or additionally, the remove button 2416 may allow the customer to delete the customer's account data specific to the debit card ending in 1603 (e.g., the account number, expiration date, etc.) saved in a database in a computing system of PayPal, Amazon-.com, or other entity, without necessarily deleting other customer data. In some implementations, the remove button 2416 causes a scrub command, instruction, or message to be generated and transmitted to the application, device, or system of the entity. In various implementations, the scrub command identifies the data to be deleted from the databases of the third-party systems 106. The scrub command may be transmitted to the third party system 106 (with an identification of the customer data to be scrubbed) directly or via a financial payment processing network.

Figure 25:
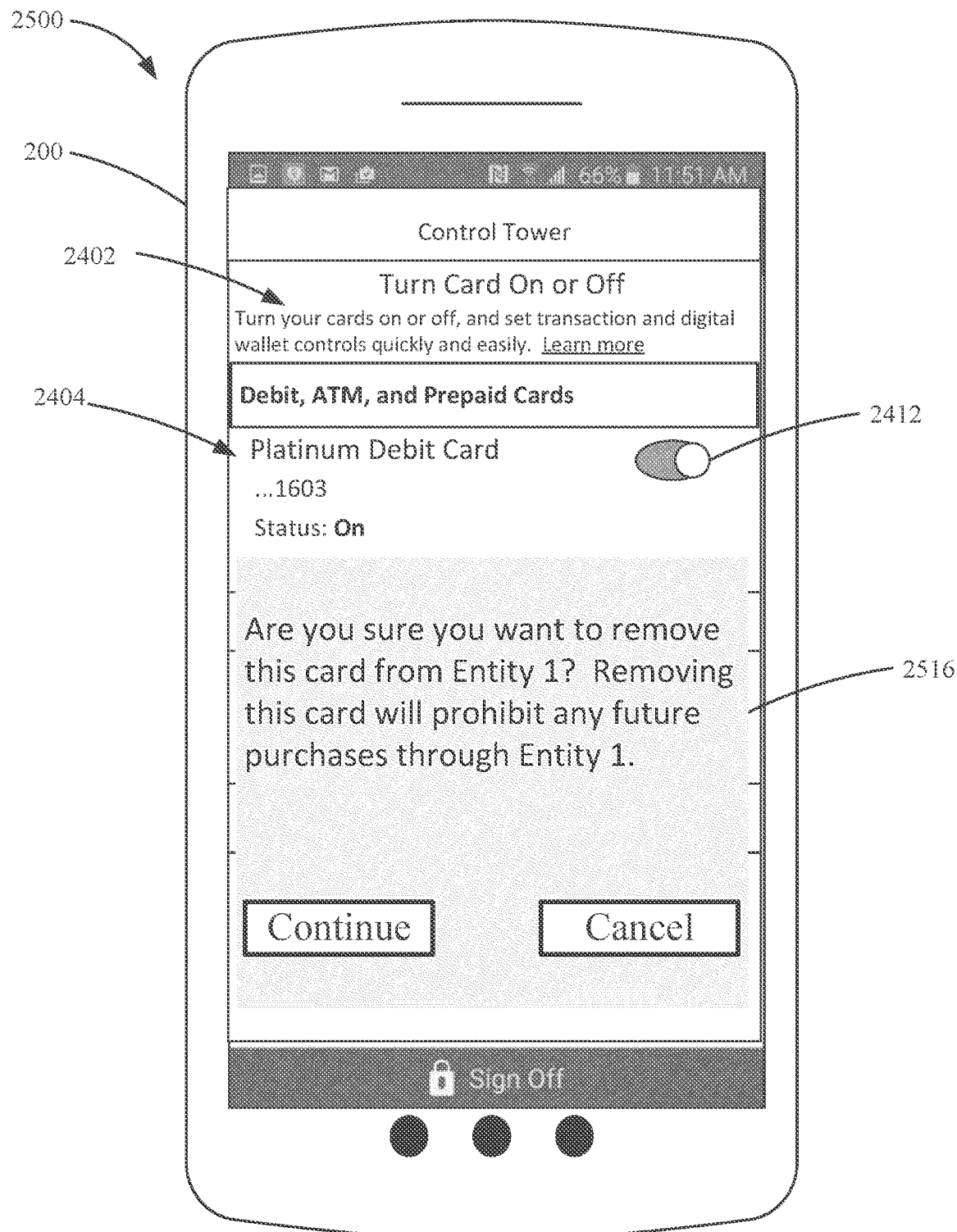
FIG. 25 shows an example account control customer interface allowing a customer to confirm that an account is to be removed/deleted, according to an example embodiment.
Figure 26:
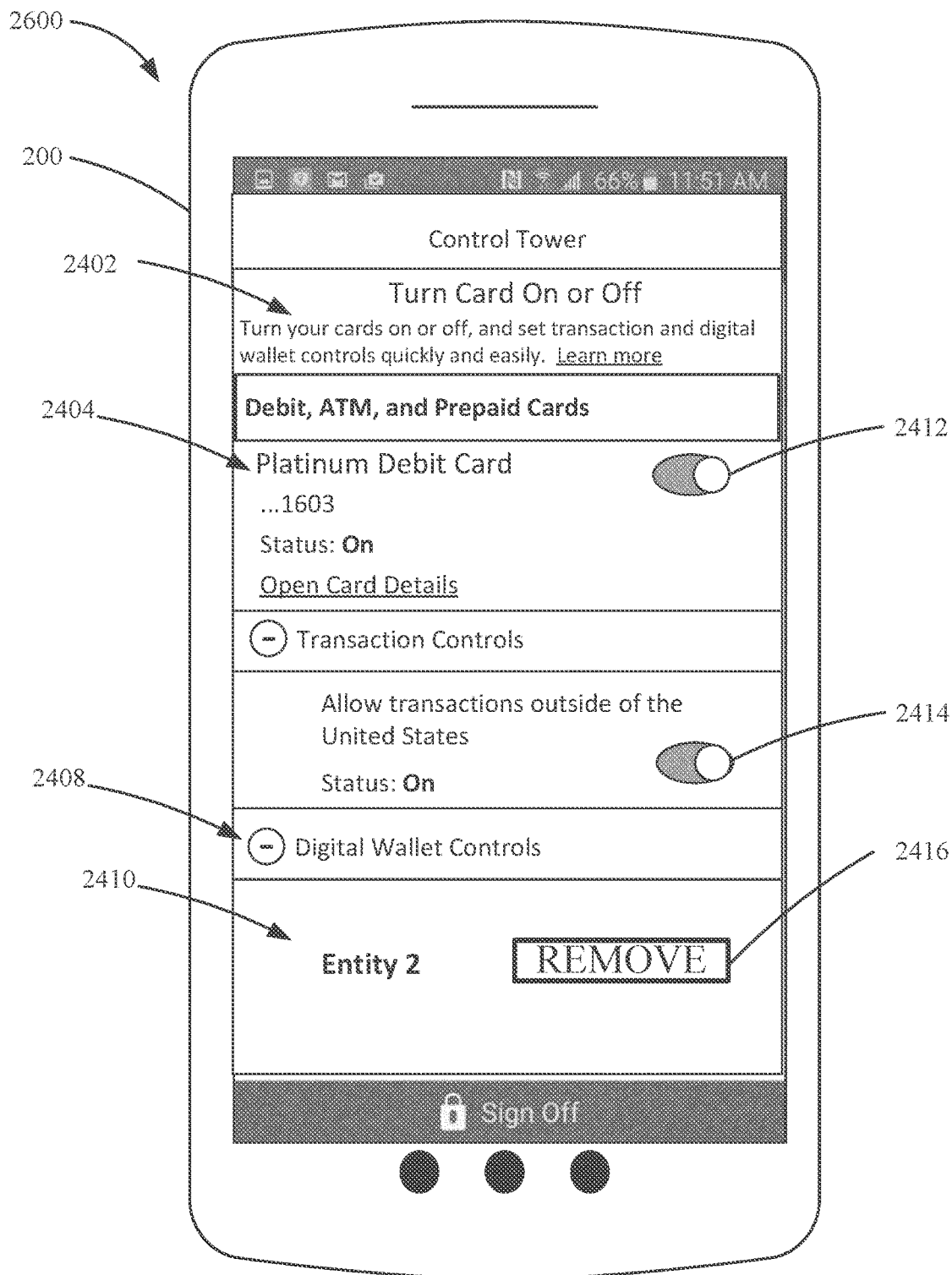
FIG. 26 shows an example account control customer interface once an account has been removed/deleted, according to an example embodiment.

Referring to FIG. 25, a data control tower interface 2500 is shown, according to an example embodiment. The data control tower interface 2500 is shown as a display presented via the customer mobile device 200 (e.g., via the financial institution client application 208). In some implementations, the interface 2500 serves as a confirmation modal for card removal following selection of one of the remove buttons 2416 of interface 2400. In interface 2500, a confirmation window 2516 requires the customer to confirm that removal of the debit card ending in 1603 from Entity 1 is desired by selecting the "continue" button, or to cancel the removal request by selecting a "cancel" button. If removal is confirmed, the customer may be presented with an interface 2600 shown in FIG. 26, which provides a details page with the selected entity removed. That is, interface 2600 corresponds with interface 2400, but Entity 1 is "removed" from listing 2410. The customer may choose to also remove Entity 2 in the same manner that Entity 1 was removed, as discussed above, or leave the connection with Entity 2 in place.

Referring to FIGS. 27A-27F, control tower interfaces 2700A-2700F are shown, according to example embodiments. The control tower interfaces are shown as a display presented via the customer mobile device 200 (e.g., via the financial institution client application 208). In some embodiments, the interfaces 2700A-2700F allow for review and management of recurring payments. For example, the interfaces 2700A-2700F may allow a user to view payees receiving payments on a recurring basis for each account/payment vehicle, view past payments to payees from one or more accounts/payment vehicles, stop all subsequent payments to a payee from a particular account/payment vehicle (permanently or for a specified time period), and/or stop one or more subsequent payments to the payee from the account/payment vehicle. In various implementations, a recurring payment involves an arrangement in which a user makes payments regularly (e.g., each month or each quarter) or as debts become due, commonly from a predetermined (although changeable) account (e.g., a checking account, debit card, or credit card). A recurring payment may have a predetermined end date (e.g., loan payments that end when the loan is repaid), or may continue indefinitely until a potential future occurrence (e.g., utility payments that will continue until the user moves from a residence at which the utilities are consumed). Recurring payments may be initiated by the payor (e.g., a user's financial institution initiates a transfer of funds from an account of the user), and/or by the payee (e.g., an authorized payee submits a request that indicates a user account number, an amount to be paid, a payee account number, and/or a payment authorization from the payor). Recurring payments may be for fixed amounts (e.g., a mortgage) or for variable amounts (e.g., depending on what goods/services were actually consumed). In certain implementations, a recurring payment may be identified as a consequence of the user having made multiple payments to the same payee in the past, regardless of whether there is a particular arrangement between the user and the payee.

Figures 27A, 27B:
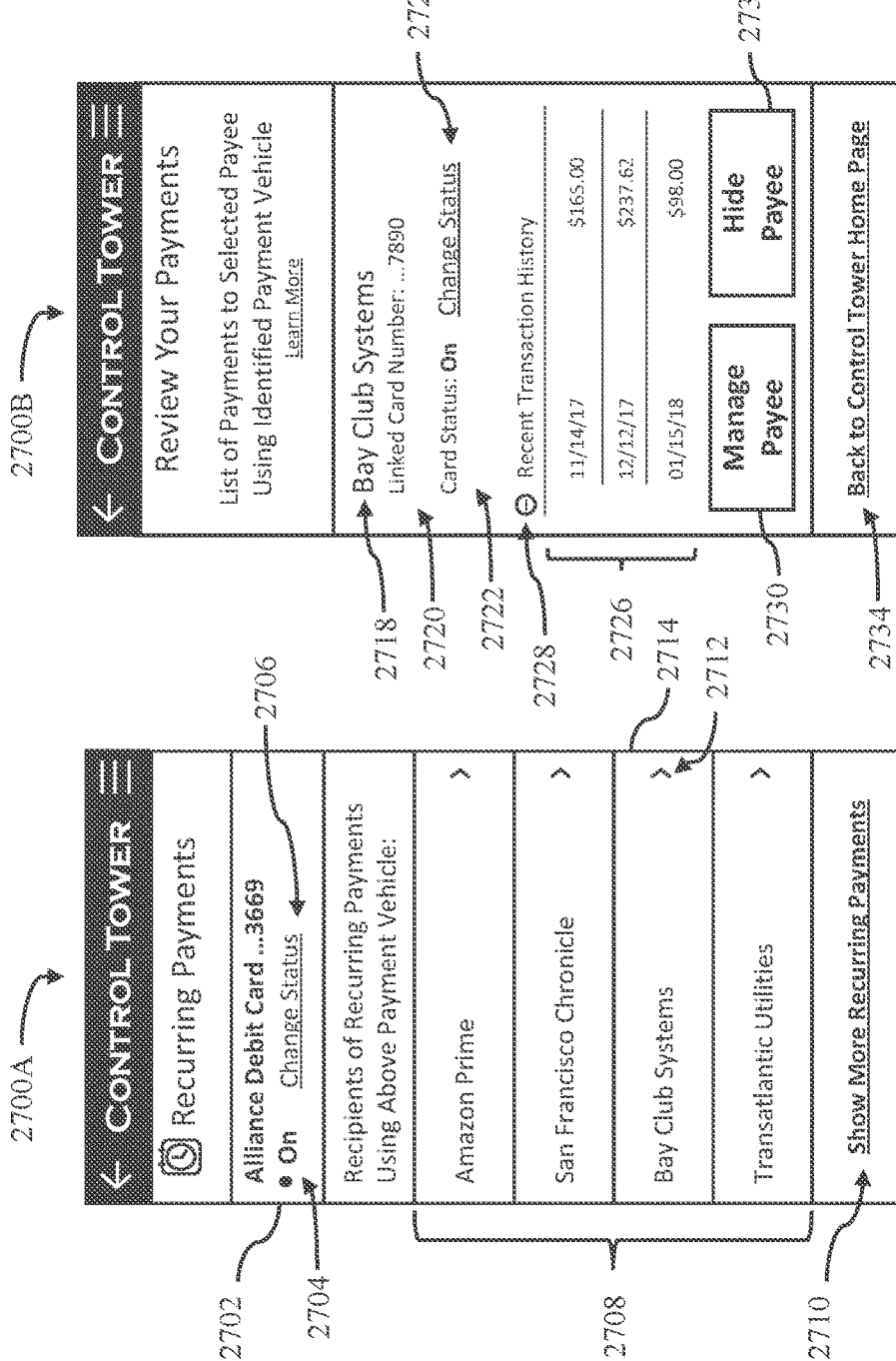

FIG. 27A provides interface 2700A with an example recurring payments landing page, which may be presented, for example, upon selection of recurring payments listing 2306 in FIG. 23. Interface 2700A includes a payment vehicle identification region 2702. In FIG. 27A, the payment vehicle is a debit card with a number ending in 3669. A status indicator 2704 indicates that the identified payment vehicle ("Alliance Debit Card") has a status of "On." If the user wishes to change the status (to, e.g., deactivate the identified payment vehicle for particular or all entities or to otherwise make another change), the user may activate/select a change-status icon 2706, and make a change via, for example, interface 1200 of FIG. 12, interface 2000 of FIG. 20, interface 2400 of FIG. 24, or another suitable interface. A payee listing 2708 identifies recipients of recurring payments. Additional payees not presented in interface 2700A, if any, may be viewed by selecting show-more icon 2710. The listed payees may be selected for details and changes.

In interface 2700B of FIG. 27B, payee Bay Club Systems has been selected (e.g., by selecting the arrowhead 2712, the name "Bay Club Systems," or somewhere in the region 2714 identifying the payee). Interface 2700B allows the user to review a listing of payments for the payee identified at 2718 using the account identified at 2720. The identified account has its status indicated at status indicator 2722, and like change-status icon 2706, a change-status icon 2724 allows the user to make a change to the status of the account identified at 2718. In various implementations, the listing 2726 includes past payments by date and amount. The list may be collapsed using minimizer icon 2728 to "hide" the transaction history. In some implementations, listing 2726 may additionally or alternatively include future payments that have not been made but are scheduled/arranged, and/or future payments which are not necessarily known to be scheduled or arranged but are expected/anticipated/deduced based on payment history. Moreover, the listing 2726 may include payments that are being processed but not yet paid. A payment may be in-process if, for example, a financial institution has begun a funds transfer process (upon, e.g., receipt of a valid payment request from a payee). The different types of payments may be presented differently or otherwise presented so as to indicate their different status. For example, past/completed payments, in-process, and future payments may be presented with differing emphasis (e.g., different colors, fonts, font sizes, formatting, etc.), or may be presented in separate sections (e.g., past payments, followed by in-process payments, followed by future payments) that may be, for example, labeled or separated by a line or other markings or alphanumeric characters.

In various implementations, interface 2700B may provide a manage payee icon 2730 and/or a hide payee icon 2732, depending on the payee or payment arrangement. Interface 2700B (as well as interfaces 2700C-2700F) also provide a home-page icon 2734 to allow the user to leave the recurring payments interfaces and return to the control tower main/home page (e.g., interface 400 of FIG. 4, or interface 1000 of FIG. 10). If manage payee icon 2730 is selected, the user may be presented with, for example, interface 2700C of FIG.

27C to select from one or more actions. Via interface 2700C, the user may select to stop making payments to the selected payee at 2740, or to suppress the payment from being displayed in a recurring payments list (e.g., payee listing 2708) at 2742. In certain versions, the user may make a selection using one of the corresponding selectors 2744, 2746 (in FIG. 27C, 2744 corresponding with "stop this payment" has been selected). In other versions, other selection mechanisms may be employed, such as drop-down menus, selectable icons, voice command, etc. The user may then cancel the "manage payee" process by selecting cancel icon 2748, or proceed with the selected option by selecting continue icon 2750. If the cancel icon is selected, the user may be returned to the recurring payments landing page at interface 2700A, or to another control tower screen.

In various embodiments, if the user selects the continue icon 2750, the user may be presented with a suggestion or recommendation to contact the payee. This may be suitable, for example, in cases in which the user has granted the payee with authorization that, by agreement, is only revocable through the payee. Even in cases in which the recurring payment may be stopped at any time through the financial institution, the user may wish to contact the payee to arrange for payment in an alternative manner (e.g., using a different account/payment vehicle). Interface 2700D provides contact information for the payee at 2756. The user may be allowed to select a cancel icon 2758 to turn back, or continue icon 2760 to proceed with the request.

Figures 27E, 27F:
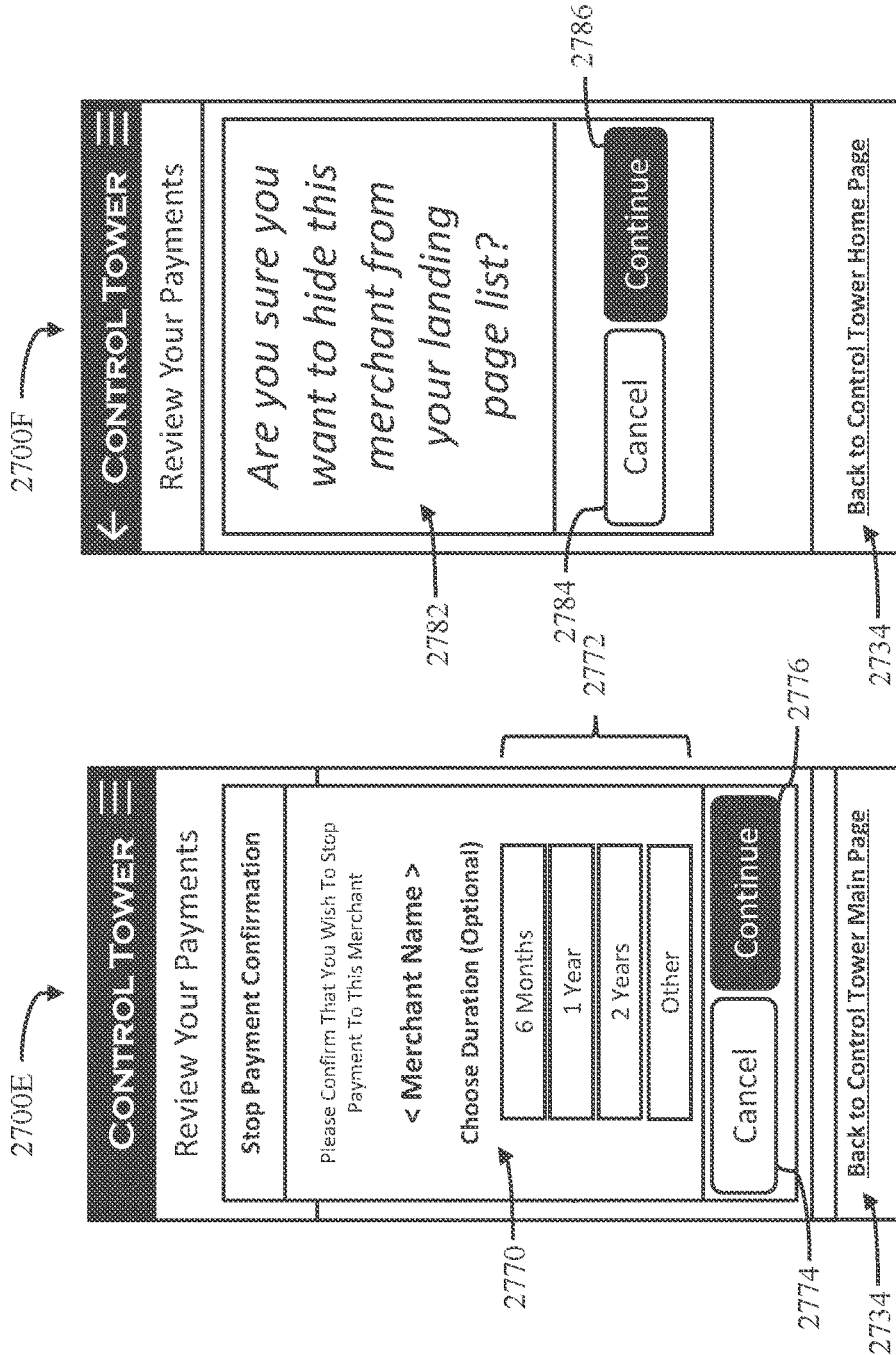

In various embodiments, a user wishing to continue may, for example, be presented with a confirmation page via interface 2700E in FIG. 27E. The user may be asked to confirm that he or she wishes to stop the one or more subsequent payments. Interface 2700E includes a cancel icon 2766 to turn back, and a continue icon 2768 to proceed with the stop payment request. Interface 2700E may provide additional details on the request, such as timing (e.g., stop payment takes effect immediately, within a specified time, or starting at a future date, which may be selectable by the user), and whether the stop payment is inapplicable to any payments, such as certain in-process payments. Optionally, in various embodiments, the user may be allowed to select a duration for which the stop payment remains in effect via a duration selector 2770. By default, a stop payment request may be permanent, indefinite, or for a certain specified time (such as three years). In interface 2700E, the user may optionally be presented with various selectable durations at 2772, such as 6 months, 1 year, or 2 years. The user may be allowed to select one of the identified time periods, and may optionally be allowed to select another time period by selecting "other" and selecting/entering a time period that is not listed. Other mechanisms for selecting a duration may be used. Interface 2700E also provides the user another chance to change his or her mind via a cancel icon 2774, or to choose to proceed with confirmation (potentially for a selected duration) via a continue icon 2776.

In various embodiments, if the stop recurring payment is confirmed (e.g., by selection of continue icon 2776), the financial institution may: cancel future payments that would have been initiated by the financial institution; decline one or more subsequent payment requests from the identified payee from the corresponding account/payment vehicle; and/or to communicate to the payee the user's desire to revoke his or her authorization for, or to otherwise cease, subsequent payments, from the identified account/payment vehicle. In some implementations, a payment authorization may be revoked via, for example, an API call from the financial institution computing system 110 to the third-party system 106 of the payee. Such an API call may include, for example: a security/access token (which may have been received from the third-party system 106) that authenticates the financial institution computing system 110; an identification of the user/payor; an identification of the account/payment vehicle; a unique identifier for the recurring payment (which may have been generated/assigned by the financial institution or the payee); details on one or more past payments; details on one or more subsequent payments; an effective date; a duration for the cessation of the recurring payment, if the user identified a duration (e.g., at 2770) or the cessation is otherwise not permanent; and/or any other relevant information.

In various embodiments, the user may additionally or alternatively be allowed to remove (hide/suppress) a payee/recurring payment from being listed. For example, in interface 2700B, a user may select hide payee icon 2732. In certain implementations, control tower may, upon detecting that the hide payee icon 2732 has been selected, present the user with, for example, interface 2700F in FIG. 27F. Interface 2700F requests that the user confirm that he or she wishes to hide a selected payee from the landing page list (i.e., the list on the landing page of interface 2700A). The user may be presented with a cancel icon 2784 to be selected if he or she does not wish to hide the payee from the list, and a continue icon 2786 to be selected if he or she wishes to proceed with the request to hide the payee. Selection of one of the icons 2784, 2786 may, in various implementations, return the user to the landing page of interface 2700 or to payee management interface 2700B.

In some implementations, the option to stop a recurring payment for a particular account/payment vehicle and/or for a particular payee may not be available for various reasons, and the user may thus only be provided the option to hide the recurring payment (e.g., 2732 but not 2730). Additionally or alternatively, if a recurring payment is not cancelable via control tower, the user may be advised to contact the merchant (see, e.g., interface 2700D and the contact information at 2756). In some implementations, if the user indicated a desire to have the financial institution send a request to the payee on the user's behalf to request that the payee cancel or pause a recurring payment (with the understanding that a recurring payment will be deemed to remain in effect until the payee confirms that it will stop/pause the recurring payment) but the payee does not honor the request, the user may wish to contact the payee himself/herself, and/or hide the recurring payment.

Referring to FIGS. 28A-28J, control tower interfaces 2800A-2800J are shown, according to example embodiments. The control tower interfaces may be presented via, for example, a display of mobile device 200. In some embodiments, the interfaces 2800A-2800J allow for control over automated or other recurring payments. For example, the interfaces 2800A-2800F may allow a user to view and manage automated payments from a first source account held by a first entity to one or more recipients (which may be financial or non-financial (e.g., merchant or service provider) accounts at the first entity and/or at other entities), and disable or otherwise control or manage the automated payments, while the interfaces 2800G-2800J may allow a user to view and manage automated payments from a second source account held by the first entity or by a second entity to one or more recipients (which may be financial or non-financial accounts at the first and/or second entities, and/or at other entities), and disable or otherwise control or manage the automated payments. In various implementations, an automated payment may be a recurring payment involving an arrangement in which a source account is used to make payments on an automated basis periodically (e.g., each month, each quarter, or each year) or as debts become due, commonly from a predetermined (although changeable) account (e.g., a checking account, debit card, or credit card) to a destination account or recipient. An automated payment may have a predetermined end date, or may continue indefinitely until a potential future occurrence. Automated payments may be initiated by the payor and/or by the payee. Automated payments may be for fixed amounts or for variable amounts.

Figures 28A, 28B:
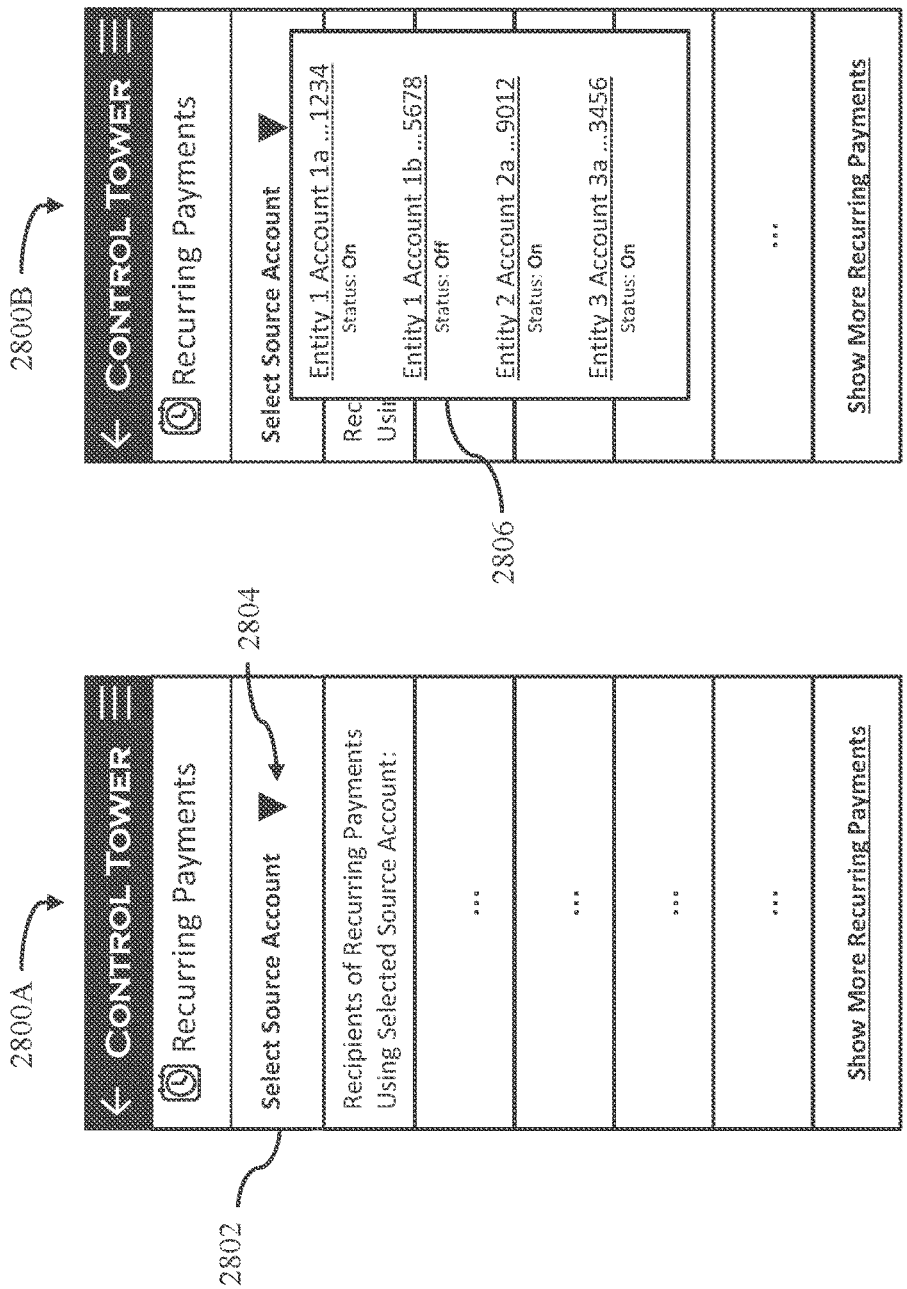

FIG. 28A provides interface 2800A with an example automated payments landing page, which may be presented, for example, upon selection of recurring payments listing 2306 in FIG. 23. Interface 2800A allows a user to select a source account at 2802 via a source account selector 2804, which as illustrated in FIG. 28A, is a drop-down menu but may be any other selection mechanism. In interface 2800B of FIG. 28B, the drop-down menu of selector 2804 has been selected, and selectable accounts are presented at 2806. The user may be allowed to select an account from among one or more accounts (financial or otherwise) at one or more entities (e.g., one or more financial institutions). One or more of the accounts, potentially held at multiple entities, may be managed via the "Control Tower" application. Status indicators may indicate whether each account is enabled or disabled with respect to one or more functionalities (e.g., usability in certain types of or all transactions, accessibility by devices, accounts, and/or entities, etc.).

Figures 28C, 28D:
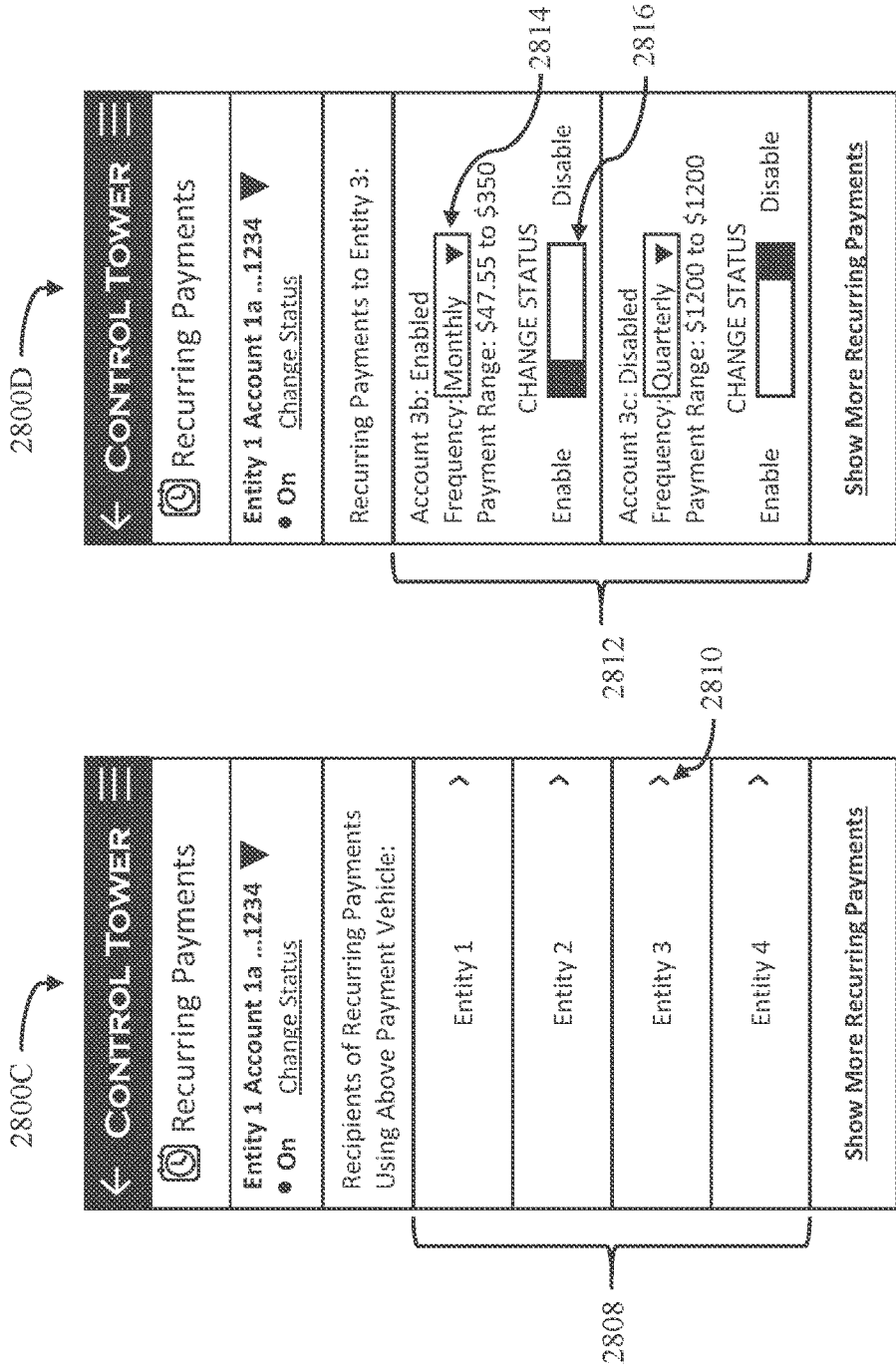

In interface 2800C of FIG. 28C, Account 1a at Entity 1 has been selected via selector 2804. Entity 1 may be, but need not be, the entity providing the "Control Tower" client application used to review recurring payments. An entity listing 2808 identifies recipients of automated payments from the selected account (i.e., Account 1a in FIG. 28C). Because payments may be made from one account (e.g., a checking account) held by an entity (e.g., a bank) to another account (e.g., a credit card) held by the same entity, entity listing 2808 identifies Entity 1 for Account 1a. The listed entities may be selected for reviewing details and/or for making changes. In interface 2800D of FIG. 28D, Entity 3 has been selected (e.g., by selecting the arrowhead 2810 or the name "Entity 3"). Interface 2800D allows the user to review an automated payments listing 2812 identifying automated payment arrangements with Entity 3 using Account 1a. In FIG. 28D, recurring payments from Account 1a held by Entity 1 are made to Accounts 3b and 3c held by Entity 3. The payments to Account 3b are identified as currently being "enabled," with a frequency of payments to Account 3b set to monthly. In some implementations, a frequency selector 2814 (such as a drop-down menu or other selection mechanism) may be used to make a change to the frequency with which automated payments are made from Account 1a to Account 3b. The payments to account 3c are identified as currently being "disabled," with a frequency set to quarterly. A status changer 2816 allows the user to change the status of the automated payments. The status changer may be, for example, a slider that allows the user to move a black square between the left and right sides of a rectangle, or any other selector mechanism. Because the current status of payments to Account 3b is enabled, the black square of its status changer 2816 is on the left side, and because the current status of payments to Account 3c is disabled, the black square of its status changer is on the right side. The status may be changed to disabled by sliding or otherwise touching or selecting the status changer 2816 to move the black square leftward, and enabled by sliding or otherwise touching or selecting the status changer 2816 to move the square rightward.

In interface 2800E of FIG. 28E, the user has made a selection (via, e.g., status changer 2816) to disable automatic payments from Account 1a to Account 3b. A dialogue box 2820 requests confirmation. Optionally, in various embodiments, the user may be allowed to select a duration for which the disabling of the automated payments remains in effect via a duration selector 2822. In interface 2800E, a duration of 1 year has been selected (as indicated by the black rectangle with "1 year"). The user may cancel the request to disable the automated payment by choosing "cancel," or may choose to confirm disabling of the automatic payment by choosing "disable."

After confirming that the automated payment is to be disabled (e.g., by selecting "disable" in dialogue box 2820 of interface 2800E), the user may be returned to the listing of automated payments made to Entity 3 using Account 1a, as illustrated by interface 2800F of FIG. 28F. Interface 2800F shows at 2830 that the status of automated payments to Account 3b has been disabled (as indicated by "disabled" in bold). In the illustrated example, the automated payment has only been disabled for a certain duration. Interface 2800F may thus indicate that automated payment to Account 3b has been disabled until a specified date (e.g., one year from the current date if "1 year" is selected as the optional duration).

In example implementations, the user may then wish to select another source account from which automated payments are made to one or more entities. Interface 2800G in FIG. 28G illustrates that the user may select a source account via the source account selector 2804. In interface 2800G, the drop-down menu of selector 2804 has been selected, and selectable accounts are presented at 2840. The user may then choose, for example, Account 2a at Entity 2, and be presented with, for example, interface 2800H in FIG. 28H. The user may then be presented with a list of entities to which automated payments are made via listing 2844, and may select Entity 1 via arrowhead 2848.

Figures 28I, 28J:
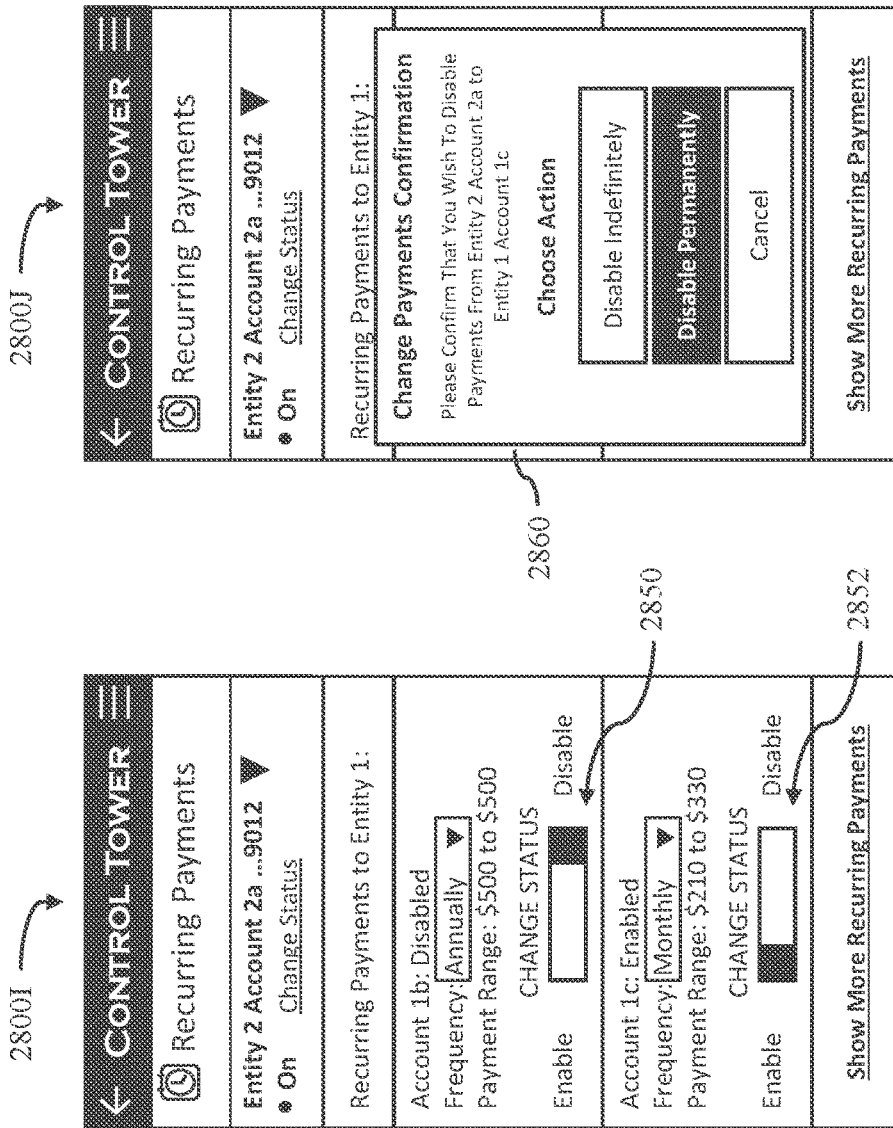

In various embodiments, the user may then be presented with interface 2800I of FIG. 28I, which indicates that Account 2a held by Entity 2 is used to make automated payments to Accounts 1b and 1c held by Entity 1. As illustrated in FIG. 28I, automated payment to Account 1b is disabled, while automated payment to Account 1c is enabled. The user may then choose to, for example, enable automated payment from Account 2A at Entity 2 to Account 1b at Entity 1 via status changer 2850, and/or to disable automated payment from Account 2a to Account 1c via status changer 2852.

In interface 2800J of FIG. 28J, the user has made a selection to disable automatic payment from Account 2a to Account 1c. In certain implementations, the user may be presented with a dialogue box analogous to dialogue box 2820. In some versions, the user may alternatively or additionally be presented with modified dialogue box 2860 for confirming that an automated payment is to be disabled. Dialogue box 2860 allows the user to disable the automated payment "indefinitely." In some implementations, such a selection would leave the automated payment in the corresponding listing of automated payments with a disabled status (until changed). Dialogue box 2860 also allows the user to choose to permanently disable the recurring payment. In certain embodiments, such a selection would disable automated payment and also remove the option to re-enable the automated payment. In some embodiments, permanent disablement would additionally delete the account from the listing of automated payments from Account 2a to Entity 1. The user may be also be allowed to cancel the request to disable the automated payment and, for example, return to interface 2800I.

Once an automated payment is disabled or enabled, the entity holding the source account and/or the entity holding the destination account may be notified via a transmission to a computing system or device associated with the entities. In some versions, this may involve an API call to the computing system or device. For example, in some implementations, if an automated payment from Account 1c to Account 2a is disabled, an API call (or other transmission) may be sent by a computing system or device of the entity providing the "Control Tower" application (e.g., Entity 1, Entity 2, or a third-party entity), or by the user device running the application, to a computing system or device of the one or more entities holding the accounts involved in the automated payment. Alternatively or additionally to such a notification, in some implementations, a subsequent payment request may be declined. The API calls may be accompanied by security tokens and data identifying the automated payment or relevant users, entities, and/or accounts.

Figures 29A, 29B:
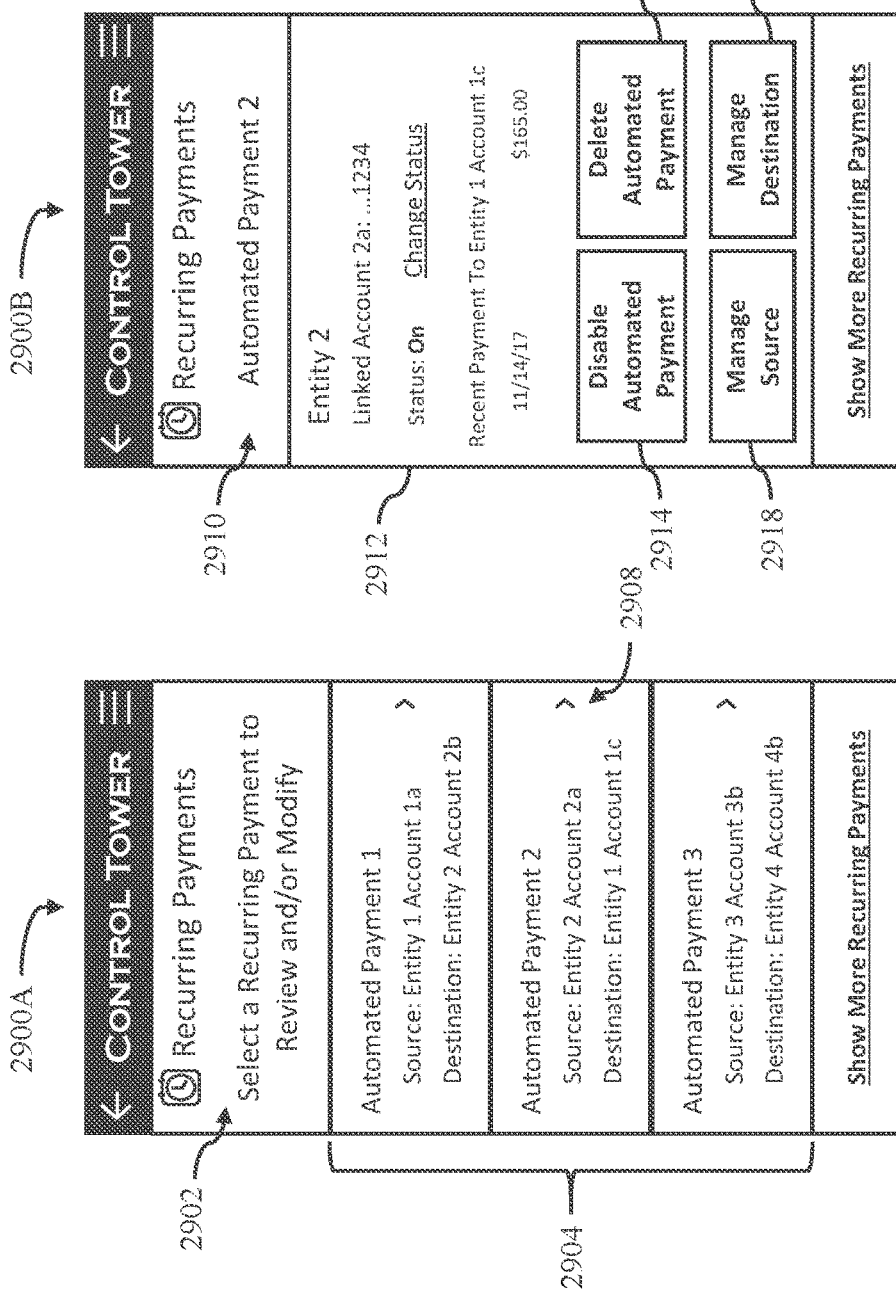
FIGS. 29A and 29B show example automated payment control interfaces, according to example embodiments.

Referring to FIGS. 29A and 29B, control tower interfaces 2900A and 2900B are shown, according to example embodiments. The control tower interfaces may be presented via, for example, a display of mobile device 200. In some embodiments, the interfaces 2900A and 2900B allow for control over automated or other recurring payments by selecting the automated payment arrangement to be managed or controlled. For example, interface 2900A provides an automated payment listing 2904 with automated payments 1, 2, and 3. The automated payments need not be organized by funding account or recipient, but may instead involve any combination of source and destination accounts. For example, automated payment 1 involves payment from account 1a to 2b, automated payment 2 involves payment from account 2a to 1c, and automated payment 3 involves payment from account 3b to 4b.

In interface 2900B, automated payment 2 has been selected via arrowhead 2908. Interface 2900B identifies the selected automated payment (i.e., automated payment 2) at 2910. At 2912, interface 2900B identifies the entity and account (i.e., Entity 2, Account 2a) used to make the automated payment, as well as historical, account, or other information on the payments or recipient (such as the most recent payment to Account 1c, as presented in FIG. 29B). Interface 2900B may also allow the user to choose to disable automated payments via selector 2914 (while allowing for subsequent re-enablement) or delete automated payments via selector 2916 (requiring the automated payment to be set up or otherwise added again). The user may also be allowed to manage the source account (i.e., Account 2a) via selector 2918, and manage the destination account (i.e., Account 1c) via selector 2920. Selecting to manage the source and/or destination accounts via 2918 and/or 2920 may allow the user to, for example, disable (e.g., turn off) an account, unlink the account from various applications, devices, etc.), or otherwise review information on and control aspects of the corresponding accounts.

In example versions, a "Control Tower" application allows for control of transactions between financial institutions. For example, a user may have a Bank A checking account and a Bank B credit card. The user is able to disable automatic payment of the Bank B credit card from the Bank A checking account via Control Tower. The same Control Tower user may also have a Bank A credit card and a Bank C checking account. In addition to being able to disable automatic payment of the Bank B credit card from the Bank A checking account via Control Tower, the user is able to disable automatic payment of the Bank A credit card from the Bank C checking account via Control Tower.

In various embodiments, the Control Tower application is not a client application of any of the financial institutions involved in the transactions that are controllable via the client application. The application may be a client application of a third-party entity. In various embodiments, the Control Tower application may be a client application of one of the financial institutions involved in the inter-institutional transactions controllable via the client application.

Figures 30A, 30B:
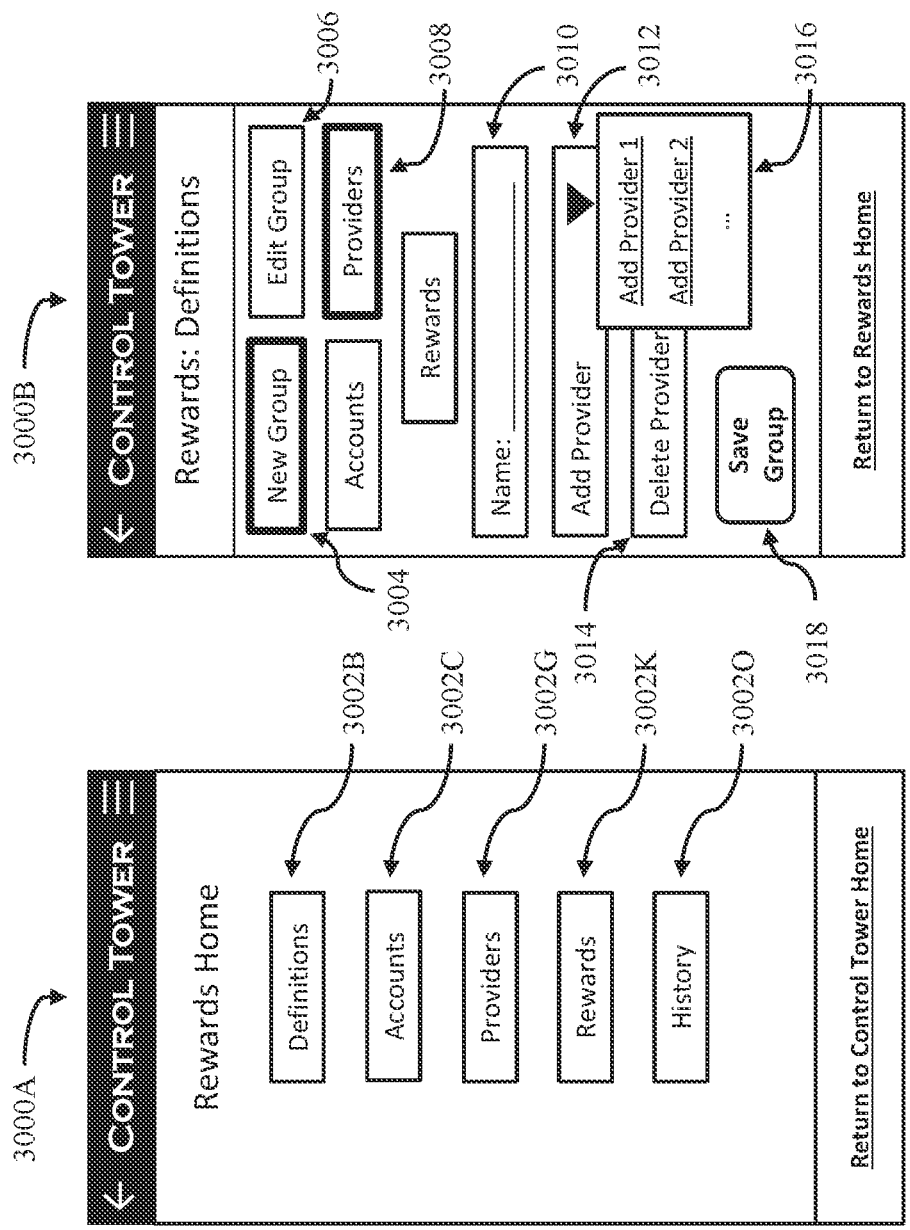
FIGS. 30A-30P show example rewards control interfaces, according to various potential embodiments.
Figures 30E, 30F:
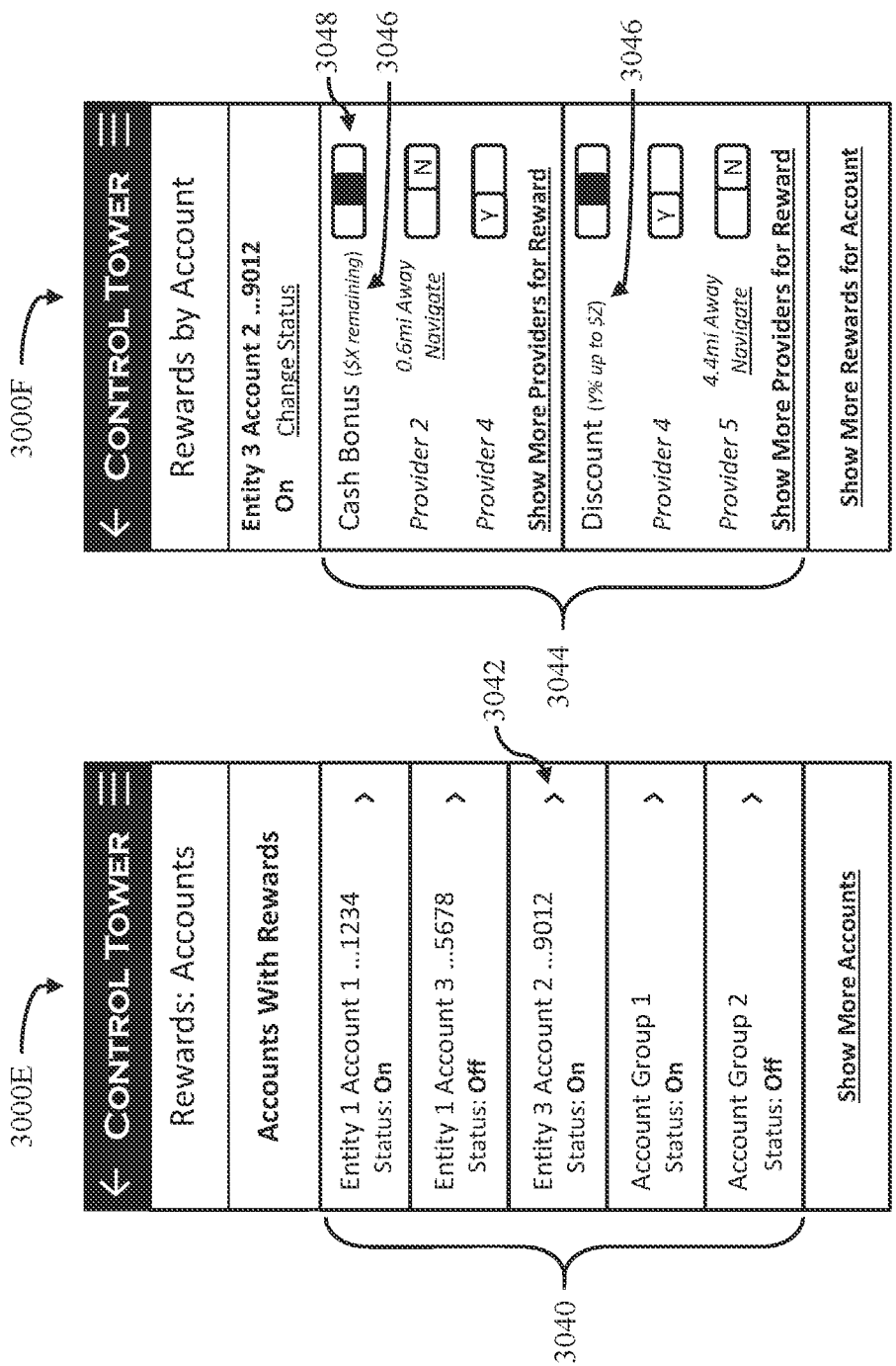
Figures 30G, 30H:
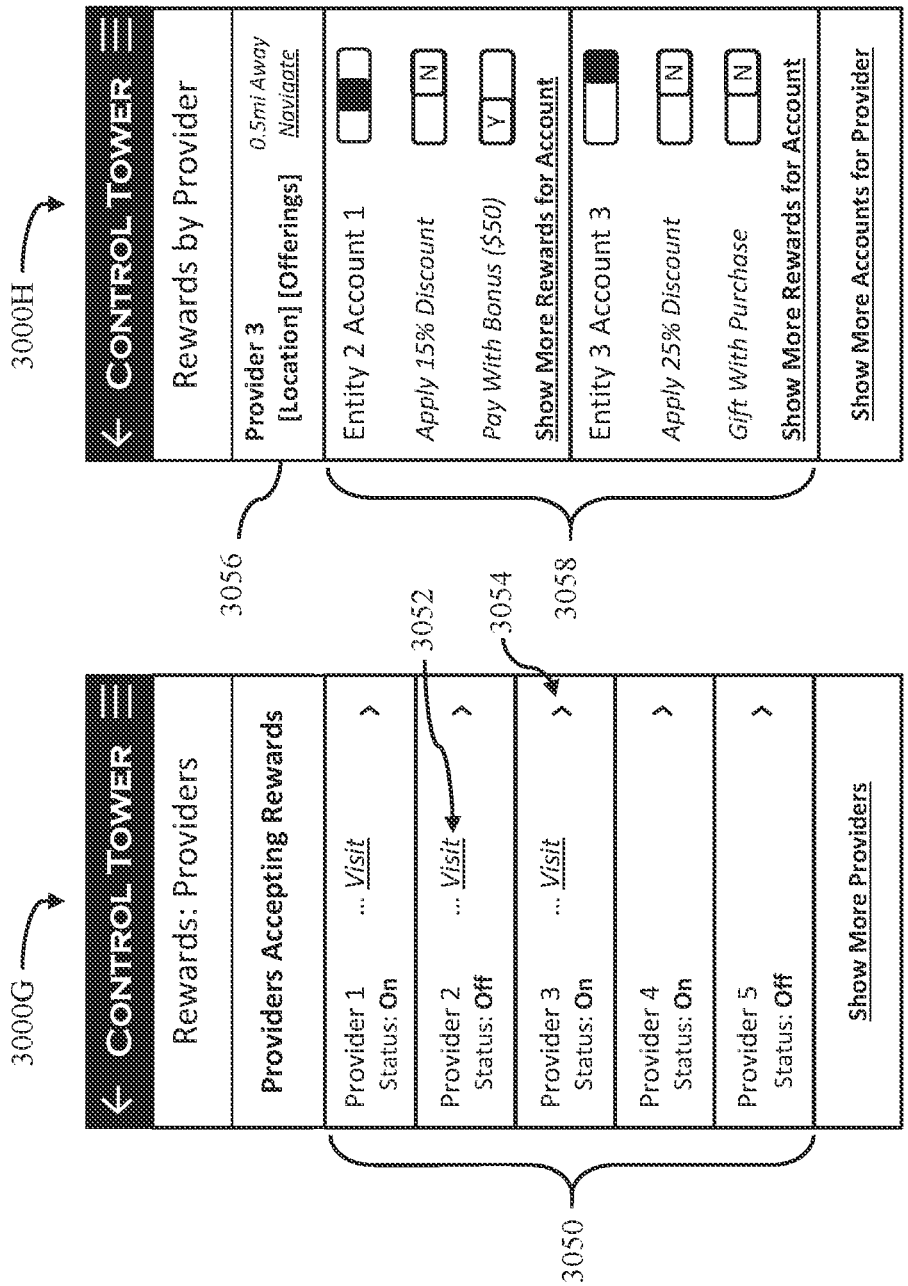
Figures 30M, 30N:
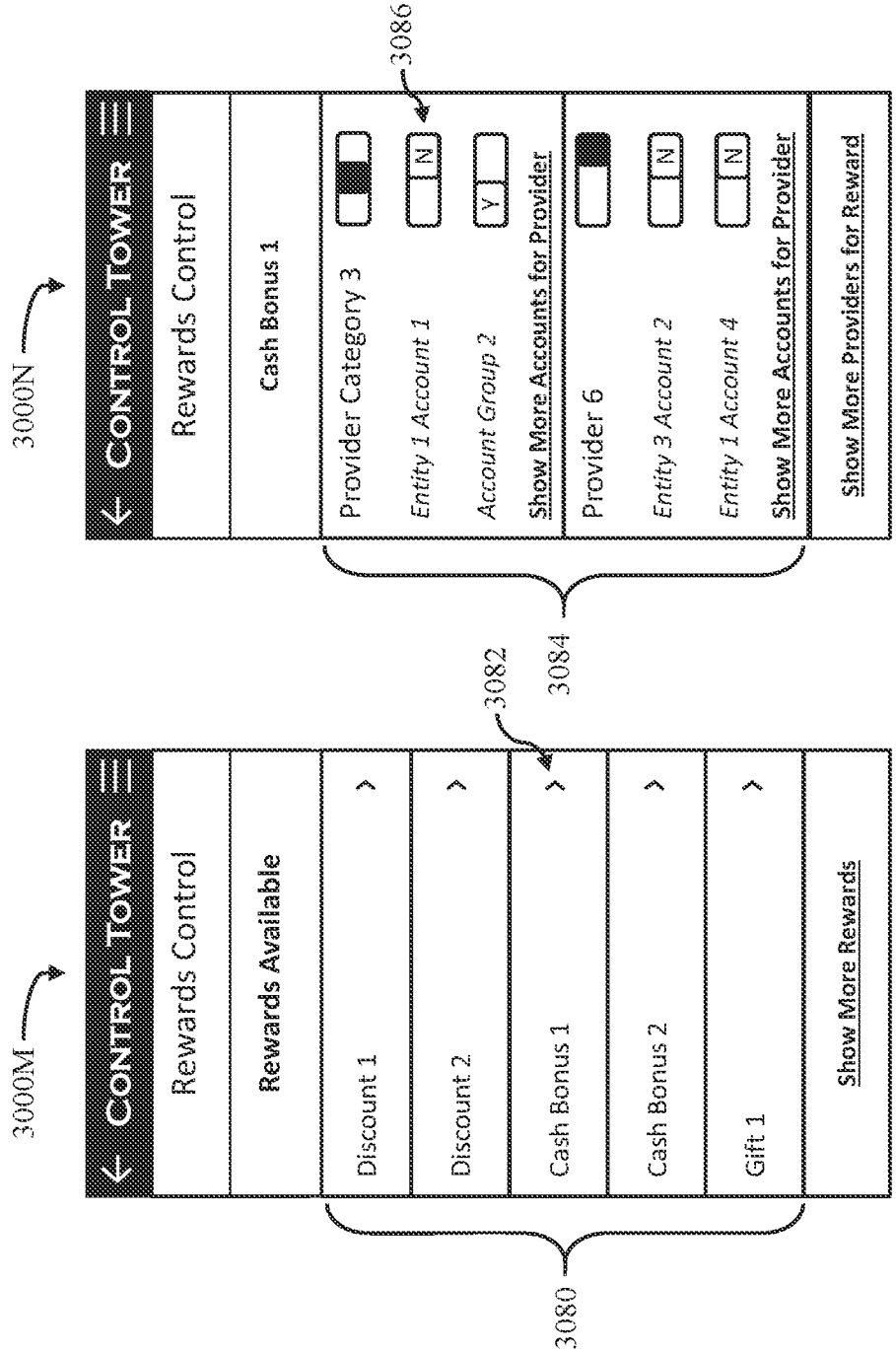
Figures 30O, 30P:
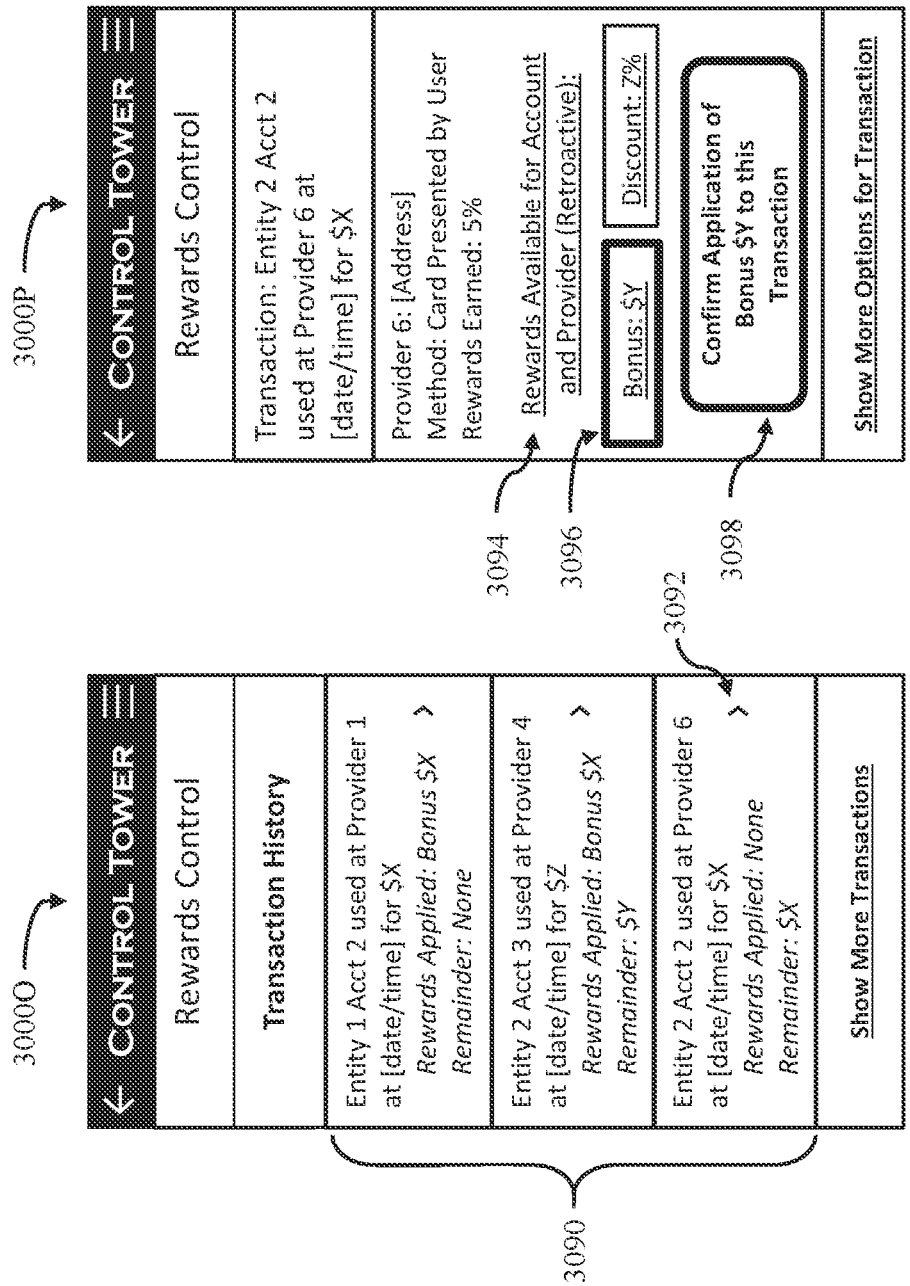

Referring to FIGS. 30A-30P, control tower interfaces 3000A-3000P are shown, according to various potential embodiments. The control tower interfaces may be presented via, for example, a display of mobile device 200. In some embodiments, the interfaces 3000A-3000P allow for control over use of virtual rewards currency (used interchangeably with "rewards") corresponding with value provided to an account holder but not yet exchanged by the account holder for a benefit (i.e., not yet "redeemed"), such as bonuses, discounts, and promotional gifts. Certain rewards may be exchanged for a benefit by being converted into monetary currency, such as when a bonus is a "cashback" bonus redeemable via a monetary deposit into a user's financial account or for a purchase. Certain rewards may be redeemed for other benefits, such as a percent discount on a purchase or receipt of a (non-monetary) gift (e.g., an item gifted by a merchant with a purchase).

A user may be granted rewards (i.e., rewards may be "earned" by a user from, e.g., an issuer of a credit card) through, for example, use of a payment card or other payment vehicle, and the value of the rewards may be determined based on types of transactions (e.g., purchases of certain categories of items or from certain merchants), amounts of transactions (e.g., one percent of purchases), etc. In certain embodiments, rewards may be conferred based on performance of certain activities, such as visiting a certain location, presenting a mobile device to a scanner device capable of detecting the mobile device (via, e.g., NFC), speaking certain promotional phrases (which may be detected via a microphone of a mobile device, and the sound recording, or confirmation that the phrase was recognized as having been spoken in a sound recording, may be transmitted to, e.g., a device associated with a merchant or payment card issuer), or otherwise.

In various implementations, whether a user has visited a certain location (e.g., a mall or gas station) may be determined in different ways. For example, a mobile device's location sensor (e.g., GPS device) may be used to determine a location of a mobile device (e.g., a mobile device known to be associated with an account holder) to determine, for example, that a user has walked into a store, even if no purchase is made. Alternatively or additionally, a mobile device's microphone may be used to detect ambient sounds, and the ambient sounds analyzed (e.g., by the mobile device, such as by using an application running on the mobile device, or by a remote computing system to which the ambient sounds are transmitted) to determine whether a sound signature in the ambient sounds matches (or is sufficiently close to) the sounds expected at the location being visited (e.g., a sound signature of a musical tune being broadcast over a speaker at the destination to be visited may be recognized in the ambient sounds captured using the microphone of the mobile device of the user/account holder). Similarly, a mobile device's camera or other sensor may be used, alternatively or additionally, to capture an image and the image analyzed to determine whether the image includes an item (such as a landmark, signage, a person, a feature of the landscape, etc.) expected to be located at the place to be visited for earning a reward.

In example embodiments in which virtual rewards currency is earned through performance of activities (e.g., activities other than purchases or other transactions involving the relevant payment card or other payment vehicle), an account holder may install and run an application, such as a "control tower" application, rewards application, or banking application, on his or her mobile device (e.g., a smartphone). The application may be retrieved, for example, through a digital distribution platform. The application, when running, may interface with various devices of the mobile device, such as a GPS device or other location sensors, ambient sensors like a microphone and/or a camera, and user interfaces such as a touchscreen. The mobile application may track or otherwise determine whether certain activities have been performed through interaction with the user and the devices of the mobile device. The signals from the devices (e.g., GPS, microphone, etc.) of the mobile device may be received (via, e.g., an operating system of the mobile device) and processed by the application and/or by a remote server receiving data from the mobile device. If the signals reveal that an activity that earns rewards has been performed, the value of the corresponding rewards may be determined and credited to the user's account.

The interfaces 3000A-3000P may allow a user to view and manage when and how rewards may be exchanged for a benefit. Interface 3000A in FIG. 30A provides an example rewards home page that allows the user to select certain potential functionalities with respect to rewards management. Interface 3000B in FIG. 30B provides an example definitions page upon selection of "Definitions" icon 3002A in FIG. 30A. Interface 3000B optionally allows the user to categorize certain accounts, providers, or rewards by creating groups. For example, a user may wish to group selected accounts, providers, and/or rewards together so that an action or selection is automatically applied to multiple accounts, providers, and/or rewards in batch (e.g., all the accounts, providers, and/or rewards in a defined group).

In interface 3000B, the user has chosen to define a new group (as indicated by the thicker, bolded rectangle of new group icon 3004) of providers (as indicated by the thicker, bolded rectangle of providers icon 3008). A user may also choose to edit an existing group (e.g., a group previously defined via new group icon 3004). Providers may be merchants (such as online merchants and/or merchants with physical stores) or other entities through which rewards may be redeemed in exchange for something of value. The user may enter a name or other designation for the grouping (for easier reference) at name field 3010. If the user were editing a group (rather than defining a new group), the (unpopulated) name field 3008 may be a replaced with, for example, a drop-down menu or other selector allowing the user to identify which group is to be edited.

In example interface 3000B, providers may be added (e.g., via add provider icon 3012) or deleted (e.g., via delete provider icon 3014) from the grouping being defined. The user may select providers to add or delete via, for example, drop-down menus. Through an "add provider" drop-down menu (such as drop-down 3016), the user may be presented with a list of known providers via which a reward may be redeemed, and the user may select one of the providers to add to the group being defined or edited. Similarly, through a "delete provider" drop-down menu (not shown), the user may be presented with selectable providers that have previously been added to the provider group, and selected providers would be removed from the group being defined or edited. If "accounts" or "rewards" were selected, it would be accounts or rewards, respectively (rather than providers), that could be selected for addition to or deletion from a group. Once a user is done with entries, the user may choose to save the new group (or save changes to an edited group) via a save group icon 3018, after which the user may be, for example, returned to the rewards home (e.g., interface 3000A) or returned to a rewards definitions page (e.g., interface 3000B with settings reset to default so as to remove prior selections) in which a user is allowed to select whether to create or edit a group (e.g., via icon 3004 or 3006).

Example interface 3000C of FIG. 30C may be presented upon, for example, selection of accounts icon 3002C in FIG. 30A. Interface 3000C presents an account listing 3020, which identifies user accounts that may earn, or have earned, rewards, and/or through which rewards may be redeemable. The accounts may be held by or at multiple entities (e.g., multiple banks or other financial institutions), and they may be accounts of different types (e.g., credit card, debit card, savings account, etc.) with different methods in which rewards are earned and/or redeemed (e.g., different percentages, transaction types, performable activities, etc.). Each account has a status indicator that indicates whether the account is currently "On" (and thus enabled, activated, or otherwise always usable or usable in some respect, such as usable for certain transactions or during certain times) or "Off" (and thus disabled, deactivated, or otherwise entirely unusable or unusable in some respect). The user may be allowed to change the status of an account by, for example, selecting the corresponding status indicator (e.g., by touching "Status" or "On" or "Off" for a particular account on a touchscreen) and selecting a different status (e.g., via another interface discussed herein). If there are other accounts that do not fit on the screen, a user may view them by, for example, scrolling the page (e.g., by swiping up on a touchscreen) or by selecting "Show More Accounts" at the bottom of interface 3000C.

One of the accounts from account listing 3020 may be selected by, for example, activating (e.g., by touching or otherwise selecting) the account identifier (e.g., the label "Entity 4 Account 3" or the designation " . . . 3456") or a corresponding arrowhead or other icon. In FIG. 30D, arrowhead icon 3022 corresponding with Entity 3 Account 2 has been selected. Interface 3000D of FIG. 30D includes a selection identification region 3024, which identifies which account has been selected for review and/or management. A provider listing 3026 identifies available providers through which rewards may be redeemed. For each provider, rewards redeemable at the provider is listed. In certain implementations, rewards earned with respect to one account may be usable with respect to another account at the same entity or at another entity. For example, a reward earned via one or more transactions involving a first account (e.g., purchases made using a credit card issued by bank A) may be redeemed via one or more transactions involving a second account (e.g., for a purchase made with a debit card issued by Bank B).

In FIG. 30D, provider listing 3026 identifies Providers 1 and 2, each of which has two rewards that may be activated for redemption through a transaction involving the corresponding provider (e.g., a purchase from the provider). A status indicator 3028 indicates whether use of rewards in transactions involving the selected account is enabled for the corresponding provider. In the version of status indicator 3028 shown in FIG. 30D, a black solid square may be positioned to the left of a rectangle to indicate, for example, that all selectable rewards are enabled, the black solid square may be positioned to the right of the rectangle to indicate that all selectable rewards are disabled, and the black solid square may be positioned in the middle (or otherwise somewhere between the left and right) to indicate that at least one reward is enabled while at least one reward is disabled. Status indicators corresponding to particular rewards may indicate whether the corresponding reward is enabled or disabled in a similar fashion. For example, status indicator 3030A may indicate that a particular reward is enabled (i.e., would be applied or otherwise used) if a square is positioned to the left (e.g., a square with a "Y" for "yes"), and status indicator 3030B may indicate that a particular reward is disabled (i.e., would not be applied or otherwise used) if a square is positioned to the right (e.g., a square with a "N" for "no").

Status indicators discussed herein (e.g., the status indicators in FIGS. 30A-30P, such as status indicators 3028, 3030A, 3030B) may function as "toggles" or switches that may be selected or otherwise activated to toggle or otherwise change the indicated status. For example, the status corresponding to "Pay with Bonus" (valued at "$YY") is indicated as being enabled ("Y") at status indicator 3030A in FIG. 30D, and can be changed to disabled ("N") by, for example, touching (or touching and dragging rightward) the status indicator 3030A on a touchscreen.

In certain implementations, a user may be allowed to indicate a frequency for a reward, such as a maximum number of times the reward would be applied or otherwise used. Frequency may be indicated via a frequency selector 3032, and may have a value of, for example, "1", "2", or another selected value "z". The frequency value may be changed, for example, via a selection made using a drop down menu or via an input into a text box. Additionally or alternatively to frequency, the user may be allowed to provide a time window or duration during which the reward will be applied, after which the reward would be deactivated until reactivated again. Duration may be indicated via a duration selector 3034, and may have a value of, for example, an hour from activation, 24 hours from activation, the day of activation (e.g., until midnight), within a week ("Wk") from activation, the week of activation (e.g., until midnight on the upcoming Sunday), indefinitely (e.g., until deactivated or expended), or a specified future time period (e.g., during a promotional period, during a lunch hour, etc.). The time window may be changed, for example, via a selection made using a drop down menu, via an input into a text box, or otherwise.

In various implementations, the application may indicate how far away a provider is from a location, such as the current location of the mobile device on which the application is running, from the user's known residence, or from the user's anticipated location based on the current date and time (e.g., from a user's workplace during work hours). At distance indicator 3036, interface 3000D may indicate that Provider 1, through which certain rewards may be redeemable, is a certain distance away (e.g., 0.1 miles), and a navigation selector ("Navigate"), if activated (e.g., by touching "Navigate" on a touchscreen), may assist the user in reaching the provider. For example, the navigation selector may launch a mapping or driving application and provide the address of the provider to the mapping/driving application as the user's destination, or the application may display driving directions (with or without GPS navigation) within the application without launching or interfacing with another application or device. Interface 3000D also provides a "Switch View" selector 3038 (which may include a drop down menu with alternative selectable views) to allow the user to switch from the current view (e.g., providers for a selected account as in interface 3000D) to another view (e.g., the view of interface 3000F).

Example interface 3000E of FIG. 30E is another example interface that may be presented upon, for example, selection of accounts icon 3002C in FIG. 30A. Interface 3000E presents an account listing 3040, which identifies user accounts and account groups ("Account Group 1" and "Account Group 2"), which may correspond with multiple accounts that can be selected, enabled, disabled, etc., as a group. Such groupings may have been defined, for example, via interface 3000B. Account groups may include accounts in certain categories (which may be, e.g., user-defined or automatically categorized by, e.g., the application), such as all credit cards regardless of issuing financial institution, all payment cards of a particular issuing financial institution, all non-credit payment vehicles, etc. Each account group may include accounts held at multiple entities or one entity, and they may be accounts of a certain type or a certain method in which rewards are earned and/or redeemed, or may be accounts of different types with different methods in which rewards are earned and/or redeemed. Each grouping has a status indicator that indicates whether some or all of the accounts in the group/category are currently "On" or "Off".

One of the accounts from account listing 3040 may be selected by, for example, activating (e.g., by touching or otherwise selecting) the account identifier or a corresponding arrowhead or other icon. In FIG. 30F, arrowhead icon 3042 corresponding with Entity 3 Account 2 has been selected, analogous to FIG. 30D. A rewards listing 3044 identifies available rewards which may be redeemed through transactions involving the selected account (e.g., Entity 3 Account 2). For each reward, providers at which the reward is redeemable are listed. In certain implementations, rewards earned with respect to one provider may be transferable or otherwise redeemable with another provider. For example, a discount earned for a first provider may be applied in one or more transactions involving a second provider.

In FIG. 30F, rewards listing 3044 identifies "Cash Bonus" as a first reward that may be redeemed through transactions involving Providers 2 and 4, and "Discount" as a second reward that may be redeemed through transactions involving Providers 4 and 5. A balance indicator 3046 may specify what rewards balance remains. A status indicator 3048 indicates whether use of a corresponding reward ("Cash Bonus") is enabled with respect to transactions involving the selected account (e.g., Entity 3 Account 2) at the listed provider or providers (e.g., Providers 2 and 4). In the version of status indicator 3048 shown in FIG. 30F, a black solid square may be positioned to the left of a rectangle to indicate, for example, that use of the reward is enabled with respect to all listed providers, the black solid square may be positioned to the right of the rectangle to indicate that use of the reward is disabled for all listed providers, and the black solid square may be positioned in the middle (or otherwise somewhere between the left and right) to indicate that use of the reward is enabled with respect to at least one provider while use of the reward is disabled with respect to at least one provider. Status indicators corresponding to particular providers may indicate whether use of a reward is enabled or disabled in a similar fashion (e.g., a square positioned to the left with a "Y" for "yes" may indicate the reward is enabled for use at a corresponding provider in a transaction involving the identified account, and a square positioned to the right with a "N" for "no" may indicate the reward is not usable at the corresponding provider in a transaction involving the identified account).

Example interface 3000G of FIG. 30G may be presented upon, for example, selection of providers icon 3002G in FIG. 30A. Interface 3000G presents a provider listing 3050, which identifies providers at which rewards are or may be redeemable. Each provider has a status indicator that indicates whether the provider is currently "On" (and thus use of rewards is enabled, activated, or otherwise usable) or "Off" (and thus use of rewards is disabled, deactivated, or otherwise unusable). The user may be allowed to change the status for a provider by, for example, selecting the corresponding status indicator (e.g., by touching "Status" or "On" or "Off" for a particular provider on a touchscreen) and selecting a different status (e.g., via another interface discussed elsewhere). The application may allow the user to "visit" (virtually and/or physically) a provider via a visit icon 3052. If the provider is an online merchant, selection of the visit icon 3052 may direct the user to the merchant's website (in-application or via a separate Internet browser or other application launched by the application), and if the provider has a physical location, selection of the visit icon 3052 may provide directions or navigation (e.g., within the same application and/or by launching another application). If there are other providers that do not fit on the screen, a user may view them by, for example, scrolling the page (e.g., by swiping up on a touchscreen) or by selecting "Show More Providers" at the bottom of interface 3000G.

One of the providers from provider listing 3050 may be selected by, for example, activating (e.g., by touching or otherwise selecting) the identified provider or a corresponding arrowhead or other icon. In FIG. 30H, arrowhead icon 3054 corresponding with Provider 3 has been selected. The provider, as well as its location, promotional offerings, and/or other information may be presented at a provider identification region 3056, which identifies which provider has been selected for review and/or management. An account listing 3058 identifies particular accounts with specified rewards which may be redeemable through the identified provider. Rewards earned with respect to more than one account may be usable with respect to one provider. In FIG. 30H, account listing 3058 identifies Entity 2 Account 1 and Entity 3 Account 3, each of which has two rewards that may be individually activated and deactivated for redemption through a transaction involving the corresponding provider (e.g., a purchase from Provider 3). Status indicators corresponding to particular rewards (e.g., "Apply 15% Discount") may indicate whether the particular reward is enabled or disabled for use at the identified provider (e.g., Provider 3) in a transaction involving the identified account (e.g., Entity 2 Account 1).

Example interface 3000I of FIG. 30I may, in a similar fashion, be presented upon, for example, selection of providers icon 3002G in FIG. 30A. Interface 3000I presents a provider listing 3060, which identifies providers or provider categories at which rewards are or may be redeemable. Provider categories may correspond with multiple providers that can be selected, enabled, disabled, etc., as a group. Such groupings may have been defined, for example, via interface 3000B. Provider groups may include providers in certain categories (which may be, e.g., user-defined or automatically categorized by, e.g., the application), such as merchants selling a certain category of goods. One of the providers from provider listing 3060 may be selected by, for example, activating (e.g., by touching or otherwise selecting) the provider identifier or a corresponding arrowhead or other icon. In FIG. 30J, arrowhead icon 3062 corresponding with Provider 3 has been selected. A rewards listing 3064 identifies particular rewards (e.g., discount and cash bonus) which may be redeemable at the identified provider.

Example interfaces 3000K of FIGS. 30K and 3000M of FIG. 30M may be presented upon, for example, selection of rewards icon 3002K in FIG. 30A. Interfaces 3000K and 3000M present rewards listings 3070 and 3080, which identify earned or earnable rewards and rewards groupings. If there are other rewards or rewards groupings that do not fit on the screen, a user may view them by, for example, scrolling the page (e.g., by swiping up on a touchscreen) or by selecting "Show More Rewards" at the bottom of interfaces 3000K and 3000M. One of the rewards from rewards listings 3070 and 3080 may be selected by, for example, activating (e.g., by touching or otherwise selecting) the identified reward or a corresponding arrowhead or other icon. In FIGS. 30L and 30N, arrowhead icons 3072 and 3082, respectively, corresponding with Cash Bonus 1 has been selected. Rewards listing 3074 in FIG. 30L may identify particular accounts through which the identified reward (here, Cash Bonus 1) has been earned and may be redeemed, with specified providers through which the identified reward may be redeemable listed below the account identifier (e.g., "Cash Bonus 1" may be activated for use at Provider 3 and/or at the providers in Provider Category 5 in one or more transactions involving Entity 2 Account 1). Status indicator 3076 indicates that use of "Cash Bonus 1" is disabled for use at Provider 3 in transactions involving Entity 2 Account 1, and may be enabled by toggling status indicator 3076. Rewards listing 3084 in FIG. 30N identifies particular providers or provider groups at which the identified rewards may be redeemed (e.g., the cash bonus may be activated for use at the providers in Provider Category 3). Status indicator 3086 indicates that use of "Cash Bonus 1" (which may have been earned through past transactions involving Entity 1 Account 1) is disabled for use at the providers in Provider Category 3 in subsequent transactions involving Entity 1 Account 1, and may be enabled by toggling status indicator 3086.

Example interface 3000O of FIG. 30O may be presented upon, for example, selection of history icon 3002O in FIG. 30A. Interface 3000O presents transaction listing 3090, which identifies transactions (by, e.g., account, provider, date, and transaction amount) involving user accounts accessible to the Control Tower application. If rewards were applied to the transaction, transaction listing 3090 may indicate, for example, which rewards were applied, the amount of rewards applied, the amount of the transaction not covered by the reward, the remaining rewards balance, etc. If there are other transactions that do not fit on the screen, a user may view them by, for example, scrolling the page (e.g., by swiping up on a touchscreen) or by selecting "Show More Transactions" at the bottom of interface 3000O.

One of the transactions from transaction listing 3090 may be selected by, for example, activating (e.g., by touching or otherwise selecting) the identified transaction or a corresponding arrowhead or other icon. In FIG. 30P, arrowhead icons 3092 corresponding with the transaction at Provider 6, has been selected. Interface 3000P provides additional information for the selected transaction. Interface 3000P may allow the user to retroactively apply an available reward to the transaction at 3094. The rewards that are redeemable for the transaction are a $Y bonus and a Z % discount. As indicated by the bolded rectangles, the user has selected (at 3096) the bonus, and has selected (at 3098) to confirm application of the selected bonus to the transaction. This allows the user to retroactively apply a virtual rewards currency to a transaction that was partially or wholly paid-for using monetary currency, and may result in a credit to the corresponding account of the user once the retroactive application of the rewards has been processed. In various implementations, rewards may be retroactively applied so as to apply multiple rewards to a transaction, to apply a reward to a transaction to which a reward was not previously applied, and/or to change the reward that is applied to selected transactions. In certain implementations, in-process transactions may be listed in a transaction listing, and the user allowed to select which rewards (if any) are to be applied to the transactions before processing of the transaction is completed (e.g., before debiting and crediting of monies and rewards has occurred).

It is noted that any of the features, selectors, icons, functionalities, information, elements, or other aspects of any one interface or figure may be combined or swapped with or applied to any of the features, selectors, icons, functionalities, information, elements, or other aspects of any other interface or figure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims

What is claimed is:

1. A security system of a first entity, the security system comprising one or more hardware processors configured to:
    serve, to a user device, an internet access control portal for controlling, via an interactive graphical user interface (GUI), account access by a service provider client application which communicates, when executed on the user device, with a service provider computing system of a second entity;
    accept, via the internet access control portal, a login credential and verify that the login credential grants access to the internet access control portal;
    present, in the GUI of the internet access control portal, based on the verifying that the login credential grants access to the internet access control portal, an account listing comprising a financial account linked with the service provider client application, wherein the financial account comprises financial and nonfinancial account data;

detect, via the account listing in the GUI of the internet access control portal, selection of the financial account;

present, in the GUI of the internet access control portal, an access permissions listing comprising one or more security settings attributable to the linked service provider client application running on the user device;

detect, via the access permissions listing in the GUI of the internet access control portal, selection of a first set of security settings corresponding to one or more data types or functionalities associated with the service provider client application;

receive, at the security system of the first entity, a first application programming interface (API) call comprising a first account request transmitted from the service provider computing system of the second entity in response to the service provider client application executing at the user device communicating with the service provider computing system;

determine that the first API call does not comply with the first set of security settings attributed to the service provider client application; and in response to determining that the first API call does not comply with the first set of security settings, decline the first account request from the service provider client application.

2. The system of claim 1, the one or more hardware processors further configured to, in response to detecting selection of the first set of security settings, deactivate a first access token corresponding to a prior set of security settings attributed to the service provider client application, the first access token indicating limited access, by the service provider client application, to a first subset of the financial and nonfinancial data of the financial account.

3. The system of claim 1, the one or more hardware processors further configured to:

present, in the GUI of the internet access control portal, the access permissions listing comprising the one or more security settings attributable to the service provider client application; and detect, via the access permissions listing in the GUI of the internet access control portal, selection of a second set of security settings corresponding to the one or more data types or functionalities associated with the service provider client application.

4. The system of claim 3, the one or more hardware processors further configured to generate, by the first entity in response to the selection of the second set of security settings, a second access token corresponding to the second set of security settings attributed to the service provider client application and transmit the second access token to the service provider computing system of the second entity indicating limited access, by the service provider client application, to a second subset of the financial and nonfinancial data of the financial account.

5. The system of claim 3, the one or more hardware processors further configured to, in response to detecting selection of the second set of security settings, activate a third access token indicating limited access, by the service provider client application, to a third subset of the financial and nonfinancial data of the financial account.

6. The system of claim 4, the one or more hardware processors further configured to:

receive, from the service provider computing system of the second entity, a different second API call comprising a second account request for the service provider client application, the second API call comprises the second access token generated by the first entity;

authenticate the second access token sent by the second entity;

verify that the second API call complies with the second set of security settings attributed to the service provider client application; and in response to verifying that the second API call complies with the second set of security settings, grant the second account request to the service provider client application.

7. The system of claim 1, the one or more hardware processors further configured to:

receive by the first entity, from the service provider computing system of the second entity, a different second API call comprising a second account request for the service provider client application;

verify by the first entity that the second API call complies with a second set of security settings attributed to the service provider client application; and in response to verifying that the second API call complies with the second set of security settings, grant the second account request to the service provider client application.

8. The system of claim 7, wherein the second set of security settings adds one or more access permissions revoked by the first set of security settings.

9. The system of claim 7, wherein the one or more hardware processors are configured to verify that the second API call complies with the second set of security settings attributed to the service provider client application by determining that the second API call comprises a request for a data type or a functionality granted to the service provider client application through the second set of security settings.

10. The system of claim 1, the one or more hardware processors further configured to, in response to detecting selection of the first set of security settings:

generate a fourth access token corresponding to the first set of security settings attributed to the service provider client application; and transmit the fourth access token to the service provider computing system for limited access, by the service provider client application, to a fourth subset of the financial and nonfinancial data of the financial account.

11. The system of claim 10, wherein the first API call comprises the fourth access token generated by the first entity, and wherein the one or more hardware processors are further configured to authenticate the fourth access token sent by the second entity.

12. The system of claim 1, wherein the one or more hardware processors are configured to determine that the first API call does not comply with the first set of security settings attributed to the service provider client application by determining that the first API call comprises a request for a data type or a functionality not granted to the service provider client application through the first set of security settings.

13. The system of claim 1, wherein the internet access control-listing portal presented by the one or more hardware processors comprises an access control corresponding to accessing information on financial transactions involving the financial account.

14. The system of claim 1, wherein the first set of security settings defines the one or more data types in the account data that are accessible to the service provider client application.

15. The system of claim 1, wherein the internet access control portal presented by the one or more hardware processors comprises an access control corresponding to access to nonfinancial account data.

16. The system of claim 1, wherein the first set of security settings revokes one or more access permissions previously granted to the service provider client application.

17. A method implemented by a security system of a first entity, the security system comprising one or more hardware processors, the method comprising:
- serving, by the first entity to a user device, by the one or more hardware processors, an internet portal comprising an interactive graphical user interface (GUI) granting security control over account access permissions for client applications, wherein the internet portal is used as an access control portal provided for controlling account access by a service provider computing system of a second entity;
- accepting, via the internet portal, by the one or more hardware processors, a login credential and verify that the login credential grants access to the internet portal;
- presenting, by the first entity in the GUI of the internet portal, by the one or more hardware processors, in response to verifying that the login credential grants access to the internet portal, an account listing comprising a financial account linked with one or more client applications which communicate, when executed on the user device, with the service provider computing system of the second entity;
- detecting, via the account listing in the GUI of the internet portal, by the one or more hardware processors, selection of the financial account comprising financial and nonfinancial account data;
- presenting, by the first entity in the GUI of the internet portal, by the one or more hardware processors, an access permissions listing comprising one or more security settings attributable to a service provider client application running on the user device;
- detecting, by the first entity via the access permissions listing in the GUI of the internet portal, by the one or more hardware processors, selection of a first set of security settings corresponding to one or more data types or functionalities associated with the service provider client application;
- receiving by the one or more hardware processors of the security system of the first entity, a first application programming interface (API) call comprising a first account request transmitted from the service provider computing system in response to the service provider client application executing at the user device communicating with the service provider computing system;
- determining, by the one or more hardware processors of the first entity, that the first API call does not comply with the first set of security settings attributed to the service provider client application; and
- in response to determining that the first API call does not comply with the first set of security settings, declining, by the one or more hardware processors, the first account request from the service provider client application.

18. The method of claim 17, further comprising:
- receiving, from the service provider computing system, by the one or more hardware processors of the first entity, a different second API call comprising a second account request for the service provider client application;
- verifying, by the one or more hardware processors, that the second API call complies with a second set of security settings attributed to the service provider client application; and
- in response to verifying by the first entity that the second API call complies with the second set of security settings, granting the second account request to the service provider client application.

19. The method of claim 17, further comprising generating, by the first entity in response to the selection of the first set of security settings, by the one or more hardware processors, an access token corresponding to the first set of security settings attributed to the service provider client application and transmitting the access token to the service provider computing system of the second entity indicating limited access, by the service provider client application, to a first subset of the financial and nonfinancial data of the financial account.

20. The method of claim 17, further comprising:
- presenting, in the GUI of the internet portal, by the one or more hardware processors, the access permissions listing comprising the one or more security settings attributable to the service provider client application;
- detecting, via the access permissions listing in the GUI of the internet portal, by the one or more hardware processors, selection of a different second set of one or more security settings corresponding to the one or more data types or functionalities associated with the service provider client application; and
- in response to detecting selection of a second set of security settings, performing at least one of:
  - deactivating, by the one or more hardware processors, a first access token; or
  - generating, by the one or more hardware processors, a second access token corresponding to the second set of security settings attributed to the service provider client application, and transmitting the second access token to the service provider computing system for limited access, by the service provider client application, to a second subset of the financial and nonfinancial data of the financial account.

* * * * *